(12) United States Patent
Papakonstantinou et al.

(10) Patent No.: US 7,971,148 B2
(45) Date of Patent: Jun. 28, 2011

(54) WEB-PAGE-BASED SYSTEM FOR DESIGNING DATABASE DRIVEN WEB APPLICATIONS

(75) Inventors: Yannis G. Papakonstantinou, La Jolla, CA (US); Kian Win Ong, La Jolla, CA (US); Ioannis Katsis, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 914 days.

(21) Appl. No.: 11/742,907

(22) Filed: May 1, 2007

(65) Prior Publication Data

US 2007/0260612 A1 Nov. 8, 2007

Related U.S. Application Data

(60) Provisional application No. 60/797,112, filed on May 2, 2006, provisional application No. 60/866,809, filed on Nov. 21, 2006.

(51) Int. Cl.
G09G 5/00 (2006.01)
G06F 3/00 (2006.01)
G06F 17/30 (2006.01)
G06F 19/00 (2011.01)

(52) U.S. Cl. .. 715/762; 715/763; 715/780; 707/999.102

(58) Field of Classification Search .................. 715/762, 715/763, 780; 707/999.102
See application file for complete search history.

(56) References Cited

U.S. PATENT DOCUMENTS

| | | | | |
|---|---|---|---|---|
| 5,603,025 A | * | 2/1997 | Tabb et al. | 707/2 |
| 5,701,453 A | * | 12/1997 | Maloney et al. | 715/841 |
| 5,850,631 A | | 12/1998 | Golshani et al. | |
| 6,115,690 A | * | 9/2000 | Wong | 705/7 |
| 6,633,878 B1 | * | 10/2003 | Underwood | 707/999.102 |
| 6,912,538 B2 | * | 6/2005 | Stapel et al. | 707/999.102 |
| 6,980,995 B2 | * | 12/2005 | Charlet et al. | 707/999.102 |
| 7,152,074 B2 | * | 12/2006 | Dettinger et al. | 707/999.102 |
| 7,152,207 B1 | | 12/2006 | Underwood et al. | |
| 7,275,216 B2 | | 9/2007 | Paoli et al. | |
| 2004/0181543 A1 | * | 9/2004 | Wu et al. | 707/102 |
| 2004/0189716 A1 | | 9/2004 | Paoli | |

OTHER PUBLICATIONS

Dyck, et al., Iteration speeds database reports, eWeek (1530-6283), Jun. 16, 2003. vol. 20,Iss.24;p. 51.*
Oracle Application Express URL http://www.oracle.com/technology/products/database/application_express/index.html includes overview, and tutorial [accessed on Jul. 21, 2007], 117 pages.

(Continued)

Primary Examiner — William L Bashore
Assistant Examiner — Jordany Núñez
(74) Attorney, Agent, or Firm — Perkins Coie LLP

(57) ABSTRACT

In a web-page-based system for designing database driven web applications, a page is initiated containing one or more top level iterators. A user introduces fields to the page from a palette including: input, display, hyperlink, iterator. In one case, the user creates iterators nested in a user-selected iterator, and retaining context of the selected iterator, where the system accommodates iterators that are recursive. In an alternative embodiment, the user adds both display and entry fields pertaining to a given user-selected iterator, retaining context of the selected iterator. Responsive to user introduced fields, the system automatically creates representative data structures in a database and automatically relates fields of the pages to the data structures in accordance with a predetermined logic.

41 Claims, 37 Drawing Sheets

OTHER PUBLICATIONS

IBM QEDWiki. URL http://services.alphaworks.ibm.com/qedwiki/ [accessed on Jul. 21, 2007], 3 pages.
WebRatio URL http://www.webratio.com [accessed Jul. 21, 2007], 7 pages.
Ceri, S., P. Fraternali, and A. Bongio, "Web modeling language (WEBML): a modeling language for designing web sites," Computer Networks 33: 137-157 (2000).
Yang, F, J. Shanmugasundaram, M. Riedewald, and J. Gehrke, "Hilda: A high-level language for data-drivenweb applications," In ICDE '06: Proceedings of the 22nd International Conference on Data Engineering (ICDE'06), p. 32 (12 pages), Washington, DC, USA, 2006. IEEE Computer Society. ISBN 0-7695-2570-9.
Coghead. URL http://www.coghead.com/ [accessed on Jul. 21, 2007], 40 pages.
DabbleDB. URLs http://www.dabbledb.com [accessed on Jul. 21, 2007], 5 pages.
Google Base. URL http://base.google.com [accessed on Jul. 21, 2007], 7 pages.
Wufoo. URL http://wufoo.com/ [accessed on Jul. 21, 2007], 11 pages.
Microsoft InfoPath. URL http://www.microsoft.com/office/infopath [accessed on Jul. 21, 2007], 31 pages.
Atzeni, P., G. Mecca, and P. Merialdo, "To weave the web," VLDB '97: Proceedings of the 23rd International Conference on Very Large Data Bases, pp. 206-215, San Francisco, CA, USA, 1997. Morgan Kaufmann Publishers Inc. ISBN 1-55860-470-7.
Cooper, E. et al., "Links: Web programming without tiers,". 2007. URL http://groups.inf.ed.ac.uk/links/papers/links-fmco06.pdf ., 30 pages.
Ennals, R.J. and M. N. Garofalakis, "Mashmaker: mashups for the masses," SIGMOD '07: Proceedings of the 2007 ACM SIGMOD international conference on Management of data, pp. 1116-1118, New York, NY,USA, 2007. ACM Press. ISBN 978-1-59593-686-8. doi: http://doi.acm.org/10.1145/1247480.1247626 [accessed on Jul. 21, 2007].
eUnifyDB. URL http://www.eunifydb.net [accessed on Mar. 6, 2008]; 1 page.
FileMaker Pro 9 Tutorial. www.filemaker.com/downloads/pdf/fmp9_tutorial.pdf [accessed on Mar. 6, 2008]; 65 pages.
Form Assembly. URL http://www.formassembly.com [accessed on Mar. 6, 2008]; 1 page.
Fraternali, P., "Tools and approaches for developing data-intensive web applications: a survey," ACM Comput. Surv., 31(3):227-263, 1999. ISSN 0360-0300. doi: http://doi.acm.org/10.1145/331499.331502 [accessed on Jul. 21, 2007].
Intuit Quickbase. "QuickBase—Work Better from one Web Based Software Application," URL http://www.quickbase.com [accessed on Mar. 6, 2008], 1 page.
Microsoft Office Access 2007. URL http://office.microsoft.com/en-us/access/FX100487571033.aspx [accessed on Mar. 5, 2008], 1 page.
OpenRecord., "Elevator Pitch," URL http://www.openrecord.org [accessed on Mar. 6, 2008]; 3 pages.
Oracle Application Express Overview, An Oracle White Paper, Jan. 2006 http://www.oracle.com/technology/products/database/application_express/pdf/apex_overview.pdf [accessed Mar. 6, 2008], 16 pages.
"How to be successful with Salesforce", User Guide Copyright by Salesforce.com Available at https://na2.salesforce.com/help/doc/en/sf.pdf [accessed on Apr. 24, 2008] 1687 pages.
Supplementary European Search Report dated Dec. 10, 2009 for Application No. EP 07 76 1700, 11 pages.

\* cited by examiner

Acme Inc Hiring Application 🔒 Locked publish app.     ⬚ Design   🏠 Use   ✕ Settings Create Combine Limit Filter Sort Import Export

Navigation
Publish Company Positions
Submit Resume
Review Comment and Rate Resumes
Schedule Interviews
Interview Comments

My Reports
Data from Publish Company Positions
Data from Submit Resume
Data from Review Comment and Rate Resumes Create New Page undo   Renamed "New Field 11" to "Private Rating"
undo   Your information has been submitted successfully

Review Comment and Rate Resumes
avail. to "Employees"
Add a custom description to your page
edit description edit   remove

| Name: | Joe |
|---|---|

Positions Applied

| Position | Private Rating | |
|---|---|---|
| Developer | 9.0 | edit |
| QA | 6.0 | edit |

Show [10 ▼] entries

Education

| School | Degree | |
|---|---|---|
| UCSD | BS | edit |

Show [10 ▼] entries

Public Comment

| Comment | |
|---|---|
| I think he is ok. | edit   remove |
| | |

Show [10 ▼] entries
add more

Private Comment

| I am afraid he won't fit with jack |
|---|

Right panel:
- ▭ Single Line Text
- ▭ Multi-Line Text
- 1₂₃ Number
- ▼ Dropdown Selection
- ⊙ Radio Buttons
- ☏ Phone Number
- 📅 Date
- ✉ Email
- 🖩 Calculated Field
- 🌐 Web Address
- ▭ File Upload Field
- 🔗 Details Link
- ☰ List of Entries
- 📋 Table of Entries

*(Prior Art)*

Review, Comment and Rate Resumes (top iterator)

Name

Positions Applied (iterator)

Position

Positions Applied Annotation (annotation iterator)

Set of Private Rating (virtual iterator)

Private Rating

RCRR Annotation (annotation iterator)

Set of Private Comment (virtual iterator)

Private Comment

Public Comments (nested iterator)

Comment

*FIG. 36*

WEB-PAGE-BASED SYSTEM FOR DESIGNING DATABASE DRIVEN WEB APPLICATIONS

CROSS-REFERENCE TO RELATED APPLICATIONS

This application claims the benefit of the following earlier-filed U.S. Provisional Applications in accordance 35 USC 119: No. 60/797,112 filed May 2, 2006 in the names of Papakonstantinou et al., and No. 60/866,809 filed Nov. 21, 2006 in the names of Papakonstantinou et al. The entirety of the foregoing applications are hereby incorporated herein by reference.

BACKGROUND

1. Field

This disclosure relates to databases containing computer readable data. More particularly, it concerns a computer implemented, web-page-based system to assist users in designing database driven web applications.

2. Description of Related Art

In today's world, digital data is nearly everywhere. Digital data resides locally in personal computers, palm computers, watches, cell phones, global positioning system (GPS) devices, televisions, and hundreds of other such devices. But having so much data is useless without having a way to organize the data and to interact with the data.

One paradigm for people to interact with digital data is by using pre-designed database-driven web-accessible applications. These are hosted web applications implementing a special purpose process. "Hosted" refers to the fact that the application's code and databases may reside at a host system that is distinct from the users' systems or even from the designers' systems. In this setup, software designers prepare the database structure (such as a database schema) and a web application that enables access to this database. Then they make the web application (and indirectly the underlying database) available online to users or, more generally, communities of users. Users employ web browsers to initiate their own databases, and thereafter to add, delete, and modify data from such databases, as they perform the steps of the special process implemented by the web application. Some examples of this paradigm include Evite, the upcoming Microsoft Office Live, and salesforce.com.

Although the foregoing paradigm enjoys widespread use today, and satisfies certain market niches, there are certain limitations, as follows. Although the data of these applications can be manipulated by users in pre-designed ways, the database structure and the business process captured by the web application are fixed. Therefore, the database structure and the web application only satisfies fixed information and process needs and patterns. This is not a problem if the user's needs are fully captured by the database structure and process of the pre-designed web application.

The disadvantage of pre-designed web applications is that they do not contemplate letting their users customize their own database structures and respective web applications to their needs. This can be frustrating because there are millions of communities whose information exchange and collaboration process needs are not captured by any existing hosted web application. Indeed, many of those communities will likely never be served by a pre-designed hosted web application for the simple reason that they are too small to produce a return on the investment of a hosted web application provider who would be interested to build and market such a hosted web application. One example includes universities organizing their intramural athletic events. A pre-designed web application that can support the events of each university would be fairly complex in order to accommodate the complexity of the process and its many variations from university to university. Furthermore, the customers for such a web application are too few and too unwilling to pay in order to warrant yet another pre-designed hosted web application provider catering to the particular community.

If no hosted web application does the job for a certain community, the community may consider hiring Information Technology professionals to design, develop, and deploy a custom Web application and database, to be used by members of the community to exchange structured data and collaborate. The problem is that many communities that need a customized web application do not have the budget to hire such professionals and therefore they cannot have a web application that is customized to their needs. In other cases, even if there is a sufficient budget, there is not enough time to deploy Information Technology professionals.

If there is no pre-designed database and web application serving a community and no budget to hire an IT specialist to build such, members of the community may attempt to build and host a database and web application themselves. The problem with this option is that such community members must be trained in the database design and web application programming art.

In contrast to the paradigm described above (namely, pre-designed hosted web applications implementing special purpose processes), a different paradigm is the document exchange hosted web application. Many hosted web applications enable their users to post documents, read the documents of other users, and in certain cases even edit the documents produced by other users. For example, Google Docs & Spreadsheets offers its users the ability to post documents or spreadsheets on the web and let other users to read and even edit them. Included in this class are blog providers, which are hosted web applications that enable their users to post documents (blogs) and search and read others' blog entries. Also included in this class are wikis, which are hosted web applications that enable their user communities to collaborate on versioned and interconnected document collections. Another example includes photo sharing sites, such as flickr.com, where the shared documents are images. Still another example includes electronic groups, such as yahoogroups.com, where the members of the group post messages.

Document exchange hosted web applications suffer from limitations in both the (1) type of data exchanged and (2) the implemented collaboration process. Namely, these applications simply use documents of various sorts instead of organized formatting of data along objects with attributes and relationships, as is found in typical database systems.

Also, these applications are limited because the core process by which the community users of such hosted web applications cooperate is essentially a publish/subscribe process, where some class of users is allowed to publish and another class of users (often the set of all Internet users) can read or edit. There are variations on the core publish/subscribe theme, such as introducing a "moderator" class of users or providing versioning features when multiple users may modify a published document. However, for many users, none of these systems allows the collaborating community to implement sufficiently complex process schemes.

The present inventors have sought to identify and address the limitations of database driven applications, and further to develop new uses. One area of focus concerns web-accessible database driven web applications, where remote users are enabled to initiate and design the database and the web application, and the completed database and web application is made web-accessible to ultimate end-users.

SUMMARY

Broadly, the present disclosure concerns a system enabling the creation of database driven web applications by users who initiate and design the web pages of the application with mostly graphical user interface (GUI) actions. A user introduces fields to the page from a palette. A page may contain any combination of input, display, hyperlink, and iterator fields, where iterator fields contain other fields and lead to repeating structures, such as tables, lists, calendars with multiple entries, etc. In one case, the user creates iterators nested in a user-selected iterator, where the nested iterators operate within the context of the selected iterator and the system accommodates iterators that are recursive. In another case, the user adds both display and entry fields pertaining to a given user-selected iterator, retaining context of the selected iterator. Responsive to user introduced fields, the system automatically creates a database structure, automatically relates fields of the pages to the data structures in accordance with a predetermined logic, and provides mechanisms where the fields of the web application pages exchange data with the database.

The teachings of this disclosure may be implemented as various methods, apparatuses, logic circuits, computer storage media, or a combination of these. This disclosure provides a number of other advantages and benefits, which should be apparent from the following description.

BRIEF DESCRIPTION OF THE DRAWINGS

FIG. 7 is a screen shot showing an example of a Publish Company Positions page.

FIG. 8 is a screen shot showing an example of a Submit Resumes page.

FIG. 9 is a screen shot showing an example of a Review, Comment and Rate Resumes page.

FIG. 10 is a screen shot showing an example of an Interview Comments page.

FIG. 11 is a screen shot showing shows an example of a dynamic web page instance, according to the prior art.

FIG. 15 is a screen shot showing an example of an interface for declaring access rights to the pages.

FIG. 18 is a screen shot showing an example of the completely designed field structure of the example Publish Company Positions.

FIG. 19 is a screen shot showing an example of an interface that combines design interface functions with use interface functions (submitting data in this example).

FIG. 20 is a screen shot showing an example of an interface that combines design interface functions with use interface, after data has been submitted.

FIG. 21 a screen shot showing an example of data access rights interface, where designer specifies access rights pertaining to iterator.

FIG. 29 is a screen shot showing an example of field tree displayed by the semantic combination interface, in the context of the example Hiring Application.

FIG. 30 is a screen shot showing an example of designer choosing originating fields from the field tree and the data combination engine creating respective new fields, in the context of the example Hiring Application.

FIG. 31 is a screen shot showing an example of designer choosing originating fields from the field tree and the data combination engine creating respective new fields, including iterators, in the context of the example Hiring Application.

FIG. 32 is a screen shot showing an example where designer combines pages by reference relationship, in the context of the example Hiring Application.

FIG. 34 is a screen shot showing an example of hyperlinks in the context of the example Hiring Application.

FIGS. 36-37 show an example of inferred data structure and page sketch in the context of the example Hiring Application

DETAILED DESCRIPTION

Terminology

Figure 1A:
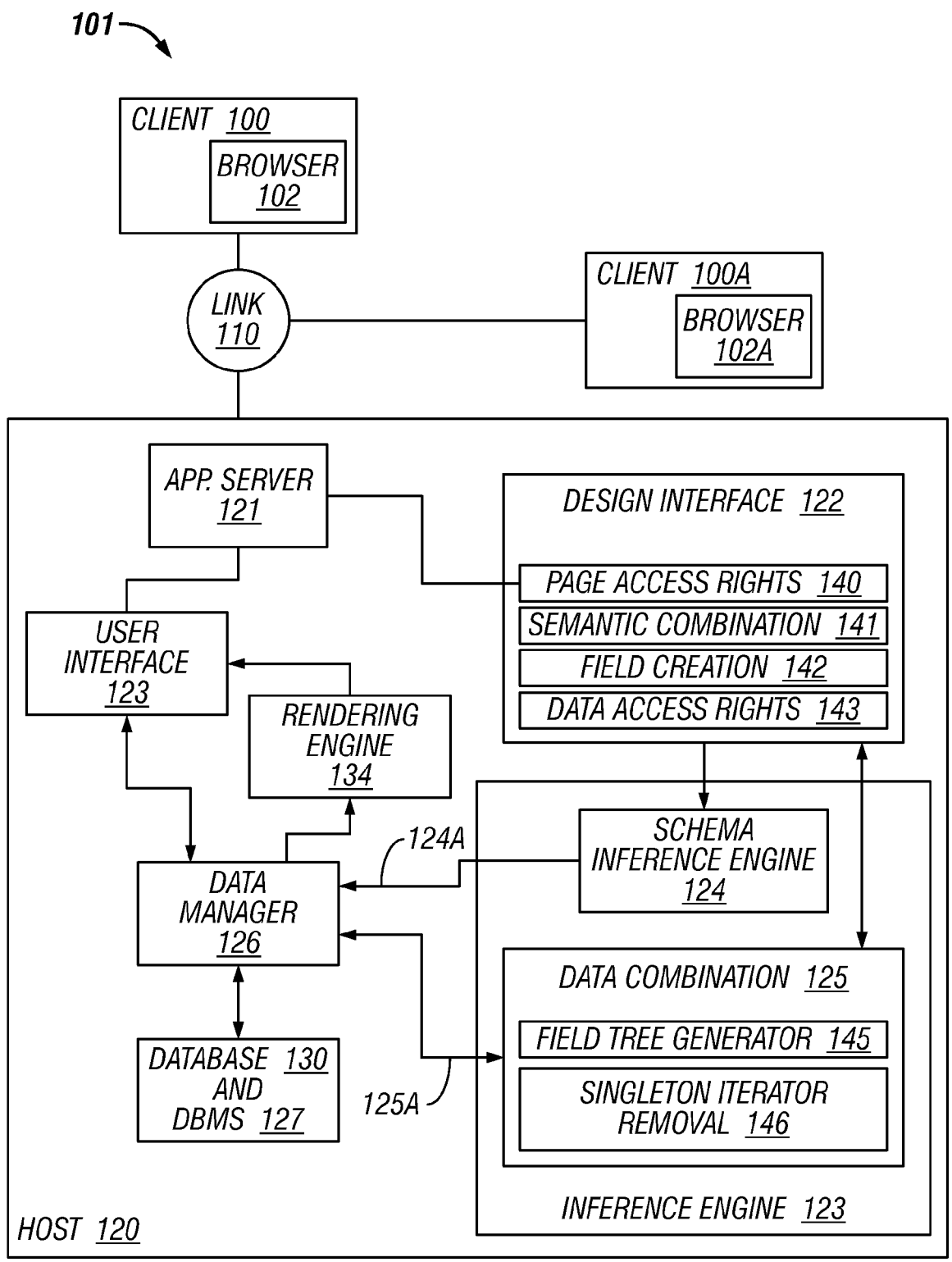
FIG. 1A is a block diagram of the components and interconnections of one embodiment of system for designing web-page-based database driven applications.

Without any intended limitation, this disclosure employs certain terminology in order to encourage brevity, offer ease of reading, and promote clarity of discussion.

Designer. This refers to people who operate client machines (such as 100-100A of FIG. 1A, discussed below) to use resources of a host (such as 120 of FIG. 1A, described below) to design web applications.

User. This refers to end users who operate client machines such as 100-100A to interact with database-driven web applications (and therefore the underlying databases) residing on the host 120.

Client. This refers to digital data processing machines, such as 100-100A, which are employed by humans to access the host 120. According to one embodiment, no distinction is made between clients used by users and clients used by designers.

Record: This refers to any data object that has attributes/fields. For example, a "person" record has attributes such as "first name", "last name", "SSN" etc. It is possible that a record contains nested records. Records are often implemented as tuples of a relational database table, or XML elements of XML databases, or Java objects carrying attributes/properties.

Database & Schema. "Database" refers to a persistent data structure, such as 130. In general, the data structure contains sets of records of various types that conform to a schema. Without any limitation, this disclosure contemplates schemas such as a relational schema, XML schema, or any other specification that captures aspects of data such as the types of records of the database, records' attributes, records' relationships and constraints that the records may have to satisfy (such as uniqueness constraints or referential integrity constraints), and the like.

Database Management System (DBMS). This refers to digital data processing machines (such as 126 of FIG. 1A, discussed below) that enable retrieving and modifying data from persistent databases.

Browser. This refers to software operating on the client for use in accessing web pages, including dynamic web pages.

Web Application. This refers to software that is accessed with a browser over a network. The present disclosure focuses on database-driven web applications Database Driven Application. A database-driven application interacts with a database in order to achieve the following functionalities including retrieving database data that are displayed to the user, and writing data provided by the user in a database.

Database Driven Web Application. A database driven web application performs functionalities including retrieving and using database data to produce dynamic web page instances, and writing data provided by the user over web pages in the database.

Web page: This refers to an information set (document) that is produced by a web application, such as 120, and is suitable for displaying data and interacting with browsers (such as 102-102A of FIG. 1A, discussed below).

Dynamic Web Page Instance: The present disclosure focuses on dynamic web page instances, i.e., pages that are constructed by the web application, as a result of computation. In contrast, the web application performs functions such as retrieving database data and creating pages by appropriately combining database data with the static parts of the page. In addition the application may input user-provided data from the pages and store such data in the database. To further understand the definition of dynamic pages, they are contrasted with static pages where the information set (document) is fully prepared by a user.

Figure 11:
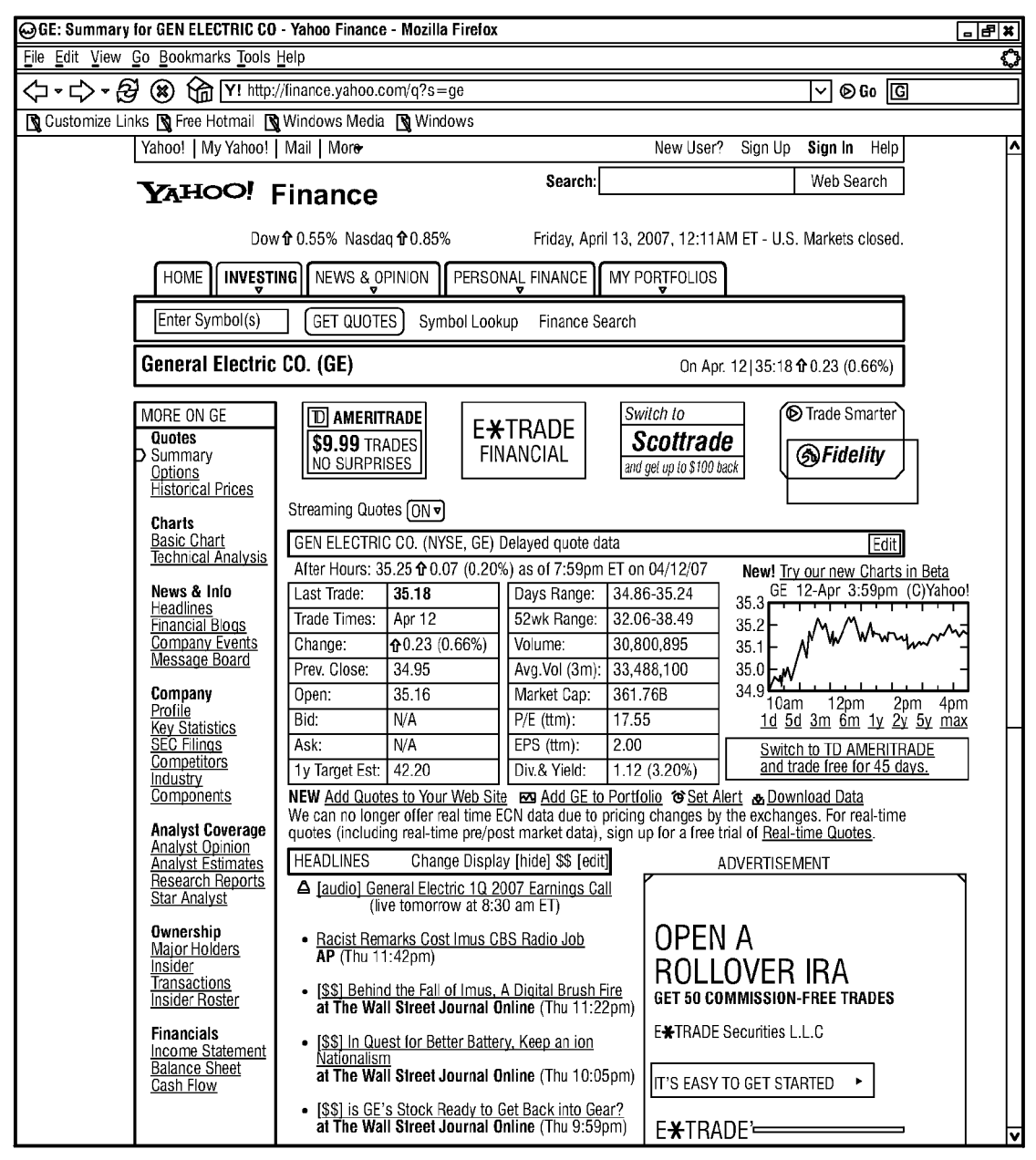

Dynamic Web Page: This refers to an Internet address, provided by a web application, that upon being accessed generates a dynamic web page instance. A dynamic web page may accept parameters or may even require parameters from the browser (and indirectly the user). In general, parameters are an input to the computation that produces the page instance. An example is the Yahoo™ Finance database-driven web application that, among other pages, produces Web pages that provide stock market quotes and other financial information upon being provided by the user (via a browser) a stock market ticker symbol. Such a web application relies on an underlying database that contains stock market data. More particularly, a dynamic web page has a given Internet address (URL). When a browser receives and executes this combination of Internet address and parameters, web application produces the corresponding dynamic web page. FIG. 11 shows an example of this.

Iterators and Nested Iterators: This refers broadly to constructs of dynamic web pages that function as follows. During the generation of dynamic web page instances by a database-driven web application the iterator processes sets of records that are the result of retrieving data from the database and potentially filtering, combining and transforming them. The dynamic web page instances contain instances of the iterator where, for each processed record, the iterator instance contains one instance of a repeating structure. Iterators may be, without limitation, associated with tables displayed on dynamic web page instances. An iterator may contain other iterators, in which case such iterators are called nested iterators. Iterators can be implemented using a vast array of technologies. Iterators may also be referred to as iterator fields.

Iterator Instances: This refers broadly to constructs of dynamic web pages that function as follows. During the generation of dynamic web page instances by a database-driven web application the iterator processes sets of records that are the result of retrieving data from the database and potentially filtering, combining and transforming them. The dynamic web page instances contain instances of the iterator where for each processed record the iterator instance contains one instance of a repeating structure. The repeating structure may itself contain instances of nested iterators. Iterator instances are often displayed as tables or lists. In such case, the repeating structure is the table rows, which may contain nested tables.

Iterator context: The context of an iterator refers to the types of database records retrieved by this iterator, or the iterators in which this iterator is nested.

Architecture

Introduction

One aspect of the present disclosure concerns a web-page-based system to enable people to design and host database driven web applications. This system may be embodied by various hardware and/or software components and interconnections, with one example being described by the system 101 of FIG. 1A.

For ease of description, the system 101 is usable to design web applications and also host the resulting web applications. However, different systems may be used for these purposes—one for design and another for hosting. Indeed many combinations are possible depending on where the application and the database are hosted. One option is to build the entire application plus database in one system, and then host it in another system. Another option is to host only the database in another system. This disclosure contemplates further arrangements, as will be apparent to those of ordinary skill having the benefit of this disclosure.

The system 101 includes a host 120 coupled to various clients such as 100-100a. Each client includes a web browser such as 102-102a. The host 120 is coupled to clients 100-100a by a telecommunications link 110, which may be implemented with numerous different hardware and communications protocols, with some examples including Internet, Intranet, satellite, LAN, WAN, fiber optic network, Ethernet, wireless telephony, landline telephony, etc.

Broadly, users operate the client machines' web browsers to access the host 120 in order to design and host database driven web applications. The phrase "database driven web applications" refers to web applications that access an underlying database (via a DBMS) and produce dynamic web pages that do one or more of the following: (1) display database data in response to user requests, (2) allow modifications of the displayed data, (3) enable user input of new data, where the new data is (for example) stored in the database and can consequently be displayed at one or more pages, (4) enable interactive behavior (including browsing/navigation across pages) that is dependent on the available data.

At any time during the design, the host 120 may be provided to various users via the link 110 and client machines 100-100a or another such arrangement of link(s) and machine(s).

In the system 101, there are various data processing components, such as the clients 100-100a, the host 120, and the subcomponents 121-134 of the host 120. These may be implemented by one or more hardware devices, software devices, a portion of one or more hardware or software devices, or a combination of the foregoing. The makeup of these subcomponents is described in greater detail below, with reference to FIGS. 2-4.

Client

Referring to FIG. 1A in greater detail, the client machines 100-100a comprise personal computers, computer workstations, personal digital assistants (PDAs), internet enabled telephones, or any other computing devices appropriate to the operations described in detail below. The browsers 102-102a may be implemented using any Internet web browser.

Host

The host 120 may be implemented by one or more personal computers, computer workstations, mainframe computers, server, or other digital data processing device appropriate to the operations described in detail below. In one specific example, the host 120 is implemented by a server or computer workstation with resources sufficient to serve the anticipated number of users and processing load. In the example shown, the host 120 includes various subcomponents 121-134, and their respective subcomponents.

Figure 1B:
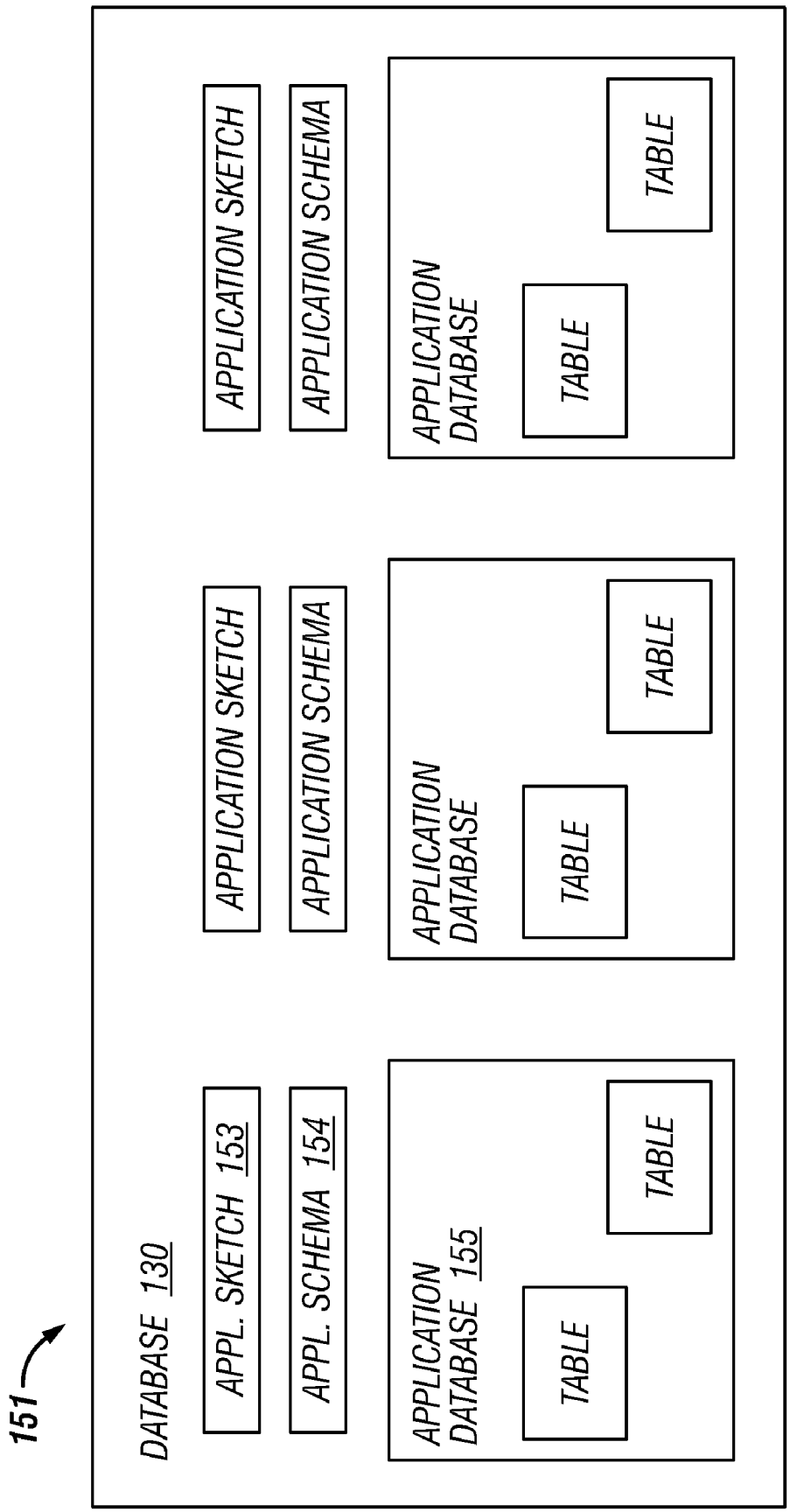
FIG. 1B is a block diagram showing the database of FIG. 1A in greater detail.

In the general case, multiple applications may be designed and hosted at host 120. Broadly, the representations of the structure and functionality of each web application hosted at host 120 is stored in web application sketches 153 (FIG. 1B, described below), while the structure of the underlying database is captured by web application database schemas 154 (FIG. 1B, described below). Together, the application schemas 154 and sketches 153 specify database-driven web applications. The data stored in clients' web applications are stored in application databases 155 that are parts of the host's database 130.

Database and DBMS

In one example, the database 130 is a relational database and, respectively, the DBMS 127 is a Relational DataBase Management System (RDBMS). Other databases (e.g., Object Oriented databases, XML databases) and corresponding DBMSs that can store and retrieve structured information are possible alternatives for data storage and retrieval.

Database

Introduction

FIG. 1B describes the database 130 in greater detail. As shown the database 130 includes multiple sets of application sketches, schemas, and databases. Each set corresponds to a different web application, for example, web applications for different customers, purposes, etc.

For ease of illustration, a single set 151 of sketch-schema-database is described. As to the set 151, there is a corresponding application database 155, which is part of the database 130.

Application Schema

The application database 155 is structured according to an application schema 154, which captures aspects such as the various types of objects of the application, the attributes of the objects, the relationships between various types of objects and what constraints may apply on the database.

Sketch

A designer's web application is internally represented by a web application sketch 153. Basically, the sketch consists of page sketches and action nodes. In one example, a page sketch includes (1) an Internet address, which can be a relative address URL (from now on referred to simply as URL), and (2) a field structure. The URL identifies the page, and the field structure specifies the fields displayed on the page including, without limitation, input fields, display fields and hyperlinks.

As explained in greater detail below, a page sketch corresponds to a dynamic web page. Every time the sketch is activated it produces a "dynamic web page instance".

Each page sketch corresponds to a dynamic page of the web application and captures the functionality and presentation/appearance of the page. Without limitation, the page sketch may capture any of the following aspects of dynamic web pages: (1) which data are collected by the page and how, (2) which data are reported by the page and how, (3) various interfaces (such as hyperlinks and buttons—without limitation) for modifying data, (4) various interfaces for effecting navigation and the activation of actions that may control navigation and/or modify the underlying database.

Action nodes correspond to software modules that may be interfaced with the pages in order to decide the next step of a web application and manipulate complex web application state. Action nodes are optional.

Application Server & Interfaces

To interface the data manager 126 with clients 100-100a, there are a number of interface components. The application server 121 manages all communications between the host 120 and the clients 100-100a. This includes addressing messages, observing the proper communications protocol, and the like. Also, the application server 121 directs incoming messages from clients to either a user interface 123 or a design interface 122 as appropriate. In addition to any added functionality of the present disclosure, the application server 121 acts to carry out the various known tasks of a web application server.

The user interface 123 enables users' access to the web applications hosted by the host 120. In response to user request, the user interface 123 may utilize the data manager 126 to retrieve data from the application database 155 and pass them to a rendering engine 134 (described below).

In contrast to the user interface 123, the design interface 122 enables designers operating clients 100-100*a* to design web applications. In some embodiments, the design interface 122 may provide many or all of the functionality provided by the user interface while in other embodiments the design interface may provide design functionality exclusively. Broadly, the design interface 122 relays user commands that affect the application sketch 153 to the corresponding modules.

The design interface 122 comprises sub-modules that perform various tasks, these sub-modules including (in one example, without any intended limitation): (1) a page access rights interface 140 that the designer utilizes to specify which groups of users have access to each page, (2) a semantic combination interface 141, which allows designers to specify how data of other pages are potentially combined and reported in the currently designed page, (3) a field creation interface 142, which allows designers to create interfaces for the collection of new data, and (4) a data access right interface 143 that controls the data display, edit, remove, and insert interfaces that web application users have on the currently-designed page.

Data Manager

The data manager 126 oversees users' data storage and retrieval from the application databases 155. During the design mode of the application, the data manager 126 may also (1) assist the creation and modification of the application schemas 154 as directed by the inference engine 123, and (2) assist the creation and modification of application sketches as directed by the schema inference engine 124 and the data combination module 123.

The inference engine 123, schema inference engine 124, and data combination module 125 are discussed in greater detail below.

Rendering Engine

Basically, the rendering engine 134 produces a dynamic web page instance by transforming the retrieved database data into a web page according to the page sketch. This page is displayed by the user interface 123. In response to user request, the user interface 123 may also effect insertions, deletions and modifications of data in the database.

Without any intended limitation, the rendering engine 134 may serve to prepare browser compatible information sets such as HTML or another markup language.

In one embodiment, the rendering engine operates as an interpreter of the sketch, whereas in every step it inputs the page sketch and the data and produces a web application page. A number of rendering frameworks may be used for the implementation of such a rendering engine, involving server-side only or both server-side and client-side computation.

In a different embodiment, the functions of the rendering engine may include compiling code. In this embodiment, the rendering engine inputs an application sketch and compiles the corresponding code. Such compiled code need only receive data needed for pages; it does not need to receive the application sketch since the code already reflects the application sketch information. The performance and flexibility trade-offs of the two embodiments are typical of the trade-offs between interpreted and compiled versions of software. Without any intended limitation, examples in the present disclosure utilize the interpreted version for ease of explanation.

Inference Engine

Broadly, the inference engine 123 acts to automatically create data structures representative of pages of a database-driven application, including various fields introduced into the pages. The inference engine 123 automatically relates fields of the pages to data structures in accordance with a predetermined logic, as described in greater detail below. As one example, the inference engine 123 may act to automatically convert high-level user input submitted by a graphical user interface into actions to create and modify data structures, thereby providing a powerful but easy-to-use database-driven application.

The inference engine 123 includes a schema inference engine 124 and a data combination module 125.

The schema inference engine 124 automatically infers how to modify the application sketch and how to infer or modify the application database schema so that they serve the purposes of the designed web application in cases where the application database schema needs to be modified to capture what data are collected by the application. The schema inference engine 124 interprets the designers' actions/instructions that pertain to data collection into application sketch and application schema creation and modification instructions. This inferential output 124*a* is passed to the data manager 126. The schema inference engine 124 examines the pages drawn by the designer and automatically derives the application database schema (i.e., the structure of the underlying database) and parts of the web application sketch. In other words, the schema inference engine 124 analyzes the field structure of the drawn pages and other aspects of the web application, and infers the structure (schema) of the underlying database.

As described in greater detail below, this permits designers to design their web applications using intuitive, largely graphical actions. Based on the client's submitted instructions, the schema inference engine 124 makes various predetermined inferences in order to identify the appropriate instructions, of significantly more specificity, for transmittal to the data manager 126. The operation of the schema inference engine 124 is described in greater detail below.

Broadly, the data combination module 125 infers how to modify the application sketch so that it serves the purposes of the designed web application in cases where the application sketch needs to be modified to capture how the designed application reports data.

In a more specific example, the data combination module 125 accomplishes three related tasks. For one, it inspects designer preferences and the application sketch, schema and, in special cases also the database and suggests to the designer semantically meaningful ways to combine and report data. The inferential output 125*a* of this activity is passed to the design interface 122 and, in particular, the semantic combination interface 141. The second task of the data combination module 125 is to interpret the designers' actions/instructions that pertain to data combination, filtering (including filtering induced by access rights to the data of a page) and reporting into application sketch. The inferential output 125*a* of this activity is passed to the data manager 126, which updates the application sketch accordingly and, in special cases discussed later, may also effect actions on the application schema and application database. The third task of the data combination module 125 is to formulate queries (which can be computed or retrieved from the sketch) and appropriately query the database in order to retrieve the data that are needed by certain pages and updates (also attached to the sketch) that update the application database with the data submitted by the user Data Structure Detail: Fields & Sketches According to the disclosure, the functionalities and presentation aspects of a page are described in a sketch by an appropriate field structure. Those trained in the art (and having the benefit of this disclosure) will be able to employ appropriate techniques for modularizing and separating the presentation aspects of the page sketch and its fields from the functionality aspects of the page sketch and its fields.

In the described embodiment, the sketch accommodates the following field types: data collection, report, hyperlink, iterator.

When the database driven application is operated by and end-user, the rendering engine 134 receives the sketch and produces a web page instance, often by combining the sketch 153 with data received from the application database 155. The web page instance consists of field instances, whereas each field instance corresponds to a field of the sketch. However, a field of the sketch may correspond to zero or more field instances. The correspondence between fields and field instances is explained in detail by this disclosure's description of the operation of the rendering engine.

Detail: Common Components of Fields

In the described example, every field is associated with a widget, logical specification, design guide, and initialization/default policy.

Widget. The widget associated with a field specifies the type of field instance that will be included in the web page instance when the particular field is rendered, including presentation aspects of the field instance such as (but not limited to) the font and size of print letters, etc. It is also possible to associate a field with more than one widgets. In such case, depending on the context created for the field instance, the field instance may be based on a different widget.

Logical Specification. The logical specification specifies field aspects such as the association of the field with the application schema and the data type associated with the particular field. The logical specification aspects of a field are dependent on the field type (i.e., data collection, report, hyperlink, iterator) and the widget choice for this field, i.e., there are logical specification aspects that pertain to particular widgets only.

Design Guide. The design guide of a field provides to the designer the ability to specify the widget and its logical specification. The design guide is dependent on the widget, since different widgets may have different customization options.

Initialization/default policy. The initialization/default policy specifies the default configuration of properties of the logical specification of the widgets that have not been set. The initialization policy for a field may recursively invoke the initialization policies for the fields that it contains.

Detail: Data Collection Fields

A data collection field is a field that leads to the collection of new data, i.e., data that do not overwrite prior data. Furthermore, introduction of a data collection field leads to modification of the schema to define a new record field. Data collection field instances may comprise input forms on the dynamic web page instance that is presented to the user. For example, but without any intended limitation, in an HTML rendering of the web page instance, a data collection field instance may be implemented as a HTML text box or a HTML dropdown menu, depending on the chosen widget. In this regard, detail on the specifics of HTML is widely known by ordinarily skilled artisans. The data collected by data collection field instances during the use of the application are written in the database by means of insert operations or, potentially, update operations that do not overwrite previously collected data. A data collection field instance does not have to be always rendered as an input form, as will be illustrated in examples below. According to the definitions of this disclosure, a data collection field is a separate concept from a report field that is in edit mode, as described in the next paragraph.

Detail: Report Fields

A report field leads to the reporting of data that have been collected by one or more other pages and/or action nodes. The reporting can involve a number of functions, such as the ones listed below, without any intended limitation: (1) show data collected in another page, (2) show data reported in another page, (3) perform a computation that combines and transforms data collected by other pages according to (1) or (2). A report field is rendered by the rendering engine as a report field instance. A report field may also operate in edit mode, in which case it appears an input field and allows one to overwrite the reported data. According to the definitions of this disclosure a report field that is in edit mode is a separate concept from a data collection field.

Detail: Hyperlink Fields

A hyperlink field is a field that displays a hyperlink to a page instance of the application. When a hyperlink field appears in an iterator, there are produced as many instances of the hyperlink field as the number of record instances of the iterator. Each one of those hyperlink instances transfers to a different page instance, where the particular instance is conditioned by the context created by the particular record instance, as will be displayed next.

Detail: Iterator Fields

An iterator field (in short, iterator) contains other fields, which recursively may be iterators themselves. An iterator is called a report iterator if it contains report fields. Basically, from the designer's point of view, a report iterator combines and reports the data collected or reported in one or more other pages. In a web page instance a report iterator instance has a repeating structure that shows zero or more records that have been obtained by combining data of one or more other pages.

A report iterator's logical specification contains data that lead to the inference of a parameterized query Q. Basically, this query is responsible for fetching the records that the report iterator instance displays. During operation the use interface 123 instantiates the parameters of the query Q and instructs the data manager 126 to fetch records by running the instantiated query. The data manager returns zero or more records. These records are used by the rendering engine 134 in order to produce the report iterator instance.

A report iterator may be associated with widgets that have a repeating part, in order to accommodate the fact that zero or more records may need to be rendered. One example is a table widget, which is the most common way of rendering reports. The table widget has a header footer part and a repeating row structure that displays the records.

In some cases the query Q of an iterator is guaranteed to return at most one tuple. Such iterators are referred to herein as singleton iterators.

An iterator is called data collection iterator if it contains data collection fields. In the described embodiment, an iterator (and corresponding the iterator instances) may be: (1) a report iterator (respectively, report iterator instance), (2) simultaneously a report and data collection iterator (basically, a report and data collection iterator instance collects data by providing data collection fields while it also has other fields that are report fields); (3) a data collection iterator (instance).

Collaboration Aspects and Access Rights

Introduction

Designers of web applications need to coordinate (1) which users or groups of users have access to each page of the application, (2) read access restrictions: once a user access a page what access restrictions (limits) are placed with respect to data that this user can read, (3) edit restrictions: what access restrictions apply with respect to the ability of the user to edit the displayed data, (4) delete restrictions: what access restrictions apply with respect to the ability of the user to delete displayed data, (5) insert restrictions: what access restrictions apply with respect to the ability of the user to insert data.

Page-Level Access Rights

The designer may associate a group of users with each page. Consequently only those users can have access to (instances of) this page.

In more elaborate embodiments of page-level access rights, the designer may make access to a page, for a certain group of users, contingent on a condition being true. Such conditions may or may not depend on the data of the application database.

Top Iterator (Data-Level) Access Rights

In the presented embodiment data-level access rights are implemented by attaching to the iterator field-based conditions that restrict which data records will be displayed/editable/removable. Therefore the disclosure also calls such data-level access rights to be iterator-level access rights. Iterator-level access rights are properties of the logical specification of the iterator fields. The presented embodiment includes, but is not limited, to the following:

Data Collection Right thief this right is provided then the corresponding iterator instances always provide to the users appropriate interfaces by which the users can input new data records in the web page instance.

Display Right: In the presented embodiment the display right of an iterator controls whether the corresponding iterator instances display data records. While the display right has to be enabled for report iterators, it may also be enabled for data collection iterators, the meaning being that the data collection iterator displays the data it has collected.

Delete Right: Basically, when a top-level iterator has the delete right enabled the corresponding iterator instances provide to the user appropriate interfaces (such as "delete" buttons, "delete" hyperlinks, or "delete" checkboxes) by which the users can request that particular displayed records are deleted from the page and therefore from the database also. The delete right may be inapplicable or its meaning may require further input from the user in cases where the report iterator performs certain complex data combinations and transformations, as described below.

Edit right (on iterators): Basically, when a top-level iterator has the edit right enabled the corresponding iterator instances provide to the user appropriate interfaces (such as buttons, hyperlinks, or checkboxes) by which the users can request that particular displayed records are edited.

Edit mode and display mode: Upon the user requesting an edit of a top-level record the presented embodiment places the corresponding record in edit mode. Normally records are in display mode. A field instance that is in edit mode can receive input while a basic field instance that is in display mode simply displays. Placing a record in edit mode does not automatically imply that the field instances of this record are placed in edit mode. Vice versa, a field instance may be in edit mode, even if its enclosing record is in display mode.

According to the presented embodiment a basic field instance is in edit mode or display mode according to a function that considers (1) the (edit versus display) mode of the enclosing record and (2) edit rights associated with the field.

One embodiment of such a function assumes each basic field is associated with an edit right and this edit right takes the following three values: (1) "Edit Disabled": If the edit right is disabled then this basic field is always on display mode, even when its enclosing record is in edit mode. (2) "Edit Always Enabled": If the edit right is "always enabled" then this basic field is always in edit mode, even if its enclosing record is in display mode. (3) "Edit Upon Request": If the edit right is "edit upon request" then the basic field is in edit mode if and only if its enclosing record is in edit mode.

The field instances that correspond to this node will be placed (or not) in edit mode based. Next, the discussion addresses how the basic (non-iterator) field instances that correspond to this record will respond.

Access Rights of Nested Iterators

One novelty of the present disclosure is the possibility to have iterators nested within iterators. The nesting of iterators raises issues regarding how to control the mode (edit versus display) of the fields of nested iterators, as well as how to control the availability of interfaces for data collection, record deletion and record editing in inner iterators. In many cases, the most appropriate behavior is that a nested iterator instance provides data collection, edit and delete right interfaces only if its enclosing record is in edit mode. Such behavior is enabled by extending the access rights of iterators as follows, when they are nested.

Each one of the data collection, edit and delete rights of nested iterators may take one of three values: (1) "Disabled" (2) "Always Enabled" (3) "Tracks Enclosing Record's Edit (TERE)". If the data collection right is disabled then the corresponding iterator instance does not provide interfaces for inserting new data, regardless of the mode of the enclosing record. If the data collection right is always enabled then the corresponding iterator instance always provides interfaces for inserting new data, regardless of the mode of the enclosing iterator. Finally, if the iterator "tracks the enclosing record's edit" then the iterator instance provides interfaces for inserting new data only if the enclosing iterator is in edit mode.

The behavior of the edit and delete rights is similar.

Exemplary Digital Data Processing Apparatus

As mentioned above, data processing entities (such as the clients 100-100a, host 120, subcomponents 121-134, etc.) may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
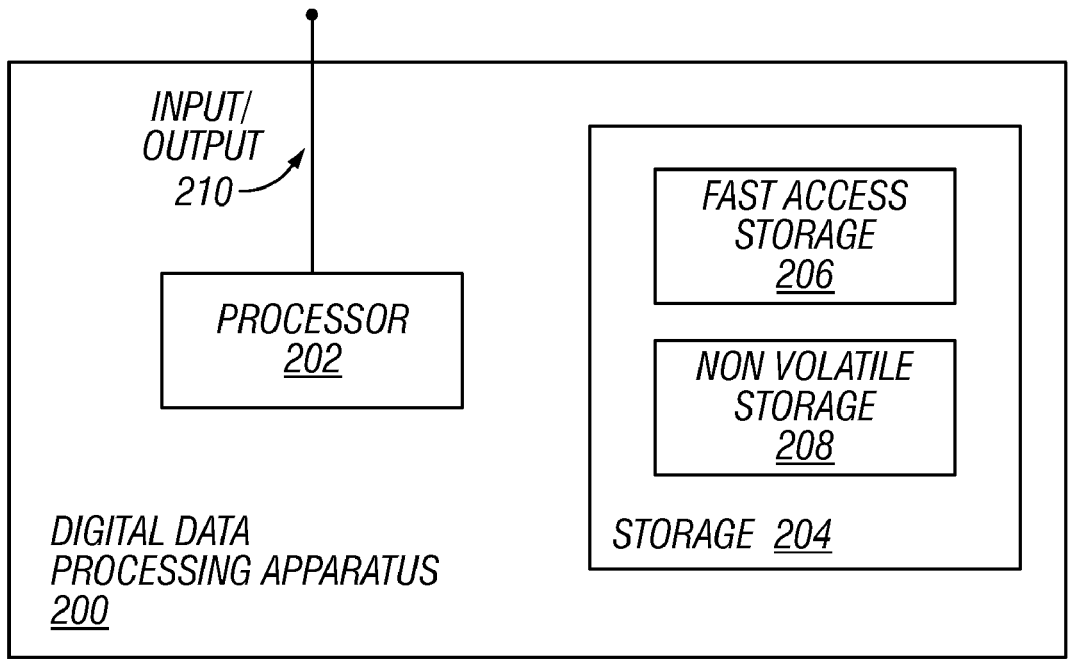
FIG. 2 is a block diagram of a digital data processing machine.
Figure 3:
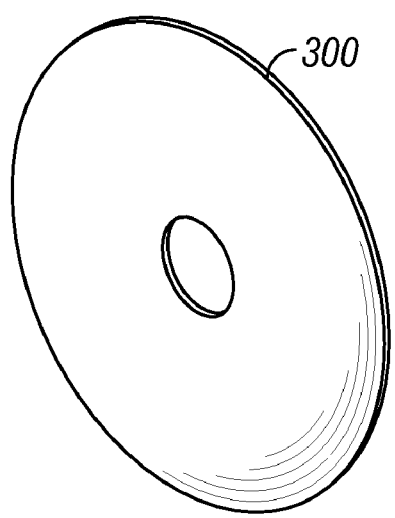
FIG. 3 shows an exemplary signal-bearing medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, or other means for the processor 202 to exchange data with other hardware external to the apparatus 200.

Signal-Bearing Media

As mentioned above, various instances of digital data storage may be used, for example, to provide storage used by the system 101 (FIG. 1A), to embody the storage 204 and 208 (FIG. 2), etc. In one example, some more specific examples of digital data storage components include the schemas 154, sketches 153, and tables 130.

Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the signal-bearing media may be implemented by nearly any mechanism to digitally storage machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to signal-bearing media that contain machine-executable instructions (as described above), a different embodiment may employ logic circuitry to implement processing certain features.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
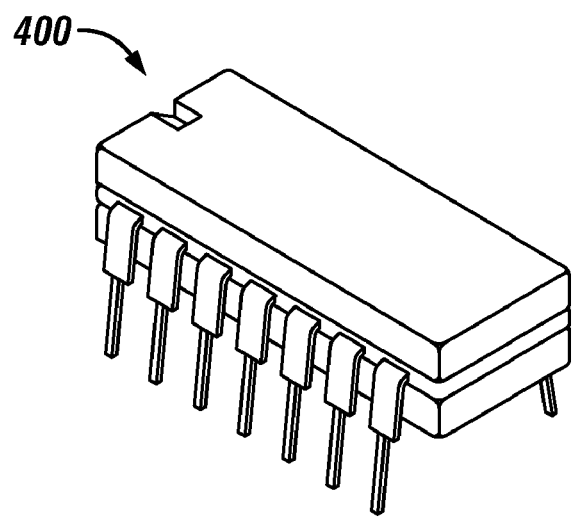
FIG. 4 is a perspective view of exemplary logic circuitry.

FIG. 4 shows an example of logic circuitry in the form of an integrated circuit 400.

Operation

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

Overall Sequence of Operation

Figure 5:
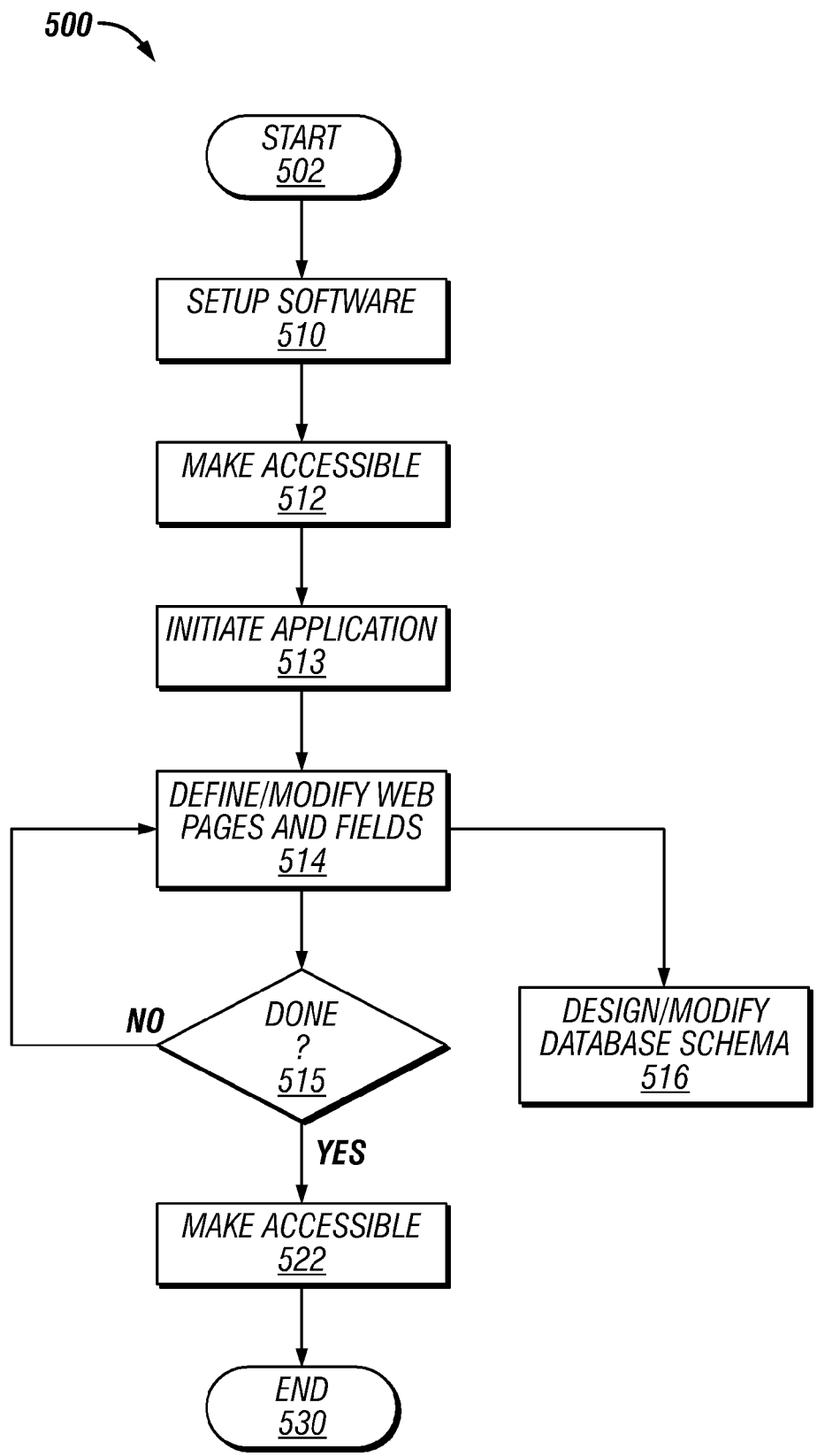
FIG. 5 is a flowchart showing an example of one overall operating sequence.

FIG. 5 shows a sequence illustrating one example of the method aspect of this disclosure. Broadly, this sequence provides an overview of the operations of installing and utilizing web application design software, as well as the subsequent operations of making the finished product available to users. For ease of explanation, but without any intended limitation, the example of FIG. 5 is described in the specific context of the system 101 (FIG. 1A) described above.

The sequence 500 is initiated in step 502. In step 510, software setup occurs. Namely, operators design, install, and configure the components 121-134 of the host 120. This may be performed by one person, a team, or a series of different people. In one example, programmers design the components 121-134, and system administrators install the completed product on the host 120. Regardless of the progress in the sequence 500, step 510 may be repeated in order to modify, update, improve, expand, or otherwise change the host programming.

In step 512, people make the completed product accessible to (web application) designers and their end users. For instance, step 512 may involve making the host 120 available online in the form of an Internet web site. As a prerequisite to using the host 120, this Internet web site may require prospective application designers to register, submit a fee, agree to a payment contract, or take other such action.

Step 513 shows an operation where an exemplary designer accesses the host 120 to set up a web application. As discussed in greater detail below, this is achieved by the designer operating the design interface 122 to define and modify various web pages and fields.

In response to mostly graphical actions of the designer in step 514, the schema inference engine 124 interprets these actions and carries out representative tasks of designing and modifying the corresponding application's sketch and database schema 154 in step 516. Step 515 occurs when the designer is finished with step 514. Ultimately, responsive to the designer's completion of the web application, and designer directions to do so, the application server 121 makes the web application accessible to end users in step 522. Unlike step 512, where people manually made the host 120 accessible to web application designers and their end users, in the sense that they had to install such a host, step 522 is performed automatically by the application server 121, in the sense that it simply allows users access to the appropriate applications hosted at host 120. Namely, the application server 121 makes the designer's web application (database) available to end users in the form of an Internet web site.

The sequence 500 concludes in step 530.

Detail: Application Design

Figure 6:
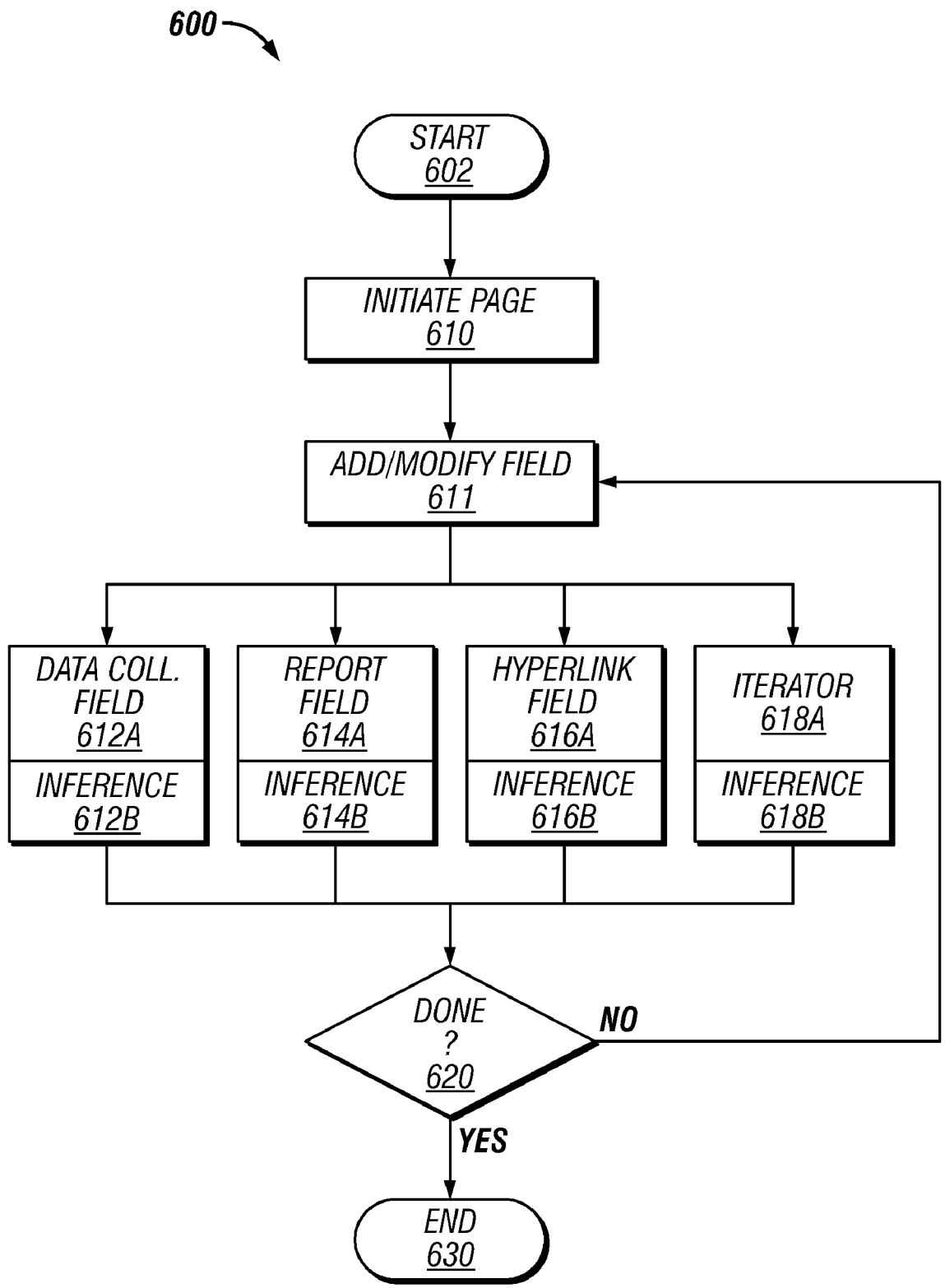
FIG. 6 is a flowchart showing a more specific example of one operational feature.

FIG. 6 illustrates greater detail of an exemplary process of designing a database-driven web application and implementing the corresponding schema 154 and sketch 153. Without any intended limitation, this process is described to illustrate the operations of steps 514-516 (FIG. 5) in greater detail. For ease of explanation, but without any intended limitation, the example of FIG. 6 is described in the specific context of the system 101 (FIG. 1A) described above. In this discussion, actions performed by a designer are assumed to be performed using a client machine (such as 100-100a) to access functions of the host 120.

The sequence 600 begins in step 602. As illustrated, the process starts (step 602) when step 514 (FIG. 5) is first performed. In step 610, a designer operates the design interface 122 to initiate one or more pages. As an alternative, or additional operation, the host 120 may provide one or more template starter pages to designers. In this case, the operation 610 may be replaced with an operation of selecting a template.

Next, the designer adds a new field or modifies an existing field (step 611). This operation is described in greater detail by steps 612a-618a. Each such operation 612a-618a is followed by a respective operation of making an inference (operations 612b-618b) that modifies the application sketch and the database application schema.

Operations 612a-618a depict the operations of a designer adding/modifying respective field types that include (in this example): input, display, hyperlink, and iterator. Responsive to each user action 612a-618a, the schema inference engine 124 and the data combination module 125 make appropriate inferences 612b-618b. The inference 612b-618b specifies the configuration of the schema 154 and the sketch 153 needed to implement the designer's input 612a-618a. The operation of the schema inference engine 124 and the data combination engine (which includes management of hyperlinks) are discussed in detail below.

Example of Database-Driven Web Application

The following discussion introduces an example of a web application in order to further illustrate examples of the components of FIGS. 1B and 1C.

This example concerns the hiring process of summer interns in a fictitious technology company. The process starts with the human resources (HR) personnel advertising, using the web application, company positions for which applicants are invited to apply. Then applicants submit their resumes through an appropriate page of the web application and declare for which of the advertised company positions they are applying. Thereafter engineers review the resumes and enter public and private comments about each applicant, as well as ratings that pertain to how strong an applicant is for each of the company positions that he applied for. For example, an applicant may get a rating of eight when judged for his strength as a software developer and get a rating of six when judged for his strength as director of engineering. Then HR personnel reviews the ratings and makes selections for interviews. An HR manager, who is the designer in this example, will be able to create a customized database-driven web application that perfectly fits the data and process needs of the above procedure.

FIGS. 7-10 show web pages that combine to form a customized web application supporting the hiring process described above. These pages correspond directly to the stages in the process: (1) "Publish Company Positions" page (accessible by the HR personnel) (2) "Submit Resume" page (accessible by applicants), (3) "Review, Comment and Rate Resumes" page (accessible by the engineers), (4) "Schedule Interviews" page (accessible by the HR personnel).

Figure 7:
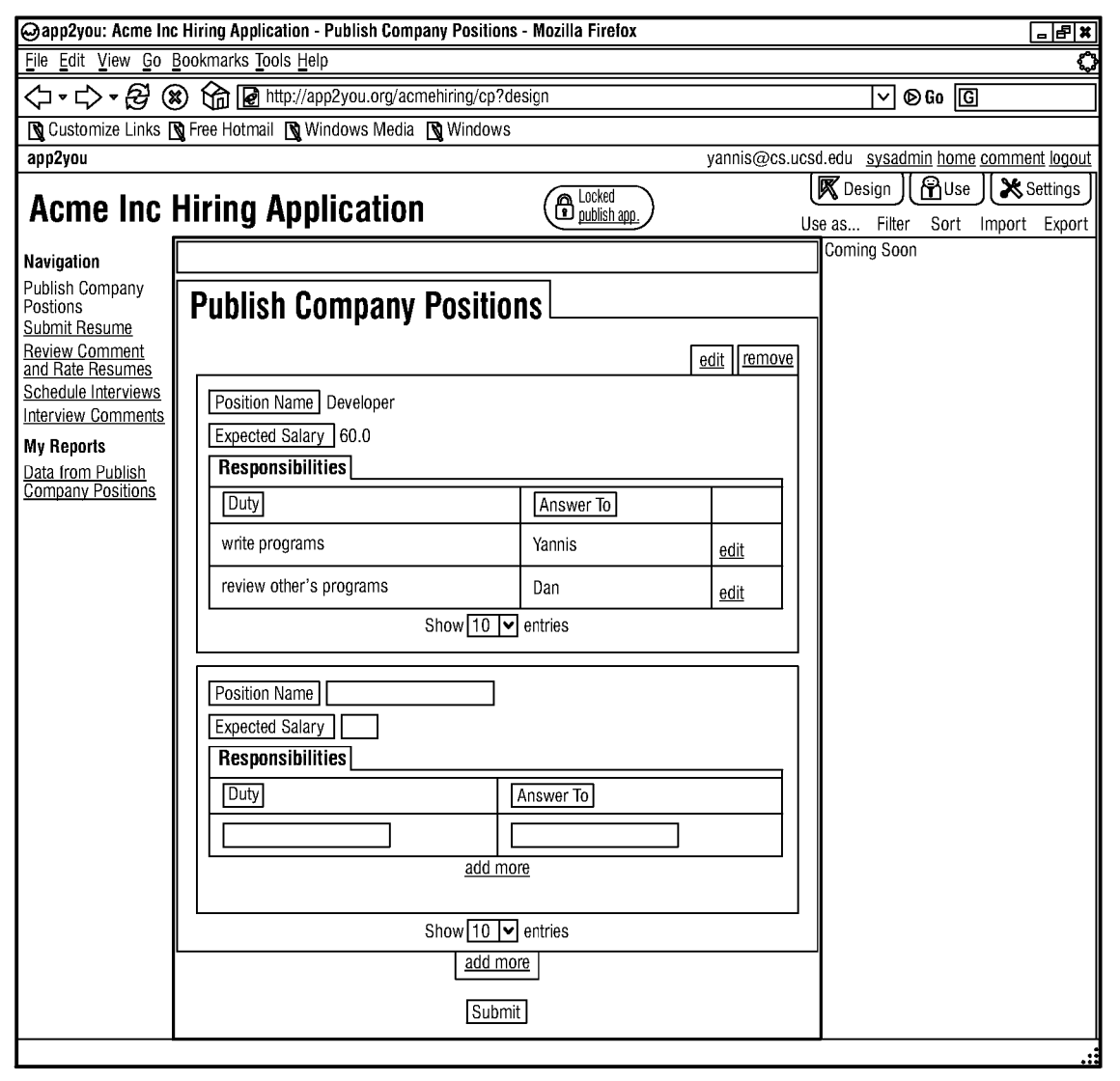

In FIG. 7, the "Publish Company Positions" pages is where the HR personnel can see the available positions and also declare new available positions by providing the name of the available position, the expected salary and the list of expected responsibilities. In FIG. 7, the example snapshot of the page, the logged-in user sees records of available positions created by other users also but is allowed to remove and edit only the records that he provided.

The field structure of the page is as follows: The top-level iterator of the page is a data collection iterator that has display and insertion enabled. Therefore, the top part of the iterator instance, which corresponds to the display part of the iterator instance, displays available positions previously posted while the lower part of the iterator instance corresponds to the interfaces for insert part of the iterator instance.

Figure 8:
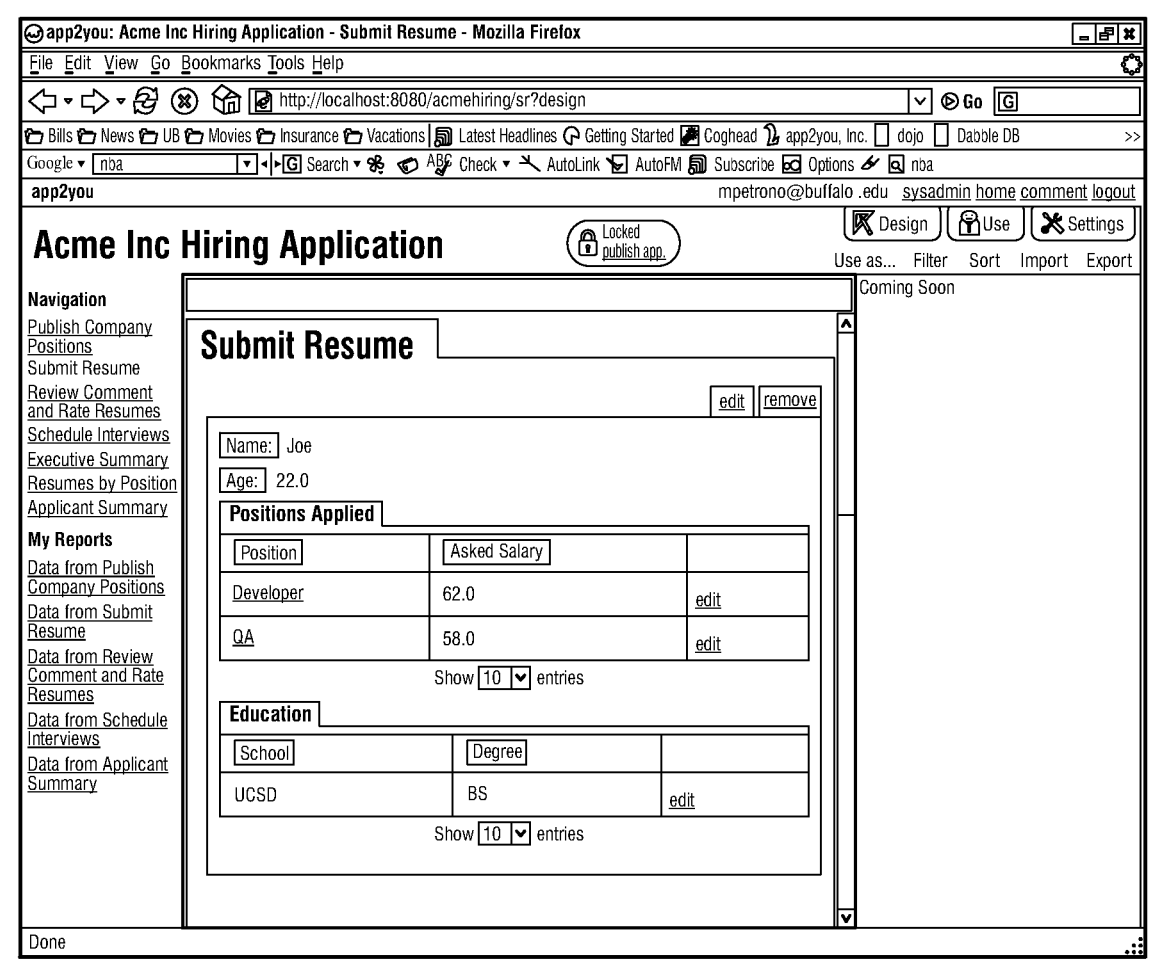

In FIG. 8, the "Submit Resume" page collects application information from the applicants. This includes personal particulars and educational background. The use of nested iterators such as "positions applied" and "education" that have more than one record for each resume. The ability to enter more than one record is indicated by the "add more" hyperlink and its enclosing box.

After the applicants have filled in their respective forms, the data can be shared and viewed by multiple parties along the hiring process. "Review, Comment and Rate Resumes" (FIG. 9) is the first web page in this process. The employees review the applications and can provide (1) public comments for each employee, i.e. comments that the other employees can also see (2) private comments, i.e., comments that only the HR personnel will see and (3) private ratings of the strength of each employee for each of the positions for which the applicant has applied.

On the right of the page, a search filter has been applied, such that only applicants who have graduated from Stanford or Berkeley are currently displayed.

Figure 10:
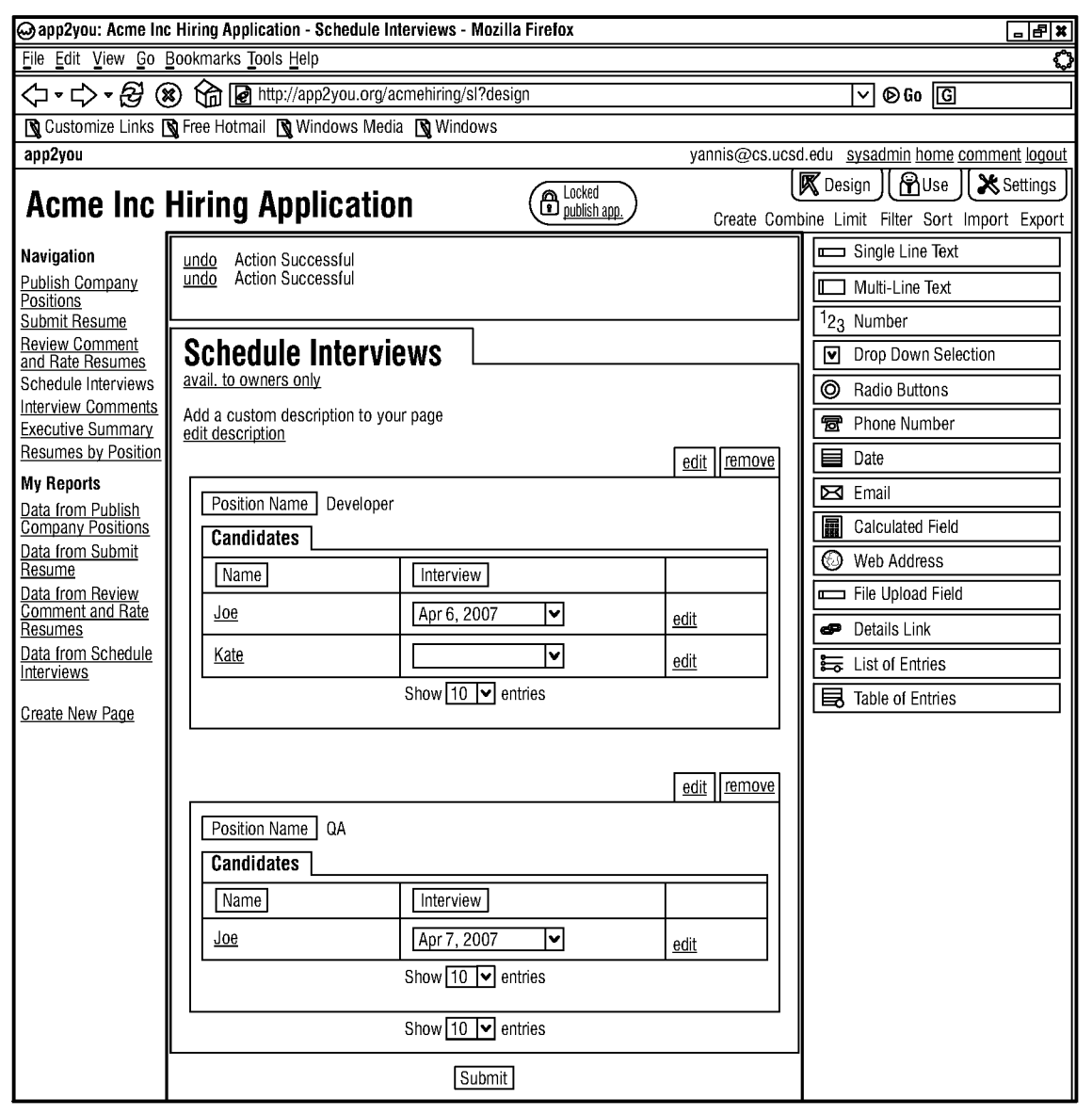

In FIG. 10, a "Schedule Interviews" page shows each available position, the names of the applicants that have applied for this position (an applicant may have applied for more than one positions) and the "Interview" column, which allows the HR person, to schedule one interview date for every pair of position and applicant interested in the position (notice that Joe has two scheduled interview dates—one for each position he is interested in).

Even though the example of FIGS. 7-10 exemplifies a short collaboration process between a small number of parties, with the current state of the art, the design of such a customized database-driven web application from scratch requires several technical activities and abilities, which are only possessed by Information Technology professionals. These include: (1) designing a database schema to store the data, (2) programming a web application to insert, retrieve, update and delete the data, (3) implementing a security scheme for user authentication and access control, and (4) making the database/web application accessible to multiple users through the Internet/internal network.

Since these technical activities require prior technical expertise, as well as implementation timeframes in the range of weeks to months, the design of customized web applications has traditionally resided in the domain of technical specialists, or those with the resources to employ their services. Techniques of this disclosure relieve owners from the above activities, thereby allowing regular, computer literate owners to easily create customized web applications within hours or minutes.

Example

Illustrating Operations of FIG. 5

The sequence of FIG. 5 is now described in the context of the example hiring application. First people deploy the completed product to a web site such as app2you.org (in this example) and make the building of applications at app2you.org available for a fee (step 512).

Figure 12:
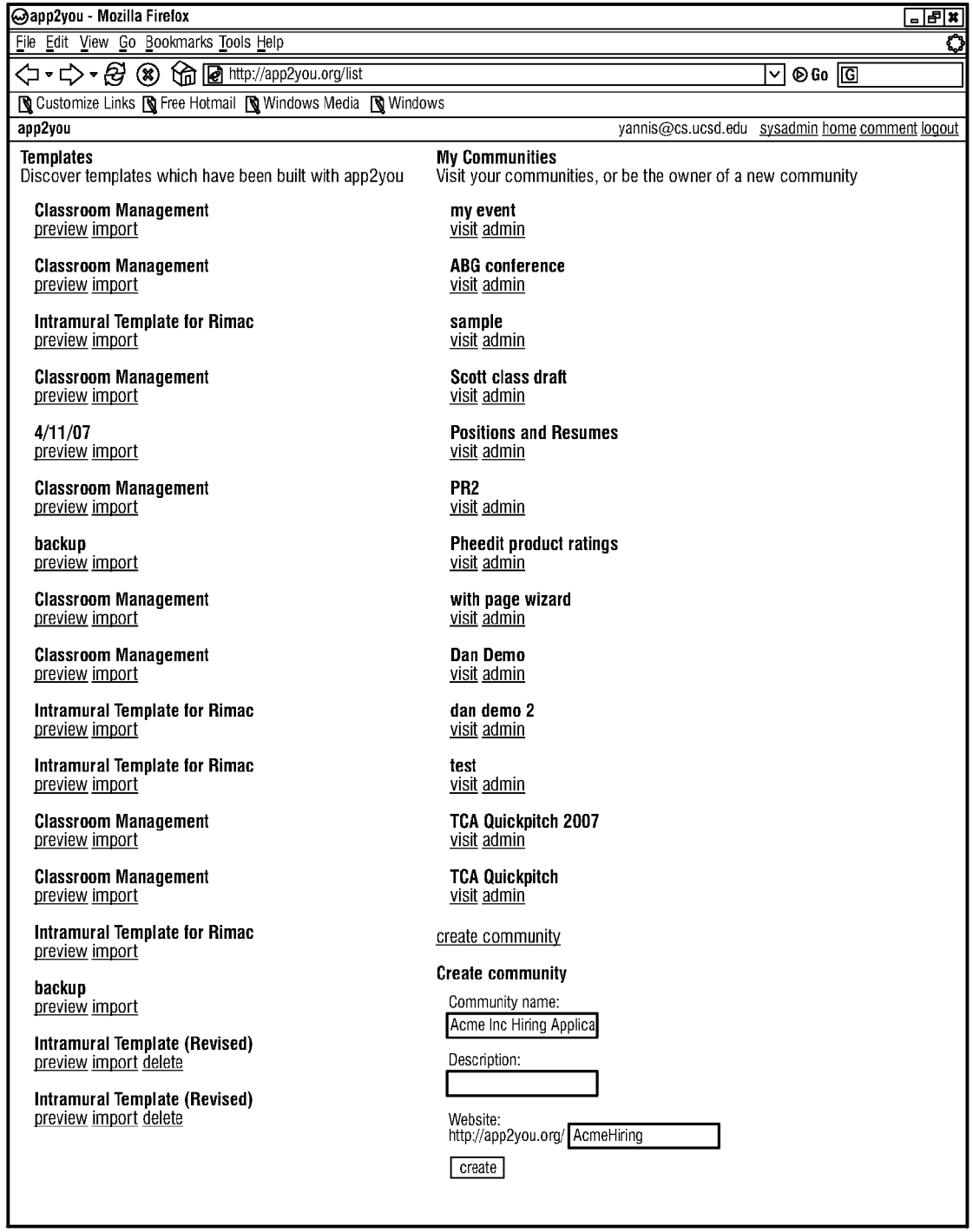
FIG. 12 is a screen shot showing an example of an interface for initiating an application.

The designer of a new application, who in this example is a member of the HR personnel, visits the web site provided by the host 120 and after signing up he reaches the page of FIG. 12 where he initiates a new application (step 513) by providing data such as the name of the application, a description of it and the URL (Internet address) of the new application. In step 514, the designer defines and/or modifies web pages and fields. The following discussion illustrates some details of operations 514.

The designer may elect to use the pages of template applications (see "install template" link in FIG. 13) or elect to build the pages of the application himself or a combination of the two. In our example, let us assume that the designer builds all the pages by himself.

Figure 13:
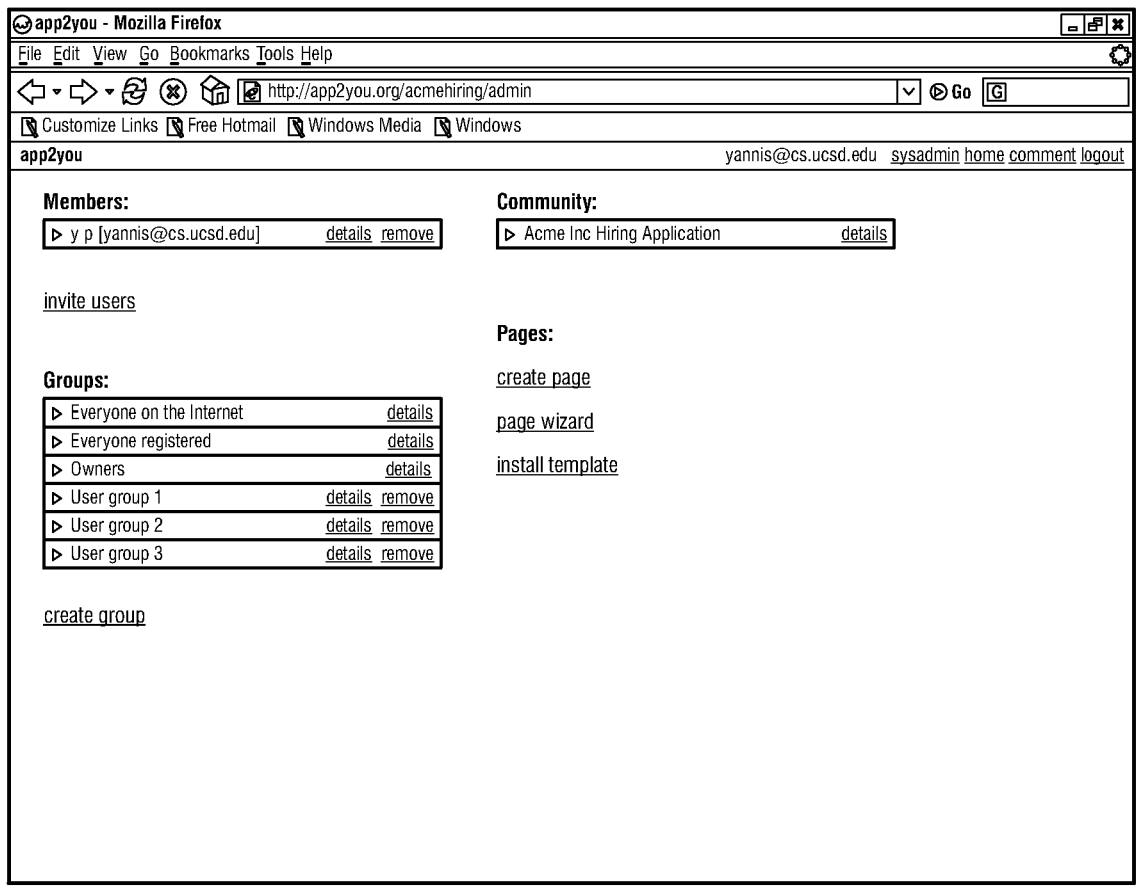
FIG. 13 is a screen shot showing an example of an interface for declaring the pages of an application.

By clicking the "create page" link of FIG. 13 the designer initiates a new page of the application and is prompted for data such as the name and the address for the new page.

Figure 14:
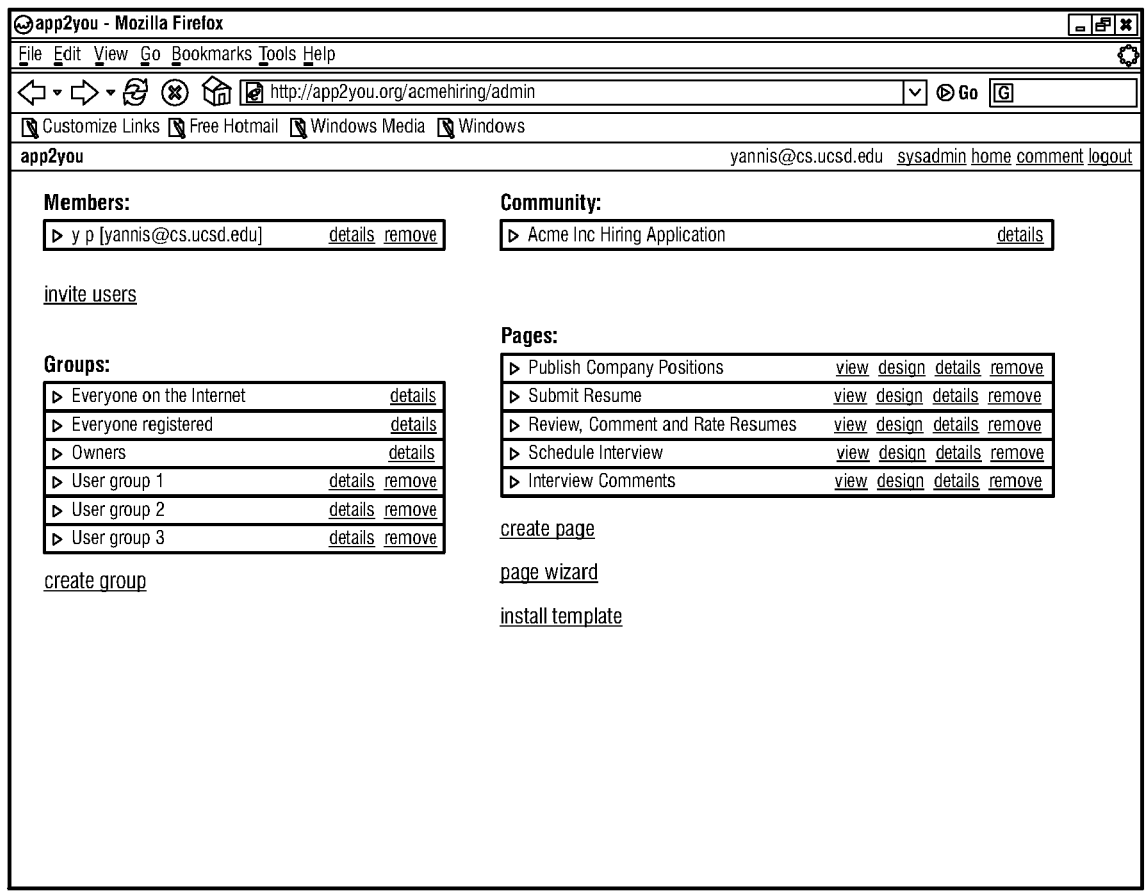
FIG. 14 is a screen shot showing an example of an interface for declaring the pages of an application (after pages have been declared).
Figure 15:
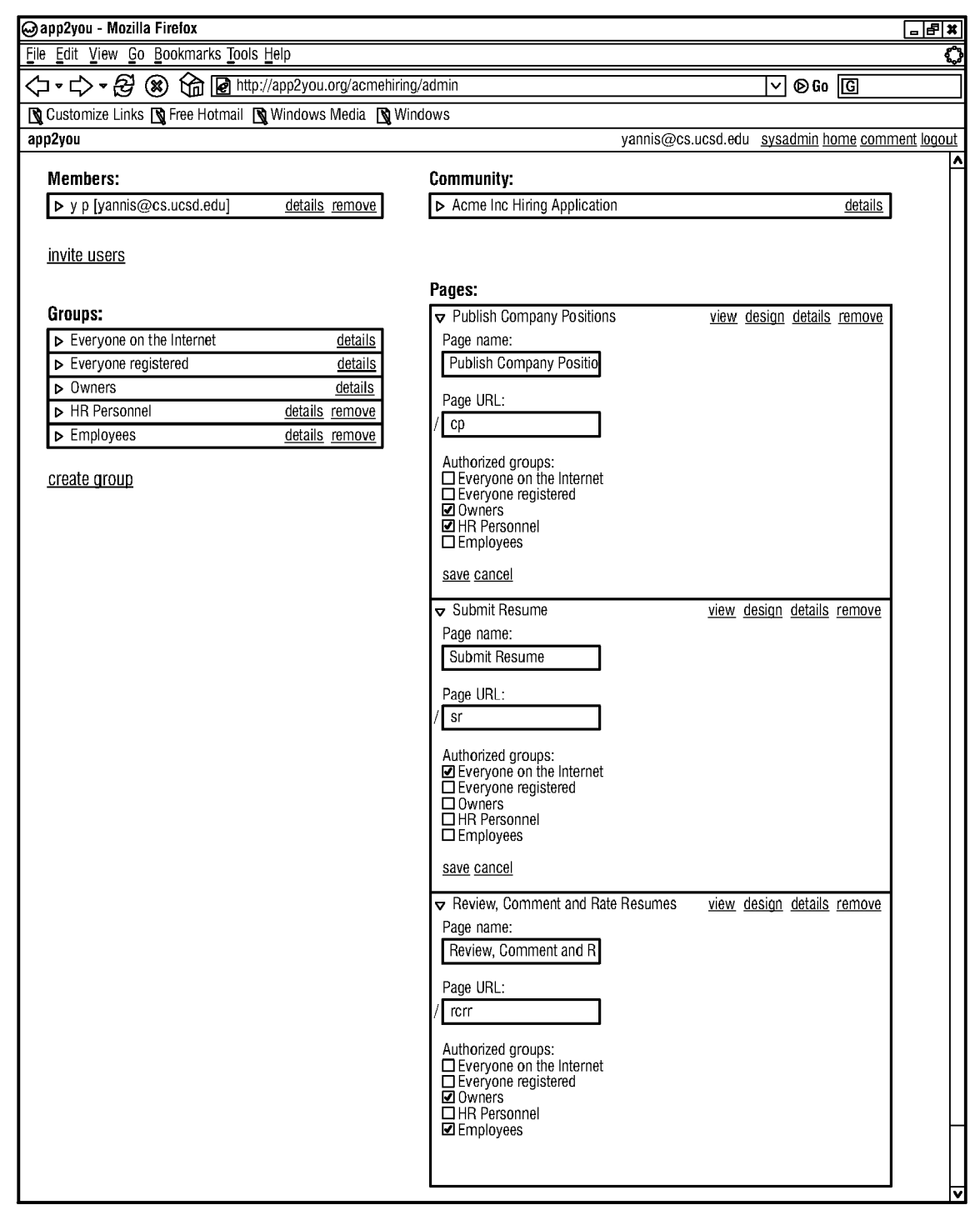

At the snapshot of FIG. 14 the designer has initiated the pages of the example application. In FIG. 15 the designer specifies which groups of users have access to each page.

Figure 16:
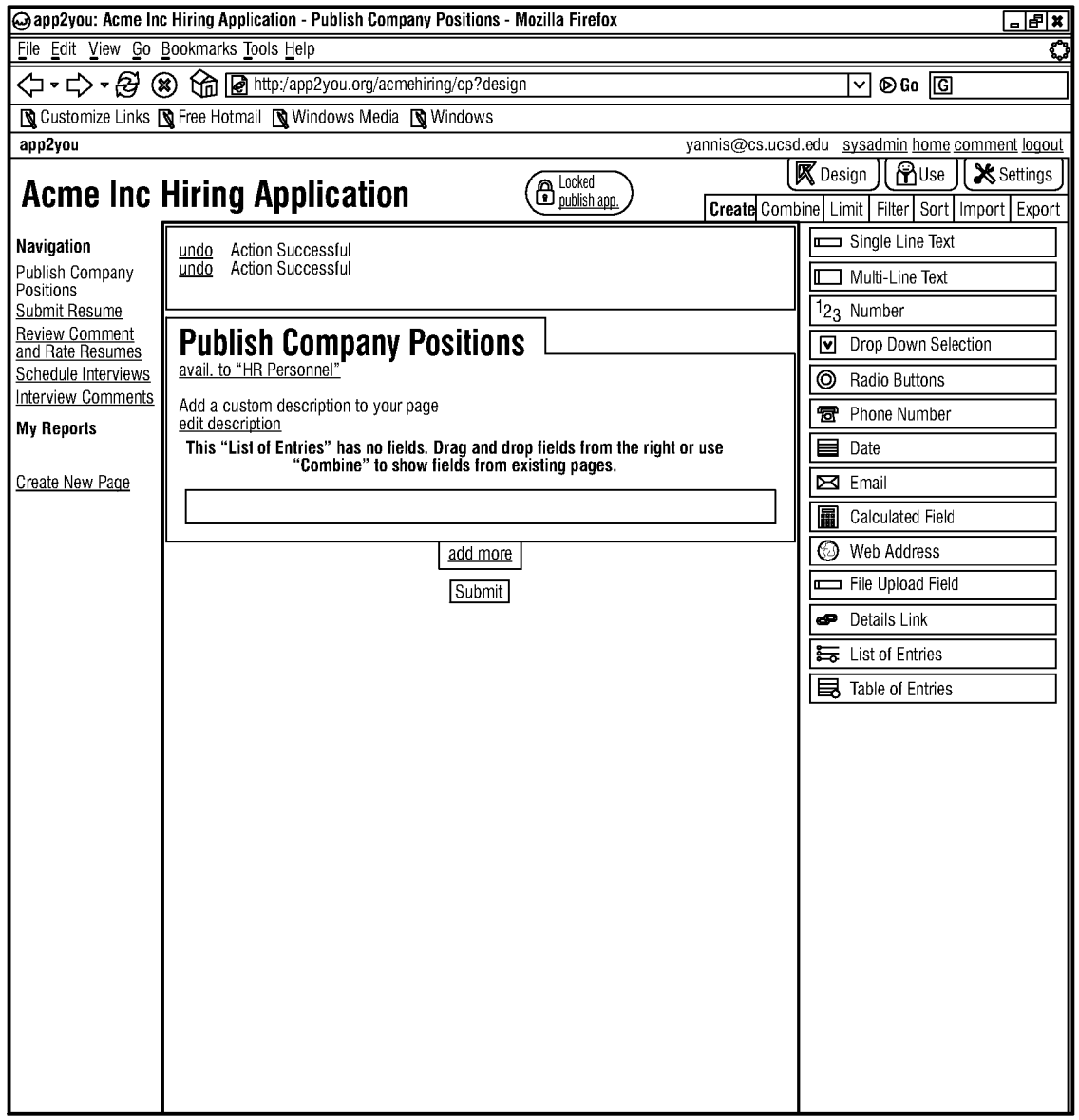
FIG. 16 is a screen shot showing an example of the design interface, in the context of the example Hiring Application.

After the designer has clicked the "design" link of a page, the application server 121 presents to the designer the page of FIG. 16 where the designer can introduce fields into the page. The snapshot of FIG. 16 is taken after the designer elected to design the "Publish Company Positions" page.

The system automatically includes in the "Publish Company Positions" page its top-level iterator. This iterator will be referred to as the "Publish Company Positions" iterator or the "top-level iterator of the Publish Company Positions page".

Figure 17:
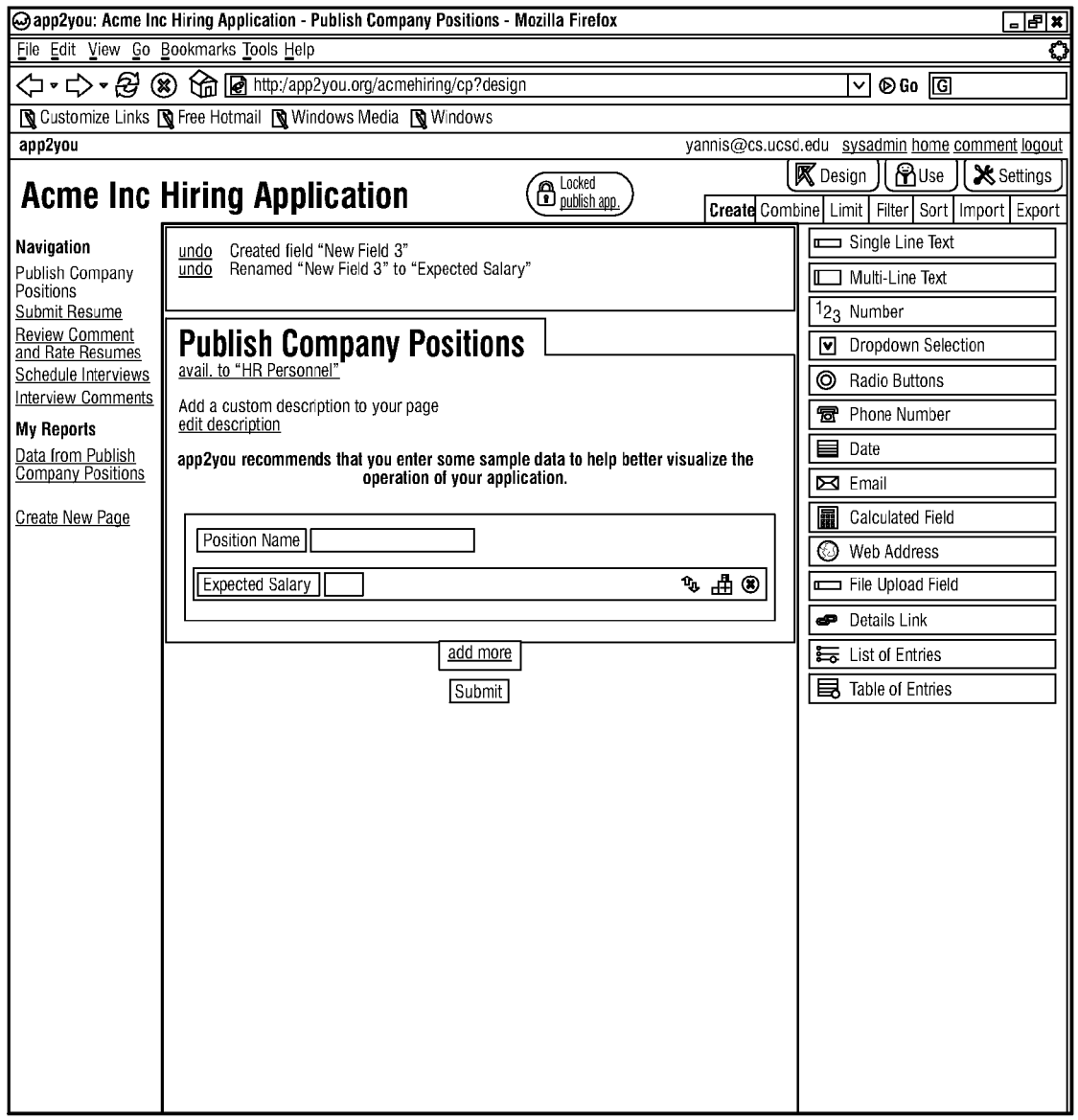
FIG. 17 is a screen shot showing an example of the design interface, in the context of the example Hiring Application, once the first two fields have been added.

In the example, the designer adds into the "Publish Company Positions" iterator the input fields "Position name" and "Expected salary" by selecting from the right column the widget "Single Text Line" for the "Position name" and the widget "Number" for the "Expected salary" (see FIG. 17).

Figure 18:
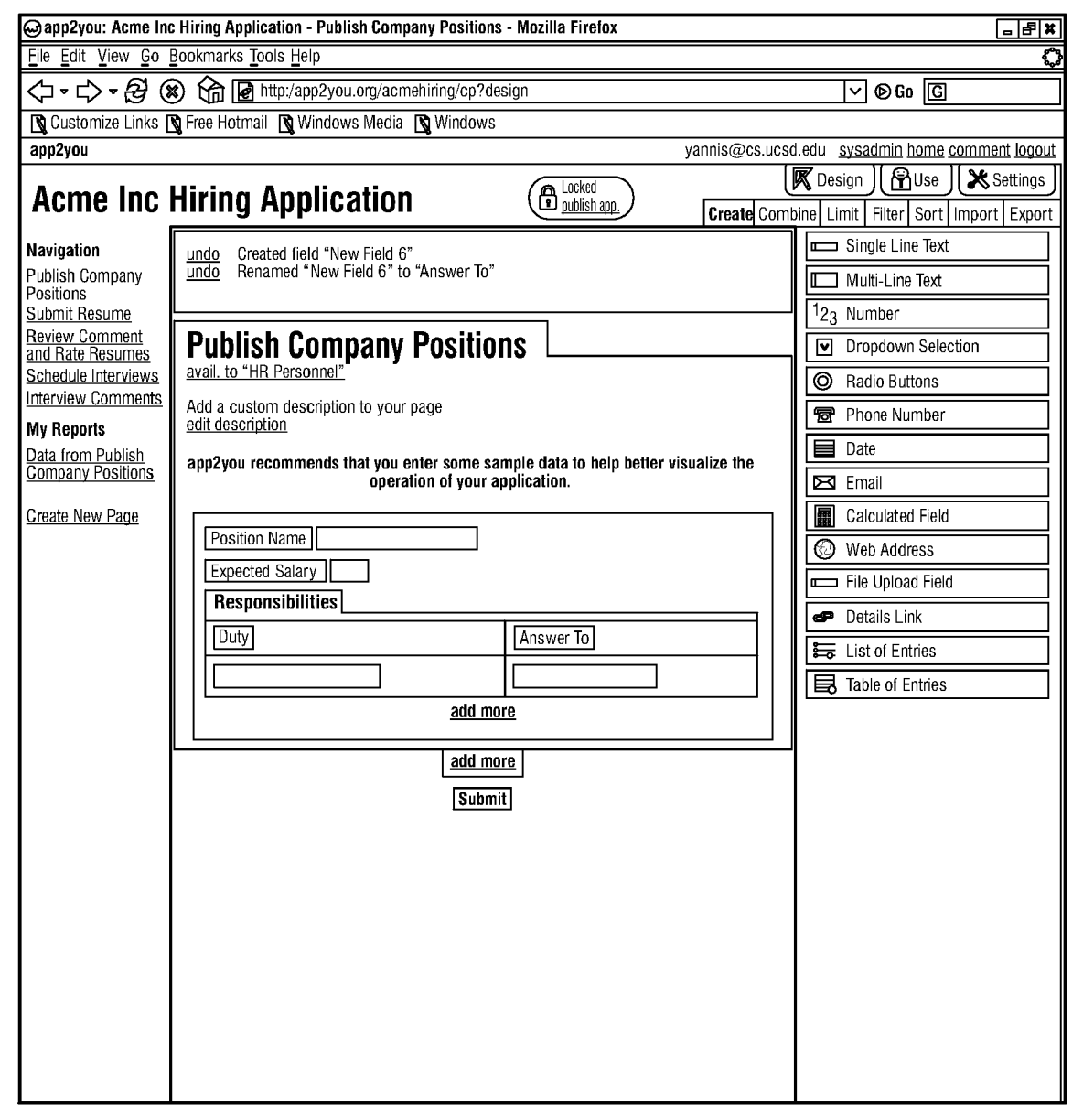

The designer also adds in the "Company Positions" iterator the data collection "Responsibilities" iterator by selecting the "Table of Entries" ("entries" is used synonymously to "records") widget from the right column, dropping it in the "Company Positions" and setting the name of the newly created field to be "Responsibilities". The action of introducing the "Responsibilities" iterator from the field creation interface 142 makes the "Responsibilities" be a data collection iterator. Consequently, using the same process the designer adds the fields "Duty" and "Answer To" in the "Responsibilities" iterator. The resulting "Publish Company Positions" page is shown in FIG. 18. At this point the part of the application schema that corresponds to the "Publish Company Positions" page has been created.

Figure 19:
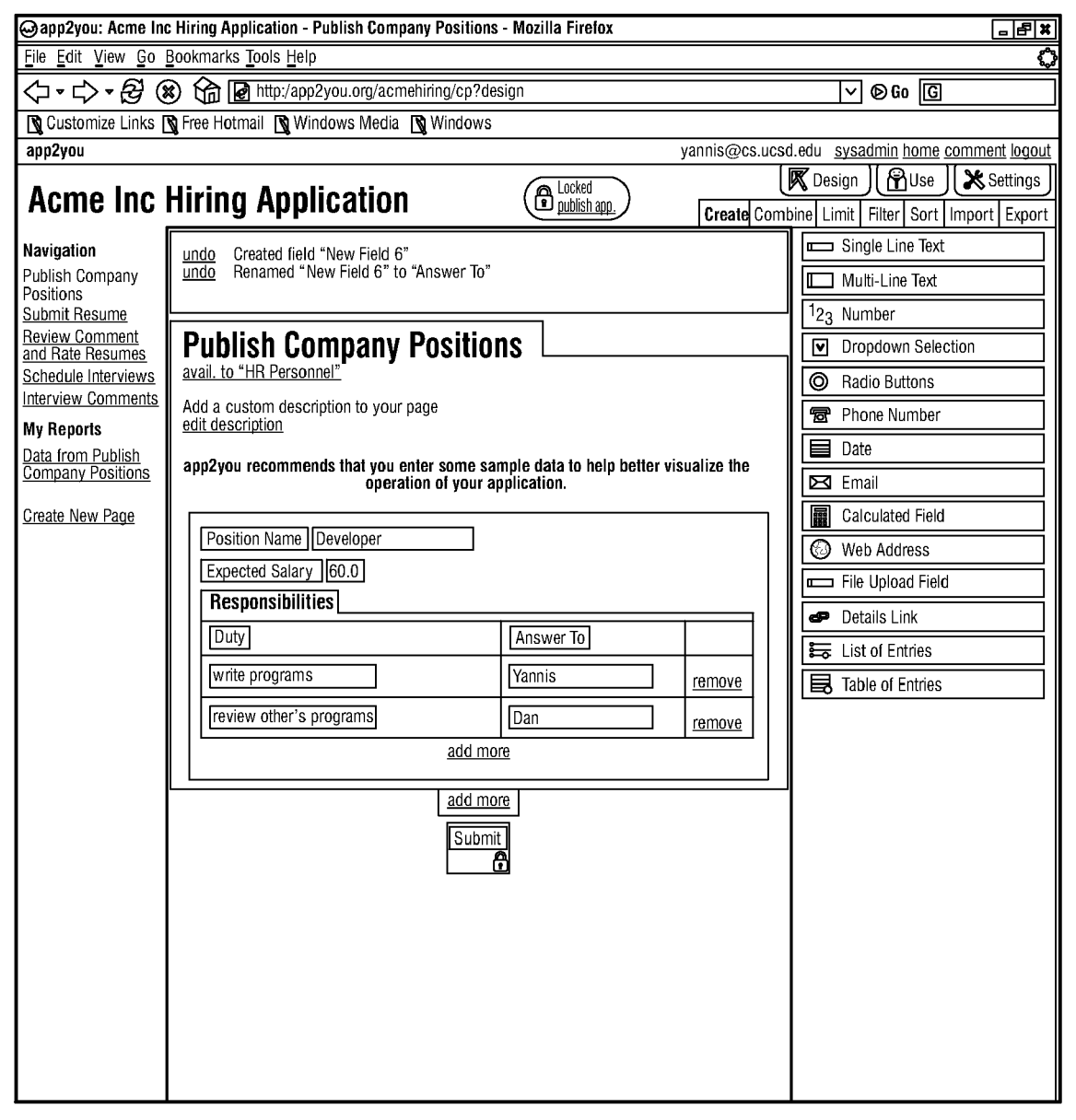
Figure 20:
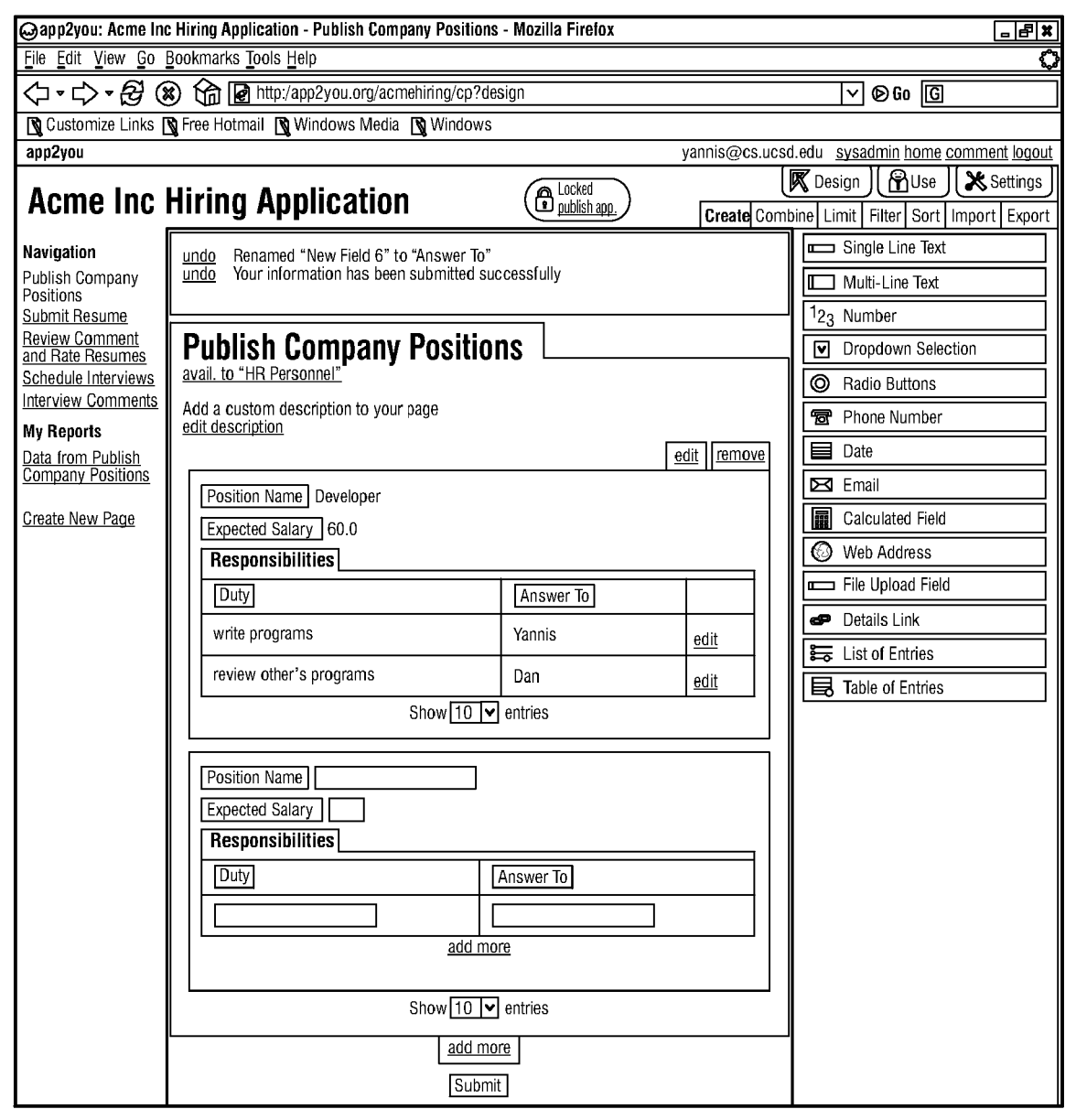

In the example embodiment the designer can obtain the experience that his users will be having using the designer's web application by submitting data to the form page. FIG. 19 shows that the designer has written data about an available company position into the input fields of the page. Upon clicking the "Submit" button the data are persistently stored in the underlying database and also appear in the report part of the "Publish Company Positions" iterator, as shown in FIG. 20.

Figure 21:
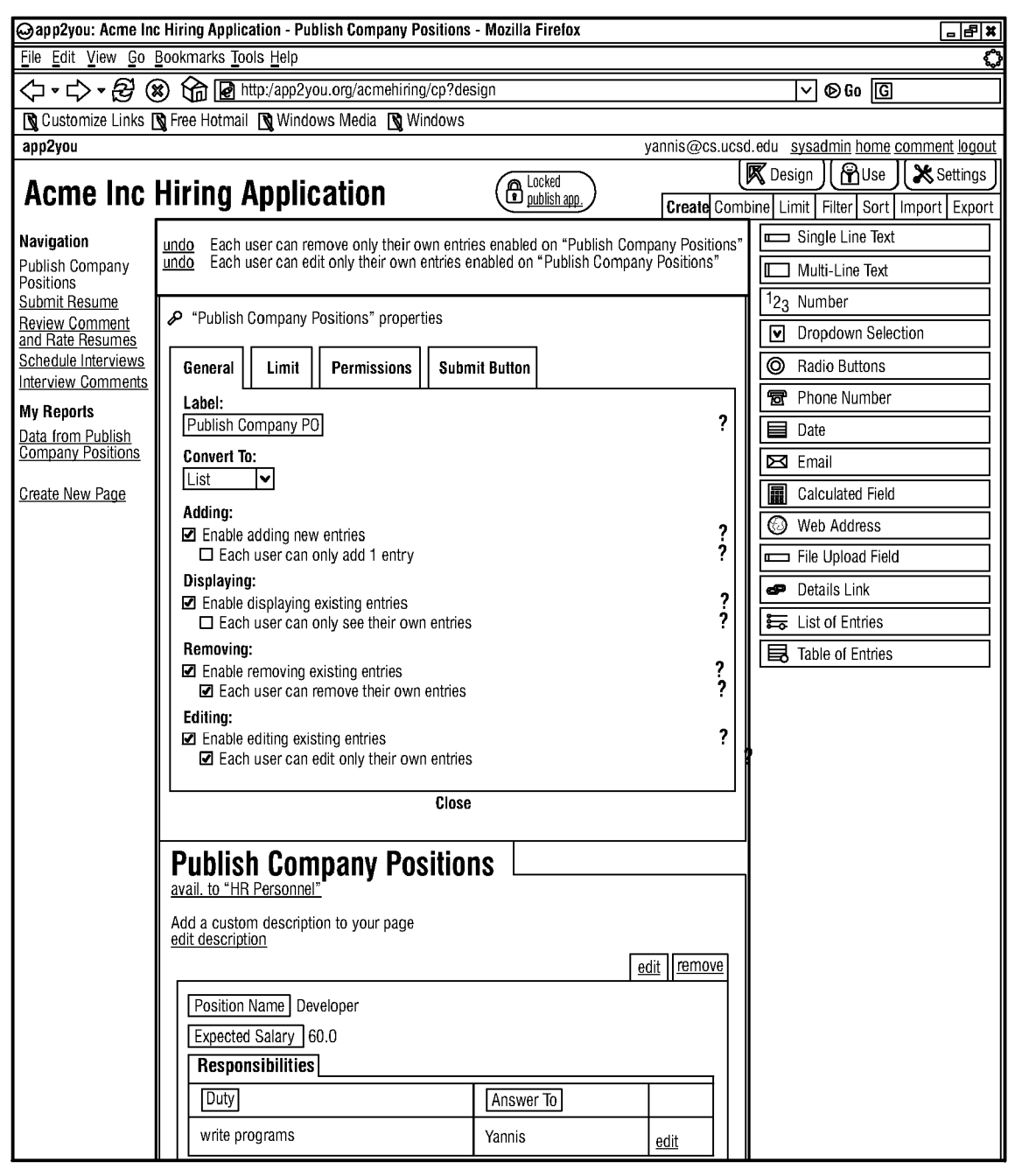

The designer can control who can see, remove or edit records submitted by the "Publish Company Positions" page. In the particular example, let us assume that the designer wants to allow everyone from the HR Personnel to see the posted company positions (regardless of whether they are posted by him/her or other colleagues of the HR personnel) but only the HR personnel person that posted a certain company position should be able to edit or remove the particular company position. In the example embodiment the designer achieves this by using the design guide of the "Company Positions" iterator, illustrated in FIG. 21. The display option is enabled (the corresponding box is checked) and there is no limitation that a user sees only the company position records that he has created. The edit and remove options are also enabled but notice that the limitation that a user can edit and remove only the records he/she created is also enabled.

Upon clicking the "edit" link of a submitted company position record, the record goes in edit mode and the fields of the corresponding company position record appear as input fields.

The designer can also control which of the fields of an iterator can be edited and under what conditions they will be editable. This example is expanded, assuming that the designer wants (1) the "Position Name" field of a record to become an input field, initialized with the current value of the field, once the user clicks the "edit" link of the corresponding record, (2) the "Expected Salary" not to be editable, i.e., even if the user clicks the "edit" link of the corresponding record the "Expected Salary" field will still be a display field, and (3) the "Responsibilities" iterator to present an insert tuple when the "Company Positions" record is edited.

The described goals are achieved as follows: The designer invokes the design guide of the respective fields "Position Name", "Expected Salary", and "Responsibilities".

Figure 22:
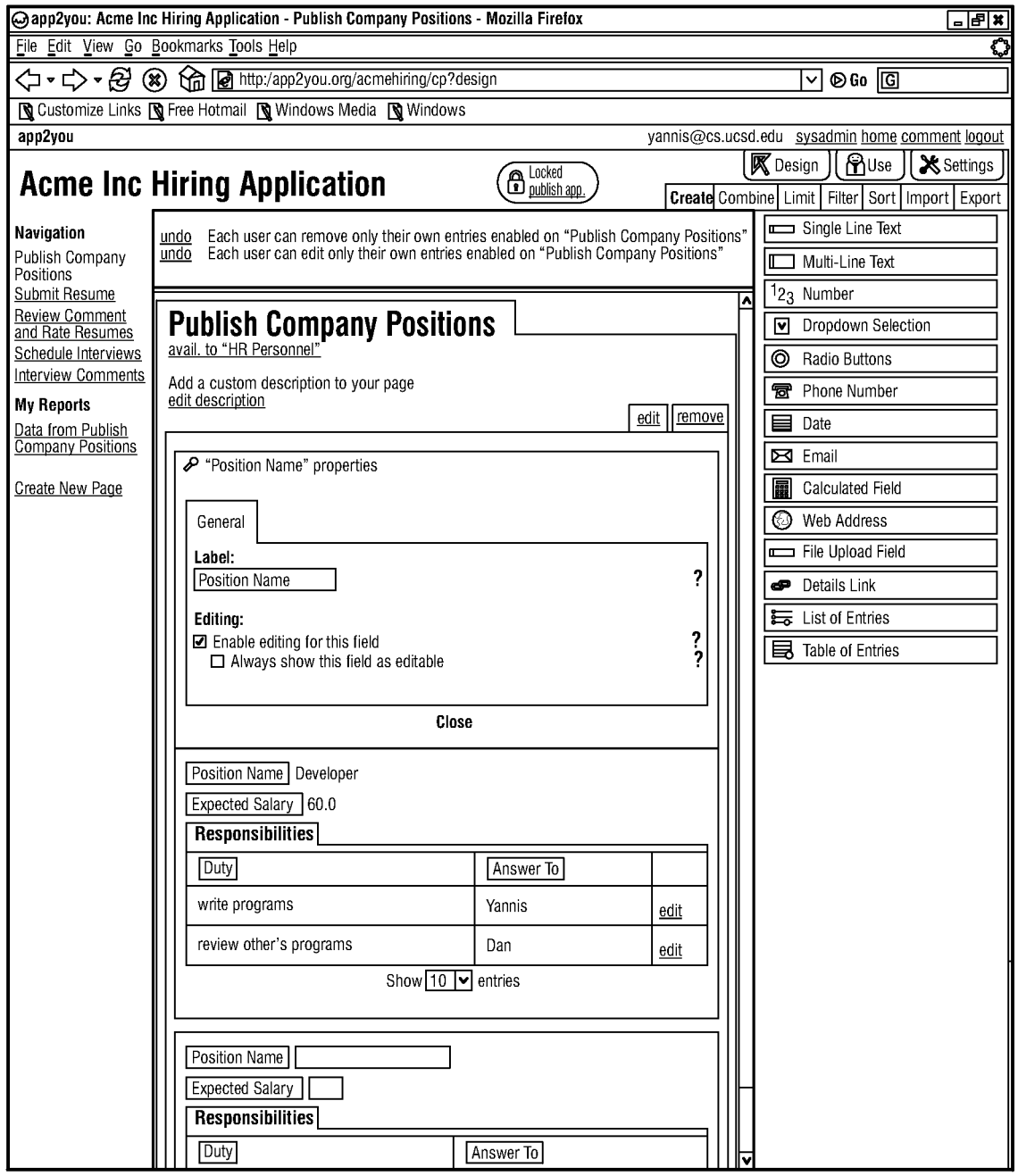
FIG. 22 a screen shot showing an example of data access rights interface, where designer specifies access rights pertaining to non-iterator field.

FIG. 22 presents a snapshot of the design guide of the field "Position Name". The edit property has been enabled (the corresponding box has been checked) but the always-on-edit property is not enabled. The design guide of "Expected Salary" has the edit property disabled.

Figure 23:
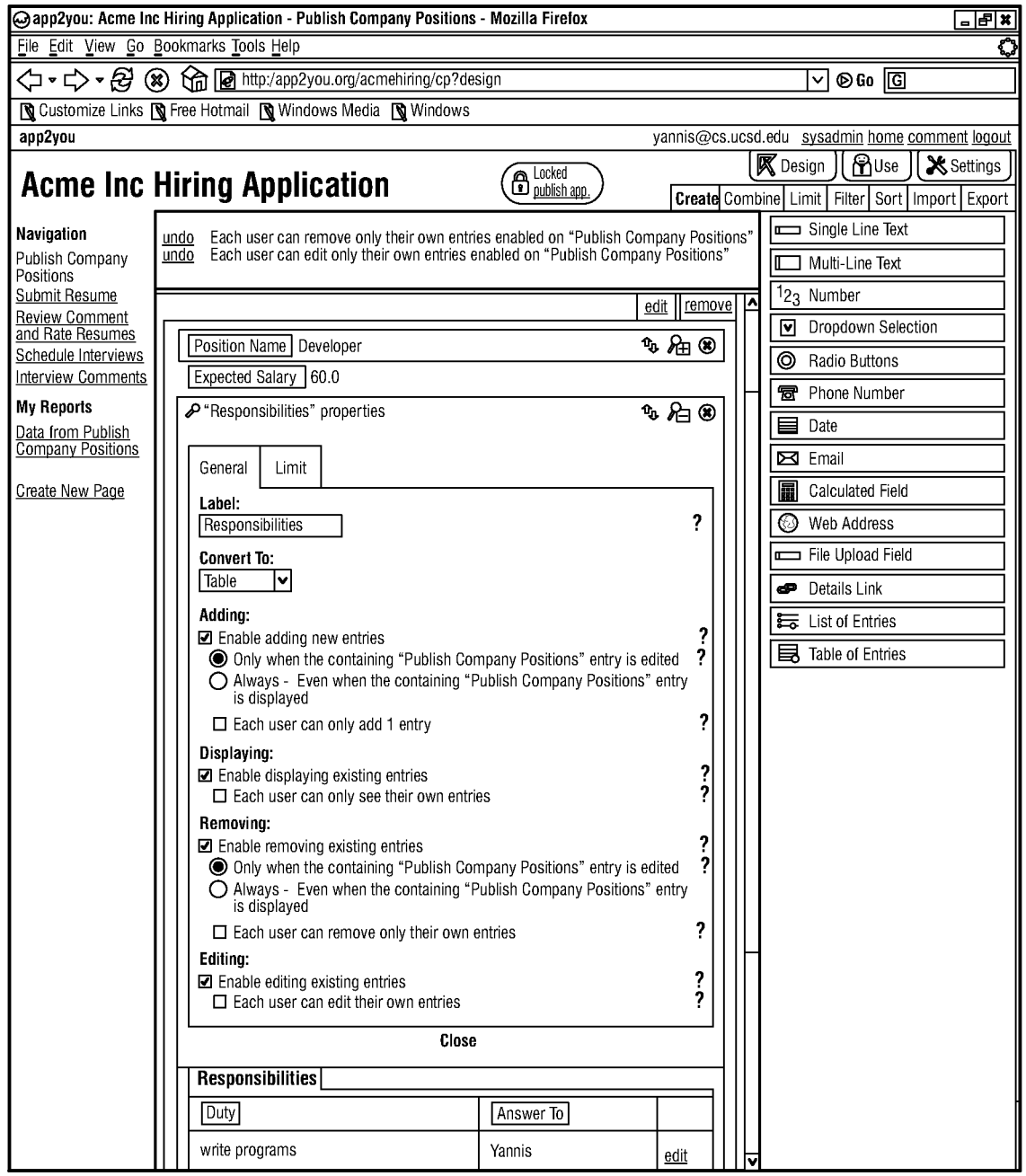
FIG. 23 a screen shot showing an example of data access rights interface, where designer specifies access rights pertaining to nested iterator field.

FIG. 23 presents a snapshot of the design guide of the iterator "Responsibilities". The insert property is enabled. Since this is a nested iterator (since the iterator "Responsibilities" is nested within the "Company Positions" iterator) the track-parent's-edit sub-property applies to the insert property. By enabling the track-parent's-edit property the designer specifies that the insert tuple of a "Responsibilities" iterator instance should appear only when the parent iterator instance is in edit mode.

The track-parent's-edit sub-property also applies to other access properties, such as the remove and the edit. The example of FIG. 23 shows that the designer has enabled the TERE value of the remove right. Therefore the "remove" link appears only on the "Responsibilities" iterator instances that are in edit mode.

The top level field in the sketch of the "Company Positions" page is the "Company Positions" iterator, which contains the basic data collection fields "Position Name", "Expected Salary" and the data collection iterator field "Responsibilities". The "Publish Company Positions" iterator is a data collection iterator with the display mode also enabled.

The iterator "Responsibilities" contains the basic data collection fields "Duty" and "Answer To".

The "Publish Company Positions" iterator has the display, edit and remove rights enabled and also has the user-id limitations on edit and remove enabled.

FIG. 20 presents an instance of the "Company Positions" iterator that reports one record (more than one are generally possible) and also provides data collection.

In the snapshot of FIG. 20 the created fields "Position Name" and "Expected Salary" appear as input fields in the insert tuple of the iterator and appear as display fields in the report part of the iterator.

The "Submit Resume" page is created by the same process. The new feature of this page (with respect to features outlined in the "Company Positions" page) is the "Position Applied" reference field, which refers to the iterator "Publish Company Positions" and displays the "Position Name". The "Position Applied" field appears as a radio button input field. The role of a reference field is to collect references to the records collected by the referred record.

Detail: Operation of Inference Engine

Introduction

In FIGS. 5-6, the designer does not explicitly design the application database 130 by coding, programming, or other manual means. Indeed, this is one distinct advantage offered by this disclosure. The designer need not be an expert in database design in order to construct a database-driven application.

Nevertheless, since the designer does not explicitly design the application database, the present disclosure includes a technique to automatically design the database in response to the designer's actions. Largely, these actions are performed by the schema inference engine 124 (FIG. 1A).

In the described embodiment, the schema inference engine 124 continually modifies the database application schema 154 in response to the designer's introduction of each field in a page. In particular, in the described embodiment the schema inference engine 124 continuously modifies the page sketch and the part of the database schema corresponding to a page in response to designer actions adding or modifying fields in the page, as illustrated in FIG. 6.

In step 610 of FIG. 6 the top level iterators of a page are inserted. This may be accomplished automatically or by user instruction or by a combination of the two. For example, in step 610 the technique of the described disclosure may automatically introduce the top-level iterator of the page. In the context of the example of FIGS. 7-10, the top level iterator of the page "Publish Company Positions" is the iterator with the same name. The top-level iterator initially is empty of fields and is not marked as either "data collection" or "report". Top-level iterators that are empty of fields are the only cases in the described embodiment where an iterator is not marked as either "data collection" or "report".

Step 610 may also be accomplished in non-automatic ways. For example, the designer may explicitly place one or more top-level iterators in a page by introducing a corresponding number of iterator widgets (such as the "List of Records" and "Table of Records" widgets of the example) in the top level of the page.

Inference Engine Operation on Pages with Data Collection Fields Only

Figure 24:
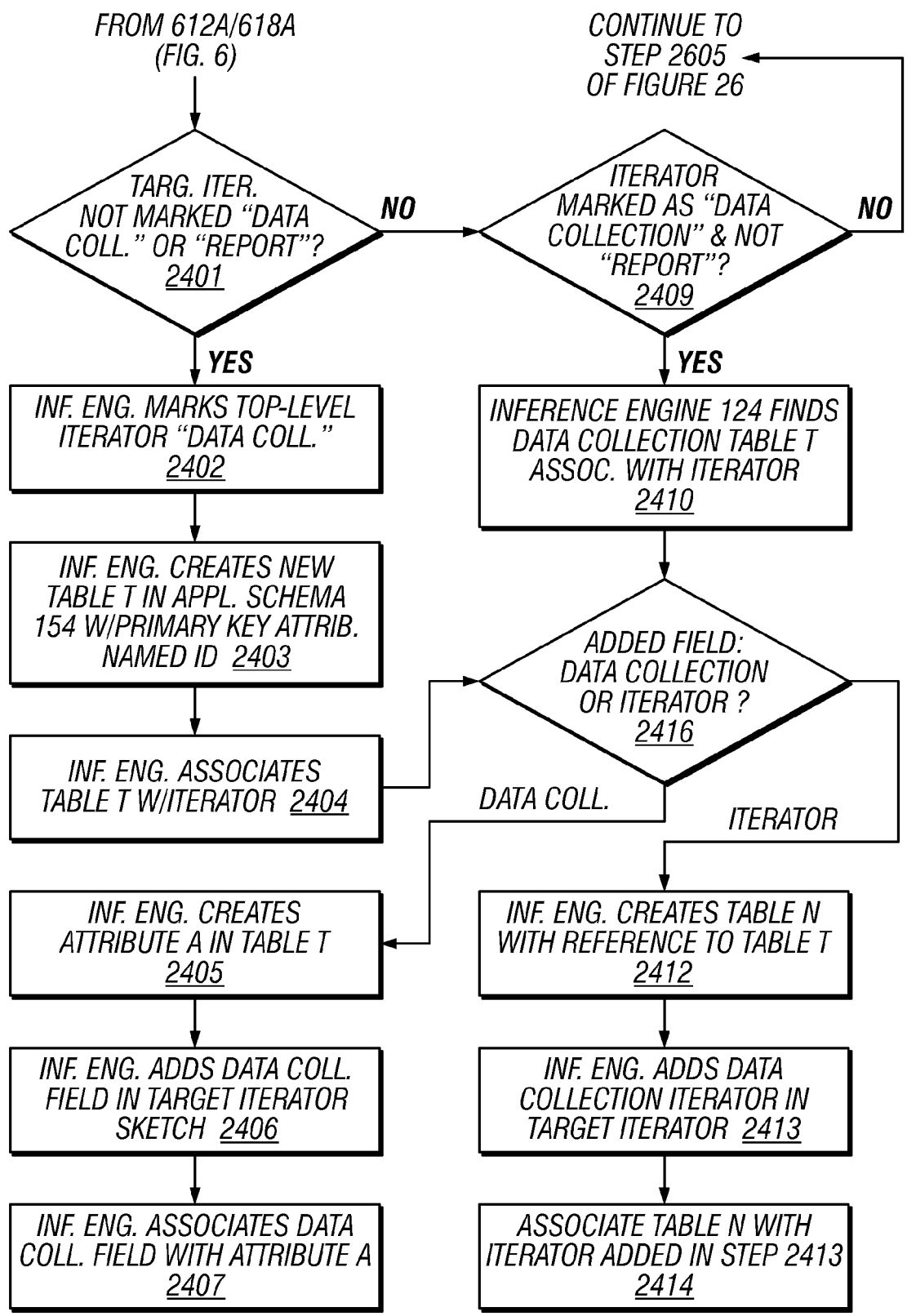
FIG. 24 is a flowchart showing an exemplary sequence for operation of inference engine, covering describing steps when only data collection and iterator fields are added to page that has no report fields.

FIG. 24 describes how the inference engine 124 modifies the application schema 154 in response to the introduction (addition) of data collection fields and data collection iterators in a page, as requested by the designer in steps 612b and 618b of FIG. 6. This part of the description assumes that the designer introduces only data collection fields and iterators in the designed page and that no report fields are introduced. The combined addition of report and data collection fields in pages further complicates the process and will be described in greater detail below.

In steps 612a or 618a of FIG. 6, a designer adds a data collection field or an iterator field to a page, using the field creation interface 142 of FIG. 1A. Using this interface the designer specifies (1) a widget to be used for the field and (2) the target iterator, which is the iterator to which the data collection field will be added.

FIG. 24 explains the details of steps 612b and 618b (FIG. 6). Step 2401 asks whether the target iterator is marked as neither "data collection" nor "report."

If the outcome of 2401 is "yes," then the schema inference engine 124 marks the target iterator to be a data collection iterator (step 2402). After 2402, the schema inference engine 124, utilizing the data manager 126, creates a new table T in the database application schema 154 (step 2403) and introduces the primary key attribute ID of the table. The schema inference engine 124 further associates this table with the iterator (step 2404). The name of the table may be automatically produced and it can be based on the name of the iterator, with appropriate disambiguations taking place in the case that more than one iterators have the same name. Alternatively, a prompt may be issued to the designer, via the appropriate design guide, to provide an alternate name if he wishes.

After 2404, the schema inference engine 124 (in step 2416) checks if the to-be-added field is a data collection field or an iterator. If step 2416 finds that the to-be-added field is a data collection field then the inference engine in step 2405 utilizes the data manager 126 to add in the table T a new attribute A. The name of the attribute may be based on the name of the field, with appropriate disambiguation if more than one fields may have the same name. The type of the attribute A is computed according to such aspects such as the kind of widget used for the data collection field and/or specifications provided via the design guide of the widget. In step 2406 the schema inference engine 124 adds the data collection field to the iterator. In step 2407, the schema inference engine 124 associates the data collection field with the attribute A.

In step 2416, if the schema inference engine 124 found the to-be-added field to be an iterator, then step 2412 is performed. The schema inference engine 124, using the data manager 126, creates the new table N in step 2412. A reference attribute Parent, referencing the primary key of the table T, which is the data collection table associated with the target iterator, is added to the table N. The primary key attribute ID of the table is also introduced in the table N. Further, in step 2413 the schema inference engine 124, using the data manager 126, adds an iterator in the target iterator and marks the newly added iterator to be a data collection iterator. Also, in step 2414, the new table N is associated with the newly added iterator as its data collection table.

If step 2401 found that the target iterator was marked "data collection" or "report", then step 2409 is performed. Step 2409 asks whether the iterator was marked as "data collection" but not "report." If step 2409 answered "no," then the sequence proceeds to step 2605 of FIG. 26 (described below). In contrast, if step 2409 answered "yes," then step 2410 the schema inference engine 124 finds the table T that is associated with the target iterator, and control passes then to step 2416 which was discussed above.

Example

Addition of First Field in Page, Where First Field is Data Collection Field

The following is an example showing how the sequence of FIG. 24 may be carried out in practice. This is illustrated, particularly, in the context of the hiring application introduced in FIG. 7.

The following discussion provides a more detailed example to illustrate the operation of steps 612b and 618b of FIG. 6. This example is described in the context of the previously described example of FIGS. 14-15.

The first field that the designer introduces in the "Company Positions" page, and therefore the first field that is introduced in the top-level "Company Positions" iterator, is the data collection field "Position Name". The designer introduces the "Position Name" field by clicking on the "Single Text Line" widget and then providing the name ("Position Name") of the new field.

This leads to the following (1) The inference engine marks the top-level iterator "Publish Company Positions" to be a data collection iterator. (2) The inference engine creates a new table. The name of the new table can be set automatically to be the name of the iterator, i.e., the name of the table becomes "Publis_Company_Positions". (3) The "Company Positions" iterator is associated to the "Publish_Company_Positions" table.

According to step 2405 (FIG. 24), a new attribute named "Position Name" is added in the table "Publish_Company_Positions". The type of the new attribute could be a string type, since a string type is compatible with a widget that collects single line text.

Example

Addition of Iterators and Data Collection Fields in Data Collection Iterator

The following designer actions are described to illustrate a particular case of operations 2405 and 2412. In the example hiring application the designer, after he/she has introduced the "Position Name" field, also introduces the "Expected Salary" in the "Publish Company Positions" iterator. According to step 2405 this leads to the addition of an attribute named "Expected_Salary" in the table "Publish_Company_Positions" that is associated with the "Publish Company Positions" iterator. The addition of the iterator "Responsibilities" in the iterator "Publish Company Positions" leads to the creation of a new table named "Responsibilities", in step 2412. This table has a reference (foreign key) attribute Parent which references the ID of the "Publish_Company_Positions" table.

Aspects of Adding Report Fields that Affect Inference the Engine's Operation

Figure 25:
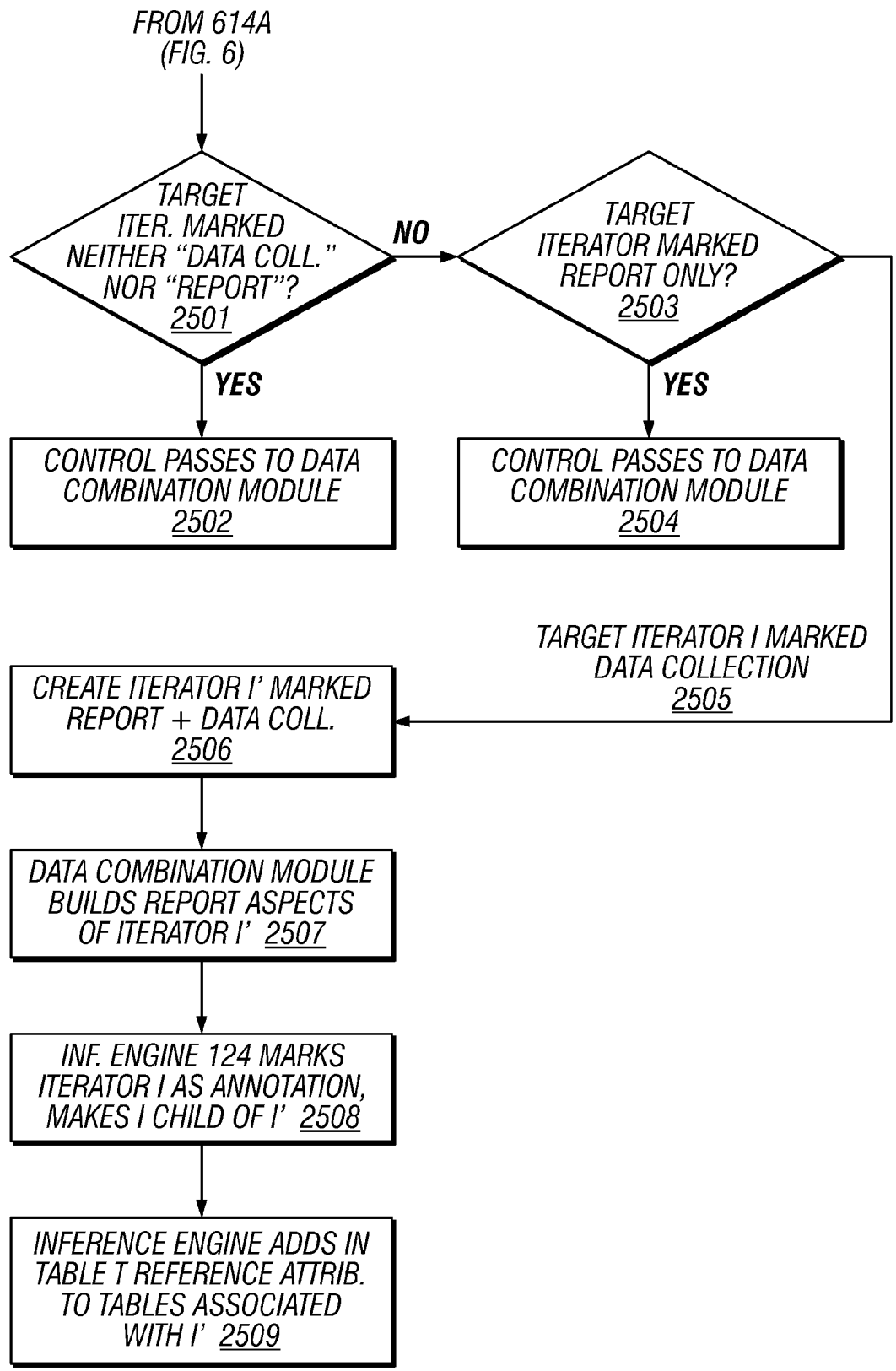
FIG. 25 is a flowchart showing one example of operation of the inference engine when report fields are added to page.

FIG. 25 presents how the page sketch is modified by the data combination module 125 in response to the addition of report fields in a page. In one implementation of data combination module, the user asks that report fields are included in pages and not in particular iterators. The data combination engine automatically infers in what iterator it should enter a report field. The presentation of this section is limited to aspects that are of importance to the operation of the inference engine. A detailed presentation of the data combination module is made below.

FIG. 25 shows the details of step 614b (FIG. 6). The designer may add a report field D in a page in step 614b. Pages that contain report fields only do not directly lead to the inference of corresponding tables of the database schema. The addition of report fields in the sketch is handled by the data combination module 125. However, report fields indirectly affect the inference engine also, since it is possible that one creates a page that contains both report and data collection fields in the same iterator context and this leads to schema inference as described below, beneath the heading "Addition of data collection field in report iterator". Therefore the disclosure describes in this section the aspects of the effect of the addition of report fields that indirectly matter to the inference engine.

It is often the case that the addition of the new report field D in the currently-designed page has to be preceded by the addition of a new report iterator (i.e., an iterator that is marked as "report") NI in the currently designed page. Each report iterator is associated with a full context, which basically consists of data collection iterators, which have collected the records that this report iterator displays. Since data collection iterators are associated with the tables that the schema inference engine builds (FIG. 24, FIG. 26) the report iterator is (transitively) associated with such a list of tables. The details of how the full context of a report is computed are described below, beneath the heading "Detail: Data Combination Module".

Addition of Report Field

After step 614a, where the designer has introduced a report field, step 614b occurs. This was broadly discussed above. The details of step 614b are described as follows, in conjunction with FIG. 25.

Step 2501 asks whether the currently designed page has no field yet, and therefore it is not marked as either "report" or "data collection" (per step 2501). If so, the data combination module marks the top-level iterator of the page to be a report iterator (step 2502).

If step 2501 answer in the negative, then step 2503 asks whether the iterator was marked report only. If so, then inference engine 123 passes control to the data combination module 2504. On the other hand, if 2503 answer in the negative, then it is concluded that the target iterator was marked data collection. In this case, step 2506 is performed.

The data combination module creates a new top level "report" and "data collection" iterator I' (step 2506) and the data combination module builds the report aspects of such iterator (step 2507). As a result of those operations of the data combination module, the data combination module associates the iterator I' with a context and, therefore, with a set of tables.

Consequently, the data combination module passes control to the schema inference engine 124 (step 2508). In step 2508, the inference engine 124 makes the iterator I to be a child of iterator I' (step 2508) and also marks I to be an annotation data collection iterator. This means that I is a virtual data collection iterator that appears within an iterator (I' in this case) that is marked as both report and data collection. During the application use the data collection fields of I will appear in the record instance of I', without creating a new iterator around the data collection fields. In step 2509, the schema inference engine modifies the table T as follows: for each report table associated with I' the schema inference engine 124 includes a reference attribute (foreign key), which references the report table, in the table T.

Addition of Data Collection Field in Report Iterator

Figure 26A:
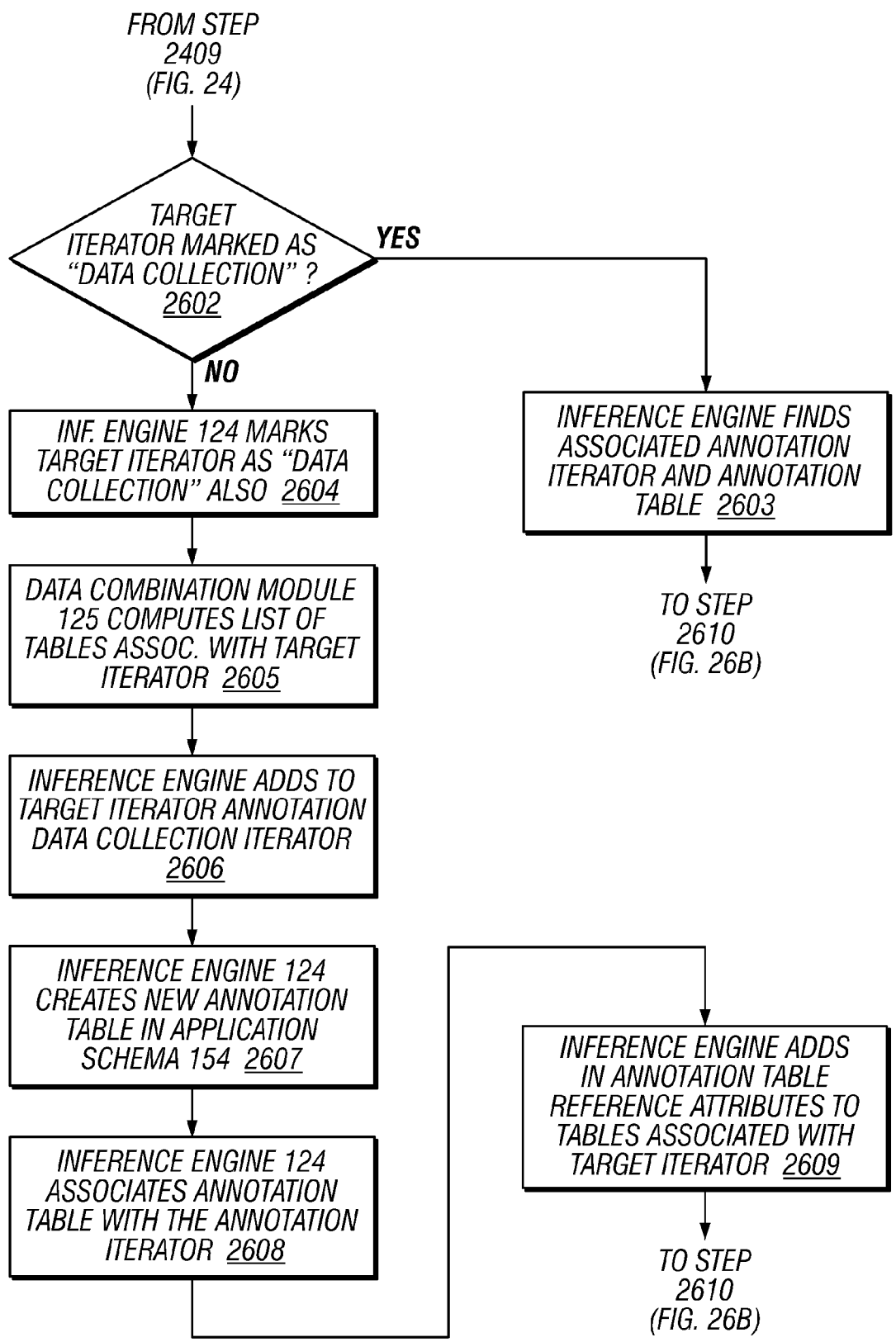
FIGS. 26A-26B are flowcharts illustrating operation of the inference engine, according to one example, when data collection fields and/or data collection iterators are added to page.
Figure 26B:
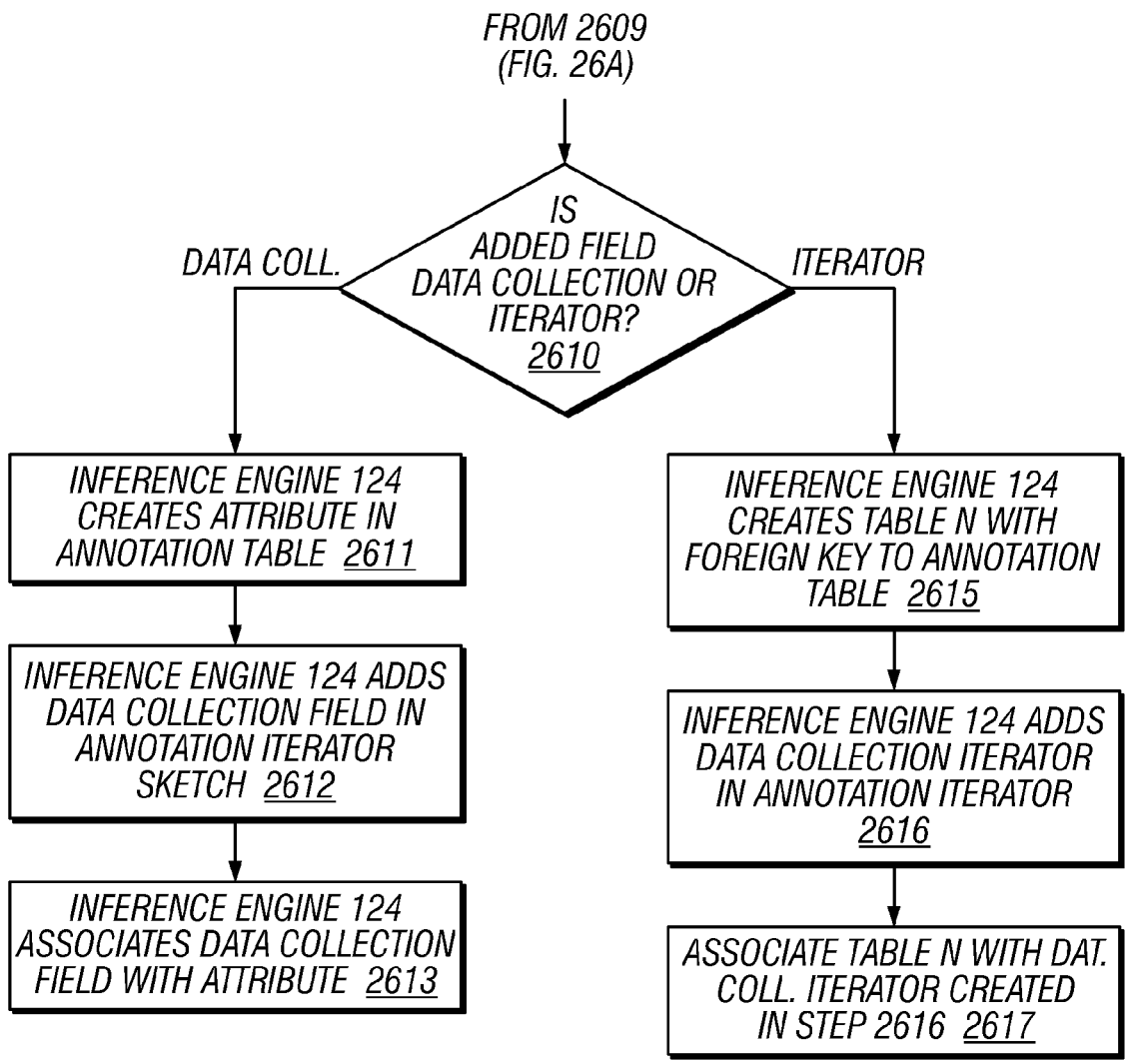

FIGS. 26A-26B describe the operational sequence after step 2409 (FIG. 24) as described above. The situation indicated by this progression means that the target iterator was marked as report.

Step 2602 is invoked when a target iterator is marked as report and asks if a data collection field or iterator is requested to be added in the target iterator, which is marked data collection iterator also. If not, then step 2604 marks the iterator to also be a data collection iterator. Step 2605 computes the full context of the iterator, which basically consists of data collection iterators, which have collected the records that this report iterator displays. From the full context the inference engine can infer the list of tables associated with report iterator. Consequently the schema inference engine 124 in step 2606 creates an annotation data collection iterator, and makes it a child of the target iterator. Annotation iterators have hidden reference fields to the data collection iterators of the full context of the target iterator. Step 2607 creates a new table, called annotation table, in the application schema 154 with primary key attribute named ID. In step 2608 the schema inference engine 124 associates the annotation table with the annotation iterator. In step 2609 the inference engine includes in the annotation table one reference attribute (foreign key) for each one of the tables associated with the target iterator and associates each one of the foreign keys with the corresponding hidden reference field. Now that a data collection iterator (namely the annotation iterator) is available to receive the new field, control is transferred to step 2610 (FIG. 26B) in order to add a data collection field or iterator in the annotation iterator.

Step 2610 is carried our in similar fashion as step 2416 (FIG. 24). Likewise, steps 2611-2613 that follow step 2610 are carried out in similar fashion as steps 2405-2407 (FIG. 24). Further, steps 2615-2617 that follow step 2610 are performed in similar fashion as steps 2412-2414 (FIG. 24).

In contrast to the foregoing description, if step 2602 finds that a data collection field or iterator is requested to be added in a target iterator (which is marked as both report and data collection iterator), then step 2603 is performed instead of step 2604. In step 2603 the inference engine retrieves the annotation iterator that is already associated to the target iterator and advances to step 2610 (FIG. 26B).

Example

Addition of Data Collection Field in Report Iterator

An annotation iterator is hidden, in the sense that the rendering engine shows the fields of the annotation iterator as if they were fields of its parent iterator. For example, see FIG. 10 of the example hiring application. The data collection field "Interview" was added to the "Candidates" iterator, which was a report iterator until the introduction of the "Interview" data collection field. The introduction has led to the "Candidates" iterator being marked as both report and data collection. An annotation data collection iterator has also been added to "Candidates" and the "Interview" field has been added to this annotation iterator. However as far as the users and the designer are concerned the annotation iterator is hidden. Furthermore, the annotation iterator has two hidden reference fields: The first one is a hidden reference to the "Publish Company Position" data collection iterator and the second a hidden reference field to "Submit Resume", since the two iterators in the full context of "Candidates" are "Publish Company Position" and "Submit Resume". The rendering engine shows "Candidates" records that have both report fields ("Name") and data collection fields ("Interview") and there is no indication of the hidden annotation iterator in this page.

The table that was inferred, created and associated with the annotation iterator of this example has two reference attributes, since the full context of the iterator candidates contains data collection iterators "Publish Company Positions" and "Submit Resume" The first reference attribute (foreign key) points to the ID of the "Publish_Company_Positions" table and the second reference attribute points to the ID of the "Submit Resume" table. Assuming the snapshot of FIG. 10, the data collection table of the hidden iterator will have records such as (P1,R1,"Apr. 6, 2007") and (P2,R1,"Apr. 7, 2007"), where P1 is the ID of the "Developer" position record, P2 is the ID of the "QA" position record and R1 is Joe's resume record.

Addition of Data Collection Field in Report and Data Collection Iterator

If a data collection field or an iterator is requested to be added in a target report and data collection iterator then the already created annotation iterator, which is associated to the target iterator, is identified. Then the case is reduced to adding the requested data collection or iterator field into the identified annotation iterator.

Additional Causes for Hidden Iterators

When a data collection field is added to a report iterator the designer is prompted to specify the cardinality of values that this data collection field collects for each reported record, where, without limitation the following cardinalities may be specified by the designer.

First, the data collection field may collect only a single value for each record. For example, this is the case in FIG. 10, where for every record of the "Candidates" iterator there will be one value of "Interview". In this case the data collection field is introduced directly to the annotation iterator that has been introduced on the report iterator. This should not be confused with the fact that there is, in general, a different interview date for each combination of candidate and position.

Second, the data collection field may collect a value from each user for each report record, whereas values from different users do not overwrite each other. In this case a virtual iterator is introduced to the annotation iterator and the data collection field is introduced in the virtual iterator. The characterization "virtual" of the iterator signifies that this iterator will be hidden from the user and the fields of the virtual iterator will appear as fields of the closest non-hidden ancestor iterator.

Figure 37:
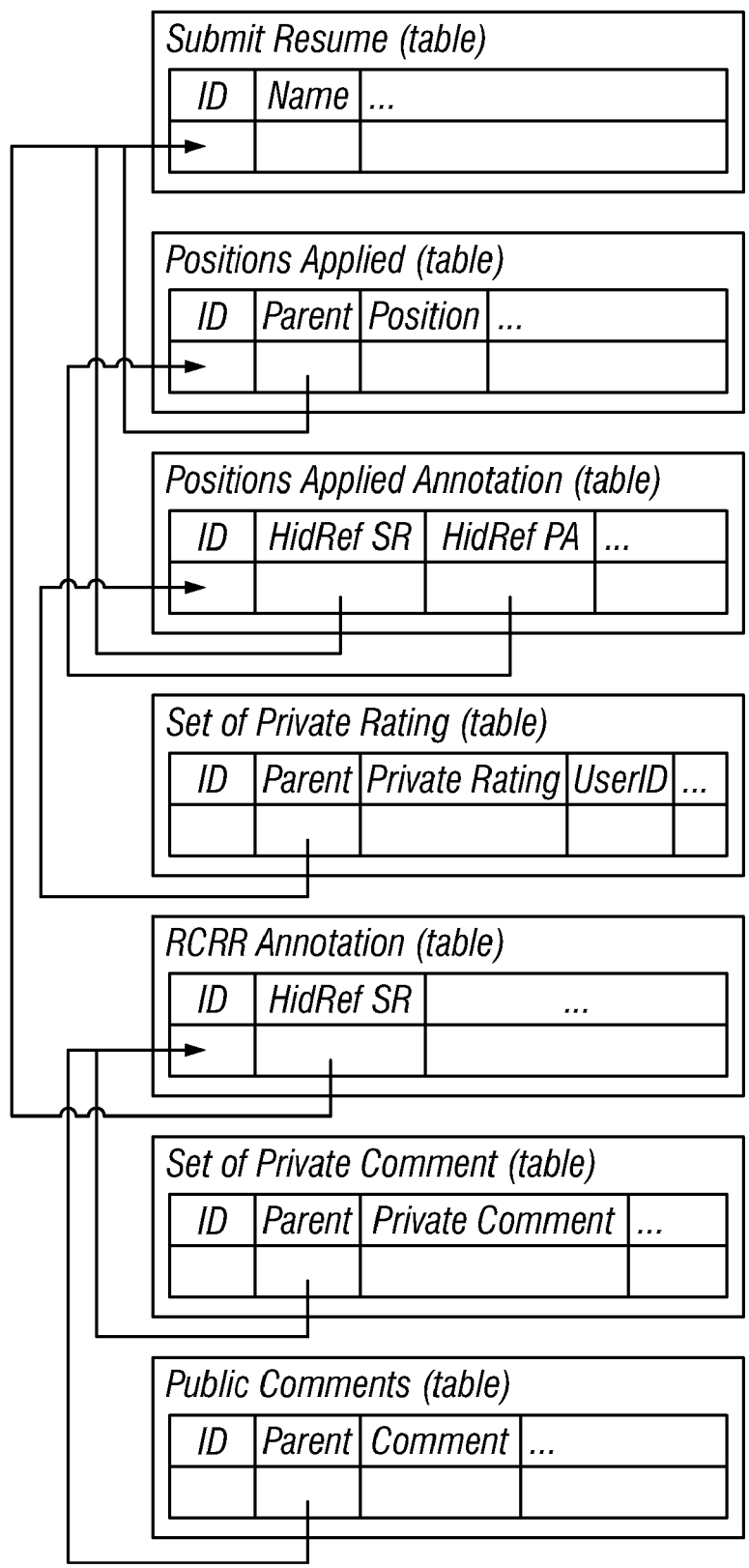

Taking all annotation iterators and virtual iterators into consideration the iterator structure 3601 and the inferred table structure 3602 pertaining to the page of FIG. 9 are shown in FIGS. 36-37.

Detail: Data Combination Module

An important aspect of web applications is that data collected at one or more pages can be combined and reported at other pages. Conventionally, this operation is accomplished by software engineers who develop programs that access the database in order to fetch the data that a page requires. This method of creating pages that report data collected by other pages is inapplicable, however, when the designer of the application cannot write such programs.

Using the present embodiment, the designer of a web application can create field-based pages that combine the data that are collected or reported by other field-based pages. The semantic combination interface and the data combination module enable the designer to achieve those goals. The following specification of the semantic combination interface 141 and the data combination engine 125 is not dependent on the existence of a schema inference engine 124 that automatically creates data structures in which the collected data are stored. The described data combination engine and semantic combination interface can equally well work in a system where the designer is responsible himself for designing the underlying data structures.

The data combination module of the presented embodiment provides the following key functions to the designer:

Discovery of Semantically Meaningful Field Combinations The described embodiment assists the user in discovering fields of multiple pages that are semantically-related, whereas the relationship may be based on (1) an iterator sharing common context with another iterator that provides annotation data or (2) the iterators of the fields being related due to references or (3) the iterators being related due to nesting (4) any recursive combination of the above.

Construction of Report Iterators The described embodiment creates pages that contain report iterators that combine, transform, filter and report the data of multiple pages. In general, the disclosure uses the term "report iterator provides view of data of pages A, B, C" to capture the fact that a report iterator provides a report that performs one or more of the following broad operations: (1) combines data of pages A, B, C, (2) transforms data, (3) filters data so that only records satisfying designer-specified or user-specified conditions are reported. The disclosure describes below an extensive list of each of the above kinds of operations.

Tracking of Context of Each Iterator: A benefit that is particular only in the context of embodiments that involve an automated inference engine, as was discussed above in the description of the inference engine 124 (FIG. 1), is the provision of the context of iterators by the data combination engine to the inference engine.

Operation of Semantic Combination Interface 141 and of Data Combination Module 125

Introduction

Figure 27:
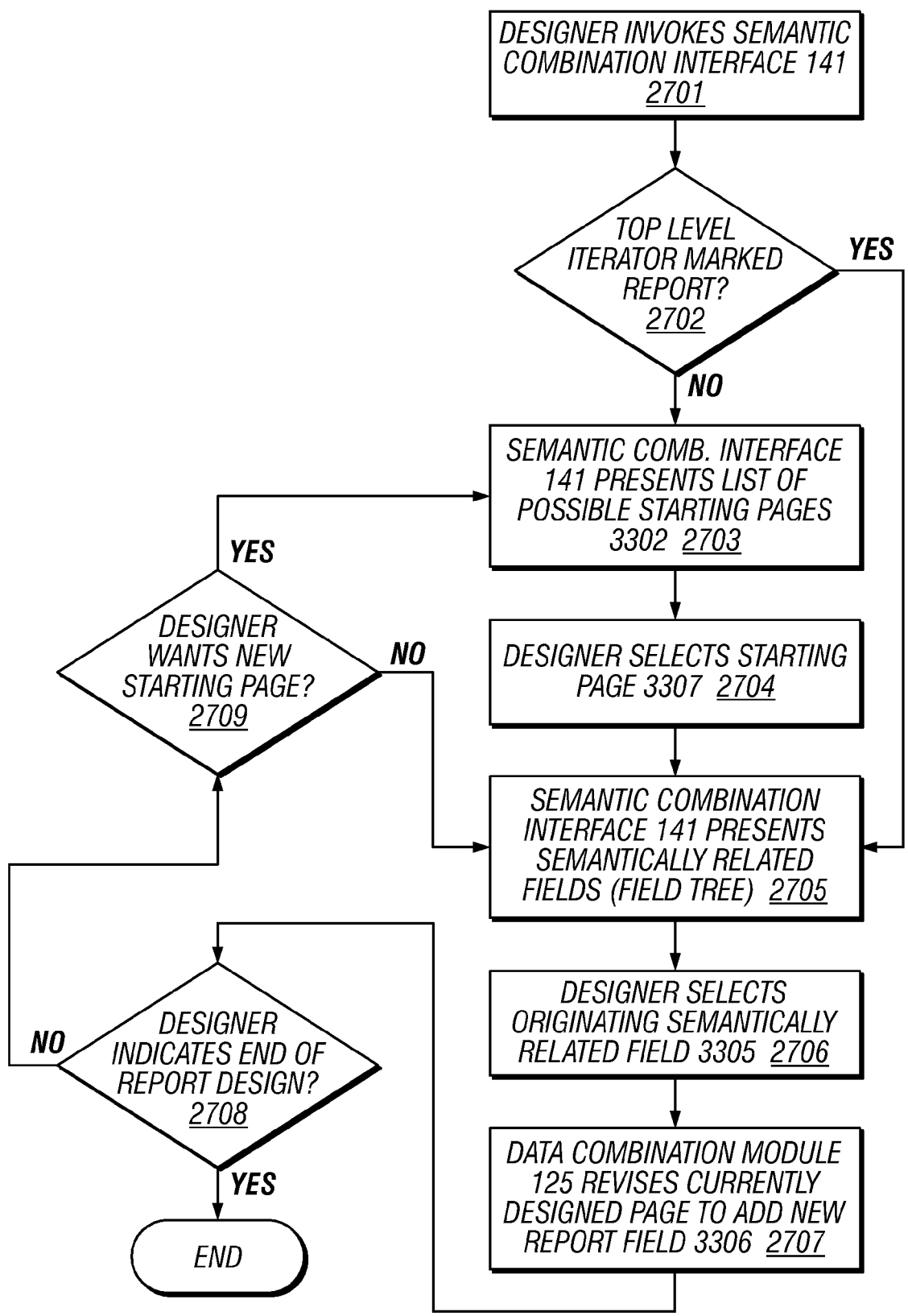
FIG. 27 is a flowchart showing one example for operation of semantic combination interface and data combination engine.
Figure 33:
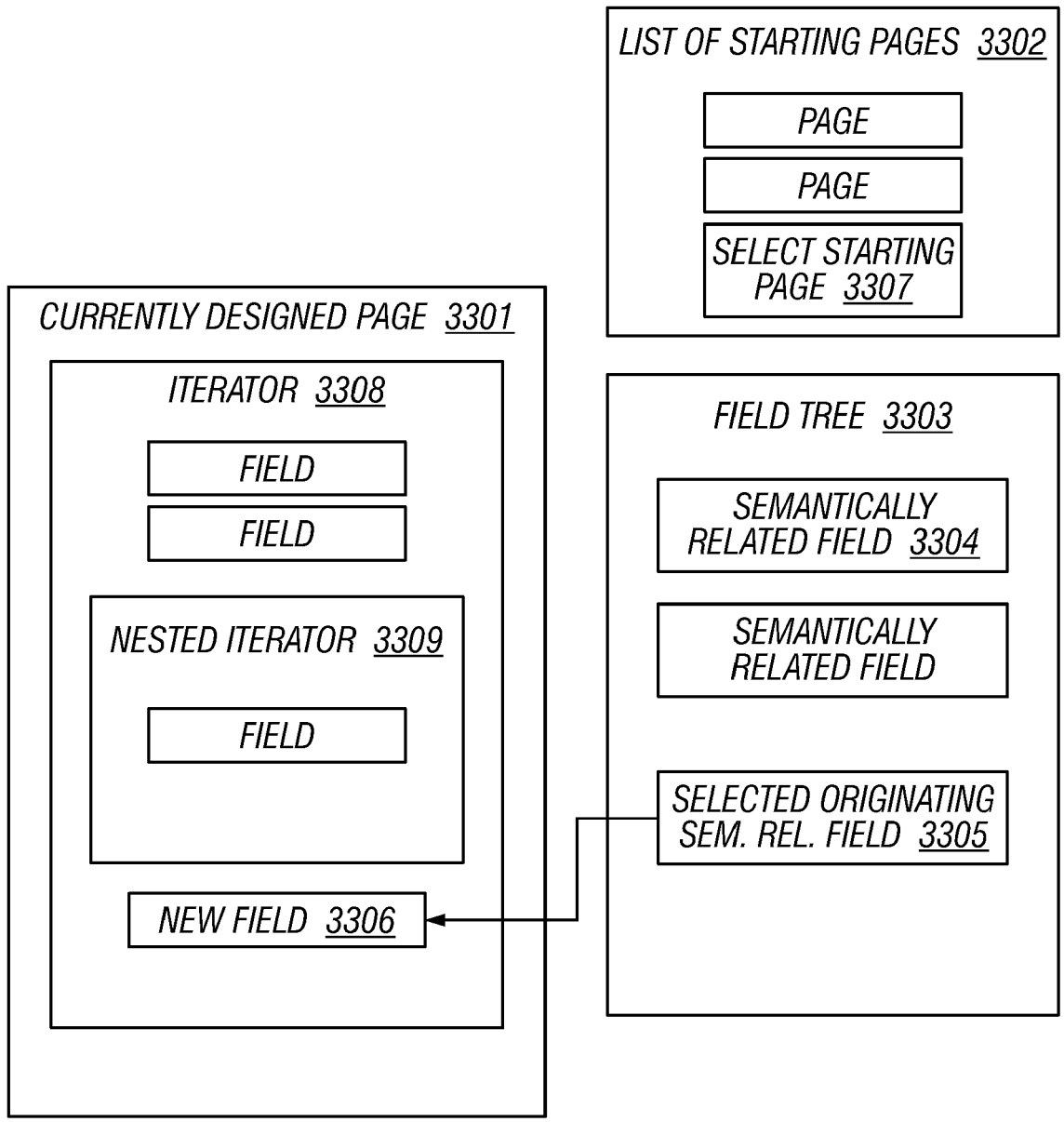
FIG. 33 is a block diagram of data structures of a currently designed page and respective data structures created by the semantic combination interface.

FIG. 27 presents a sequence of steps of the presented embodiment as part of the operation 614*s* (FIG. 6) where a report field is added to the page. A more detailed example that illustrates the steps of FIG. 27 in the context of the hiring application is given below. FIG. 27, then, describes the details of operations occurring in steps 614*a*-614*b*. To assist in describing FIG. 27, certain data structures are described in conjunction with FIG. 33.

In step 2701 the designer invokes the semantic combination interface 141 of the design interface 122 (FIG. 1) in order to add one or more report fields in the currently-designed page.

If the top level iterator of the currently designed page is not already marked as report (i.e., if it does not have report fields and the designer has not yet started its design) then the semantic combination interface 141 presents to the designer in step 2703 a list of possible starting pages 3302. Otherwise the process proceeds to step 2705.

The list of possible starting pages 3302 (see FIG. 33) has been computed by the data combination module 125 as follows: (1) Every page of the application that displays data is included in the list. (2) For every page P that collects data the data combination module 125 provides a proxy page named "Data from P". The "Data from P" is a virtual page (i.e., a page that is not available to the users of the web application) that contains the complete set of data that have been collected by the data collection fields of P. This virtual page allows the designer to refer to the data collected by the data collection fields of P. The designer may think of the "Data from P" as if it has replicated the iterator structure of P in "Data from P", except that all data collection fields have been replaced by report fields that report what the data collection fields collected. Correspondingly, all the data collections iterators of the P page have been replaced by report iterators in the "Data from P" page. For example, in the context of the hiring application, there is a page "Data from Submit Resume" that reports the complete set of resume records (and all their fields and nested records recursively) that have been collected from the "Submit Resume" page. In an alternate embodiment the semantic combination interface could also make available to the designers a page P even if this page P only collects data. In this case the designer should understand that when he selects in the next steps to display the data of a data collection field of page P, this action means to display all the data that have been collected by such data collection field.

The designer selects in step 2704 any page from 3302 to be the selected starting page 3307. In this way the designer indicates that the currently designed page 3301 will report information about the records reported in the starting page 3307 and (potentially) combine them with data from other pages. For example, by picking the "Data from Submit Resume" as the starting page, the designer indicates that the currently designed page will report resume information.

Consequently the semantic combination interface 141 discovers and presents to the designer a list of semantically related fields 3304 of other pages that are semantically related to the currently designed page 3301.

The presented embodiment makes the presentation of semantically related fields 3304 and their relationships to the data of the currently designed page in the form of a field tree 3303 in step 2705, which is developed by the field tree generator 145 module of the data combination module 125. Basically, a field tree is a tree structure that visualizes the field structure of the starting page along with pages that have fields 3304 that are semantically related to the starting page. Since the starting page is semantically related to the currently designed page, by transitivity, any fields 3304 that are semantically related to the starting page 3307 will also be related to the currently designed page 3301. The presented embodiment describes a list of semantic relationships captured by the field tree below, beneath heading "Definitions: Semantic Iterator Relationships". The designer can expand the field tree to make it show more semantically related fields. The structural details of a field tree are explained below, beneath the heading "Field Trees".

Consequently in step 2706 the designer selects a field 3305 shown on the field tree. In this way the designer indicates that he/she wants to introduce in the currently designed page a new report field 3306 that reports the data that have been reported or collected from the selected field 3305 (shown on the field tree) at its corresponding page. Therefore the disclosure also uses the term originating field for the selected field 3305, since, as far as the designer is concerned, it is the field where the data that will be reported in the currently designed page originated from.

The field tree 3303 also presents information on the nature of the semantic relationship since if the selected originating field 3305 is semantically related to the fields of the currently designed page in more than one ways then the semantic combination interface of an embodiment provides to the designer an interface for choosing the nature of the relationship by which the new field will be connected to the currently designed page 3301.

A key benefit of the disclosure is that the designer does not have to explain how the new report field 3306 will fit in the currently designed page 3301. Rather, the data combination module automatically revises the currently designed page in step 2707 to introduce the new report field. This may involve the following list of automatic actions by the data combination module: (1) Mark the top-level iterator 3308 of the currently-designed page to be a report iterator if it is not already (2) The data combination module 125 introduces in the currently designed page the new report field 3306 and places it in an iterator that is semantically related to the originating field and therefore provides a semantically natural place for the new field. In special cases, which are described below, the data combination module may need to also introduce one or more nested iterators 3309 in the page, such that the first introduced iterator contains the second introduced iterator, which contains the third introduced iterator and so on, until the last introduced iterator contains the newly added field.

Whenever the data combination module introduces new iterators it computes the view that is associated with the iterator. Basically, a view provides a specification of the function that produces the records that each instance of the particular iterator will report; it is discussed in detail below, beneath the heading "Introduction on Views".

Once the new field 3306 has been added, the designer may transfer back to either step 2703 or step 2705 or may end the process.

Optimizations to FIG. 27

Elimination of Duplicate Fields from the Field Tree

In many cases the field tree becomes too large to be effectively visualized. In such cases the field tree generator 145 eliminates duplicate fields from the field tree. Basically, two fields 3304 are duplicates if the choice of any one of them as an originating field 3305 produces identical effects on the page sketch with choosing the other. The details of duplicate elimination are provided below, beneath the heading "Detail: Elimination of Duplicate Fields".

Actions Introducing Multiple Fields Simultaneously

The semantic combination module 141 of the interface can also provide to the designer the option to specify, with a single action, multiple semantically related fields and request the addition of multiple corresponding report fields in the currently designed page. For example, the designer may indicate with a single click that each field of a specified iterator of the field tree should be the originating field for a corresponding report field to be introduced in the currently designed page. Or even specify that for each field of a specified page, a corresponding field must be introduced in the currently designed page. Such actions that introduce multiple fields can be implemented as sequences of individual actions, where each individual action is introducing one field at a time. Therefore the implementation of actions introducing multiple fields will be apparent to those of ordinary skill in the art (having the benefit of this disclosure), and need not be described any further.

Definitions: Semantic Iterator Relationships

Introduction

The iterators of web applications have various forms of relationships to each other. An obvious one is the nesting relationship that exists in a page between an iterator and the iterators that it contains. Less obvious are the form of relationships between iterators of different pages. Detecting such relationships is important for suggesting to the designer of a report page originating fields (and therefore iterators) of other pages that are semantically related to the currently designed report page.

The relationships between iterators induce corresponding relationships between the pages that contain the iterators as it is described below, beneath heading "Definitions: Page Relationships".

The term originating field extends to iterators. Basically, an iterator A originates from an iterator B if the iterator A reports data that the iterator B reports (if B is a report iterator) or data that the iterator B has collected (if B is a data collection iterator). For example, the top level iterator of the "Review, Comment and Rate Resumes" page of FIG. 9 originates from the top level iterator of the "Submit Resume" page of FIG. 8. More examples will be given below.

An iterator A indirectly originates from an iterator C, if A originates from an iterator B and B originates from C. The definition of indirect origination generalizes recursively.

Without limitation, the present embodiment detects and presents to the designer the following iterator relationships:

Entity-Related Iterators and Pages

Two iterators are entity-related if (1) the first one is a report iterator, the second one is a data collection iterator and the first one has directly or indirectly originated from the second, or (2) they are both report iterators and they have directly or indirectly originated from the same data collection iterator. In the context of the inference engine of FIG. 1A two iterators are entity related if they store data or retrieve data from the same table of the application database 155.

Nested Related and Reverse-Nested Related Iterators

The example embodiment recognizes a nesting relationship between two iterators A and B as follows: "A is nested in B" if the iterator A is a field of the iterator B. In this situation the following relationship also holds: "the iterator B is reverse-nested in the iterator A". The nesting relationship trivially generalizes to indirect nesting: For example, if A is nested in B and B is nested in C then A is indirectly nested in C.

Reference-Related Iterators

The iterator A is forward reference-related to the iterator B via reference (field) R" if the iterator B has a reference field R that refers to the iterator A. In this situation it is also the case that the iterator B is backward reference-related to A via the reference field R.

Annotation-Related Iterators

The example embodiment recognizes the relationships "annotates" and "is annotated from". A common case of annotation relationship, but not the only case of annotation relationship is the following: If page P has an annotation iterator A, which is nested, directly or indirectly, in an iterator B then the annotation iterator A annotates the iterator B. Vice versa, B is annotated from A. Furthermore, A annotates any iterator C that is entity-related to B and any such iterator C is annotated from A.

The above case generalizes to the complete definition of the relationships "annotates" and "is annotated from" as follows: An annotation iterator A annotates a single iterator B if A and B have common data collection iterators in their full context, where the full context is computed as described below, beneath heading "Full Context of Iterator". Vice versa, B is annotated from A.

Further extending the definition, an annotation iterator annotates the pair of iterators B and C if (1) B is nested in C (or vice versa), (2) iterator A has common data collection iterators both with B and with C and (3) there is at least one iterator in the shared full context of A and B that does appear in the shared full context of A and C, and vice versa. This definition generalizes to an iterator annotating any number (beyond a pair) of iterators.

The above definition of annotation-related often leads to a large number of relationships and the semantic combination interface of an embodiment may elect to show only a subset of annotation relationships in order to avoid making too many suggestions to the designer.

Indirectly-Related Iterators

All of the above forms of relationships between iterators are named to be direct relationships. The disclosure uses the term "the iterator A is indirectly related to the iterator B" if there is a sequence of iterator relationships (the relationships being any of entity-related, nested-related, reference-related, annotation-related), where iterator A is related to iterator A1, which is related to iterator A2, etc, which is related to iterator An, which is related to B.

Definitions: Page Relationships

Introduction

The above iterator relationships induce the following relationships between pages. Knowledge of page relationships is important for embodiments of the semantic combination interface 141, since it is considered more user-friendly to explain the semantic relationships of the data of the web application by presenting page relationships.

Entity-Related Pages

Two pages are entity-related if the first page has at least one iterator that is entity-related to an iterator of the second page.

Reference-Related Pages

The disclosure uses the term "page AP is forward reference-related to page BP via reference (field) R" if page BP has an iterator B that has a reference field R that refers to an iterator A of the page AP. In this situation the disclosure also uses the term "page BP is backward reference-related to page AP via reference (field) R".

Annotation-Related Pages

Two pages are annotation-related if the first page has at least one iterator that annotates or is annotated from an iterator of the second page.

Indirectly-Related Pages

All of the above forms of relationships between pages are named to direct relationships. Two pages are indirectly related if the first page has at least one iterator that is indirectly related to an iterator of the second page.

Data Structures

Introduction

The following data structures are used by the data combination engine, the semantic combination interface and the rendering engine, which is responsible for creating iterator instances from the iterators.

Local Iterator (Static) Context and Local Record (Dynamic) Context

If a page P has top level iterator $I_0$, which contains iterator $I_1$, etc, until iterator $I_n$ is reached, then the local static context (also called iterator context) of iterator $I_n$ is the list of iterators $[I_0, I_1, \ldots, I_{n-1}]$.

If in a page instance of P the record instance $R_0$ (of iterator $I_0$) contains record instance $R_1$ (of iterator $I_1$), etc, until record instance $R_n$ (of iterator $I_n$) is reached, then the local dynamic context of record $R_n$ (also called local record context of record $R_n$) is the list of records $[R_0, R_1, \ldots, R_{n-1}]$.

According to the above definitions, the local static context of the top level iterator $I_0$ is the empty list. Similarly, the local dynamic context of any record $R_0$ of a top level iterator is the empty list.

Introduction on Views

Every iterator field $I_c$ is associated with a view. The view associated with a data collection iterator is simply itself. Basically, a view associated with a report iterator provides a specification of the function that computes the records that each instance of the particular iterator will report.

The presented embodiment provides, without limitation, the following types of views:

Base Views

A base view 'base(I)' has as input a single iterator I, called the input iterator of the view. Assuming no conditions (due to mechanism by which the designer or the user may filter out records) have been attached to a top level iterator A and A is associated with the view base(B) then the instances of iterator A report the record instances that instances of B report. Top level iterators are always associated with base views, but it is also possible (though less common) that nested iterators are associated with base views.

Path Views

A path view is associated with a nested iterator $I_c$. A path view has various parameters.

For one, a conjunction of relationship conditions where each relationship condition is annotated with (a) one or more pointers to iterators of the local iterator context of $I_c$, which will be used to find records of the context that will be needed for the evaluation of the view and (b) if the relationship is a reference relationship or a specification of the reference fields of the relationship.

As another parameter, an iterator I, called the input iterator of the view. Conceptually, when the page instance is created, a path view outputs the record instances of a nested iterator instance by computing the record instances of I (this computation is achieved by recursively evaluating the view associated with I) and outputting the records that satisfy the specified conjunction of relationship conditions with the specified records of the record context.

The disclosure presents the following relationship conditions and respective parameters.

"Forward," denoted as F[R], when it stands for forward relationship via reference R), which is annotated with a pointer to an iterator I' of the local static context and a reference attribute, which is expected to be a virtual reference field R of the iterator I'. The need for a virtual reference field and the definition of "virtual reference field" are as follows: It may be the case that the forward relationship needs to refer to a reference field R that is not one of the fields of I' in the currently designed page but it is a reference field of the data collection iterator I" that is entity-related to I'. In that sense this reference field R can provide data related to I', even though I' does not display it. Therefore, the disclosure will be calling such a reference field to be a virtual reference field. A simple way to implement virtual reference fields is to always keep in record instances the values of all references, even if the iterator does not display such fields.

"Backward," denoted as B[R], when it stands for backward relationship via reference R), which is annotated with a pointer to an iterator I' of the local static context and a virtual reference attribute R of the iterator I.

"Nested" (N), which is annotated with a pointer to an iterator I' of the local static context.

"Reverse-Nested" (R), which is annotated with a pointer to an iterator I' of the local static context.

"Annotation" (A), which is annotated with one or more pointers to iterators from the local static context. Each one of the pointed iterators of the static context provides (conditions) one or more of the references of the annotation iterator.

"Annotated from" (D), which is annotated with a pointer to an iterator I' of the local static context, which is expected to be an annotation iterator or to have originated from an annotation iterator. The reference of the annotation iterator will condition the records of the iterator I.

In most practical cases (though not necessarily always) the first parameter of path views "Forward", "Backward", "Nested" and "Reverse-Nested" is the last iterator of the local context.

Composition Views

Iterators may also be associated with composition views. Assume that iterator $I_c$ with local iterator context $[I_0, \ldots, I_n]$ is associated with a composition view V. Syntactically, a composite view V is a sequence $[V_{n+1}, \ldots, V_{n+m}]$ of m non-composite views, where the following syntactic difference applies to each of the views: Any relationship condition of a view $V_i$ of the sequence may have pointers to views that precede $V_i$ in the sequence $V_{n+1}, \ldots, V_{n+m}$; it may also have pointers to iterators of the local static context $[I_0, \ldots, I_n]$.

The record instances of the instances of $I_c$ will be computed as follows. Given a particular record context $[R_0, \ldots, R_n]$, where n>=0, the instance of the iterator $I_c$ in record $R_n$ will have its records computed as follows: First the data combination engine computes the list of records $S_{n+1} = V_{n+1}([R_0, \ldots, R_n])$. Basically, this list will have the exact list of records that an iterator $I_{n+1}$ associated with the view $V_{n+1}$ would have, if it operated in the context in which $I_c$ operates. Next, for each record $R_{n+1}$ of $S_{n+1}$ compute the list of records $S_{n+2}(R_{n+1})$ and then concatenate them. Basically the list $S_{n+2}(R_{n+1})$ will have the exact set of records that an iterator $I_{n+2}$ associated with the view $V_{n+2}$ would have, if evaluated with context $[R_0, \ldots, R_n, R_{n+1}]$, with the exception being that if $S_{n+2}(R_{n+1})$ is empty it should instead be replaced with a singleton list with a tuple whose attribute values are null for all fields. The list $S_{n+2}$ will have the concatenation of records that all instances of such an $I_{n+2}$ enclosed in such an $I_{n+1}$ would have if evaluated in context $[R_0, \ldots, R_n]$. Proceeding in a similar fashion, the list of records $S_{n+m}$ is eventually computed. The final result is a list of records where every record of $S_{n+m}$ is expanded with records of its context.

Full Context of Iterator

Basically, the full context of an iterator I keeps track of which types of records have been utilized and with what combination primitives they have been combined (in terms of views) in order to produce the instances of this iterator I. A "type of records" corresponds to the data collection iterator that collected this type of records. The disclosure does not require one to know what tables (or, more generally, data structures) an automatic inference engine or a user created in order to store the data of such data collection iterators. A "combination primitive" corresponds to the views used to combine the records. The full context of an iterator that is nested in other iterators has to include into its full context the records and computation that its parent iterators performed since the parent iterators affect how many record instances and which record instances the descendant iterators will have.

In the described example embodiment the full context of iterators is computed as follows: If an iterator $I_{n+1}$ has local static context $[I_1, I_2, \ldots, I_n]$ and the iterators $I_1, I_2, \ldots, I_n$ are associated with corresponding views $V_1, V_2, \ldots, V_n$ then the full context of $I_{n+1}$ is computed by the following steps. First, construct the composition view $V_1 => V_2 => \ldots => V_n$ of I. Next, basically replace every view whose input iterator is a report iterator with the view of its originating iterator and make also other appropriate changes until the composite view ends up using as input iterators only data collection iterators. When the above composite view has reached that state, it will be the full context of iterator I.

In order to capture the details of the method of computing the full context, the disclosure presents the following method that computes the full context of all iterators of a web application. First order all the iterators of all pages using a topological sort algorithm where an iterator $I_1$ precedes an iterator $I_2$ if iterator $I_2$ originates from iterator $I_1$ (equivalently, if the composite view of $I_2$ uses as $I_1$ as its input iterator). From the iterators of the topological sorting pick the first iterator I whose composition view V is $V_1 => V_2 => \ldots => V_n$ and involves at least one report iterator as input. Assuming the view $V_i$, $0 \leq i \leq n+1$, of the composition view to be the first view in the list of views of the composite that involves a report iterator I' as input and assuming that the iterator I' is associated with the composite view V' which is $V_1' => V_2' => \ldots => V_m'$ the following cases apply depending on the structure of the views of I and I'. The cases where either I or I' are associated with non-composite views are trivially captured by the cases where n or m is 1 respectively, since a composite view with just one component view (for example, a base or a path) is simply a base or a path view.

If $V_i$ is a view base(I') then the full context of I should be transformed to $V_1 => \ldots => V_{i-1} => V_1' => V_2' => \ldots => V_m' => V_{i+1} => \ldots => V_n$. That is, the base(I') view is replaced with V'. All pointers to $V_i$ in the composite view are appropriately transformed to pointers in $V_1', \ldots, V_m'$.

If $V_i$ is a view path(Conditions, I') and $V_m'$ is a view base(I'') then the full context of I is transformed to $V_1 => \ldots => V_{i-1} => V_1' => V_2' => \ldots => V_{m-1}' => \text{path(Conditions, I'')} => \ldots => V_n$.

If $V_i$ is a view path(Conditions, I') and $V_m'$ is a view path (Conditions', I'') then the full context of I is transformed to $V_1 => \ldots => V_{i-1} => V_1' => V_2' => \ldots => V_{m-1}' => \text{path(Conditions AND Conditions', I'')} => \ldots => V_n$, where "Conditions AND Conditions'" stands for the conjunction of the two lists of conditions.

After the above transformations have happened the view V has reduced by one its use of report iterators in the expression (namely, it eliminated one instance of I').

Iterators that Share Context and Their Use by the Semantic Combination Interface Two iterators are said to share context if they have common iterators in their full context. The key use of context sharing applies to annotation iterators: If an iterator I of page P shares context with an annotation iterator I' of page P', then the iterator I' annotates the iterator I (this is the "annotates" relationship referred above, beneath heading "Definitions: Semantic Iterator Relationships"). This is useful in creating the currently designed report page since the iterator I may be extended to have fields that originate from I'.

Semantic Combination Interface 141

The semantic combination interface 141 discovers semantic relationships between the iterators of the currently designed page and iterators of other pages and explains those relationships to the designer. The described embodiment includes the list of relationships listed above, beneath heading "Definition: Semantic Iterator Relationships", while it is possible to incrementally add additional relationships.

Furthermore, if the selected field is semantically related to the fields of the currently designed page in more than one ways then the semantic combination interface of an embodiment may provide to the designer an interface for choosing the nature of the relationship by which the new field will be introduced to the currently designed page. One example is an application that has the following two pages: A page that displays the employees of the company, including their names and salaries, and a second page that displays the departments of a company including a reference, named "manager", to an employee of the company, and a list of references named "members" also to employees of the company. Next the designer has designed a page "Department Expenses" where he lists the complete information of the second page. The semantic combination interface indicates to the designer that the "employees" page (and therefore its fields name and salary) is related to the "Department Expenses" page. However, the semantic combination interface also explains to the designer that employee information can be semantically related to the "Department Expenses" page in two ways: It may be employee fields pertaining to the managers of the departments or employee fields pertaining to the members of the departments. If the designer wants to introduce, for example, salary information the designer will need to specify if it is the manager's or the members' salary that is being introduced.

The complete list of relationships between iterators can often be too large for effective presentation to the user. In such case the semantic combination interface of an embodiment may elect to employ heuristics in order to hide from the designer relationships that are easily implied and can be indirectly obtained from other relationships, which are indicated to the designer.

In addition to the above heuristics the semantic combination interface of an embodiment, such as the embodiment illustrated below, beneath the headings "Field Trees" and "Example: Illustration of Operation of FIG. 27 in the context of the hiring application", may explain semantic relationships to the designer using a combination of iterator relationships and page relationships, since pages tend to be more easily understood by naïve designers.

Field Trees

The field tree 3303 is a tree data structure, used by the semantic combination interface 141 of the presented embodiment. It consists of the following: (1) Some nodes, called iterator nodes, are associated with iterators. (2) A subset of iterator nodes are tagged to be page nodes; those are the iterator nodes that are associated with top level iterators, in the particular embodiment that assumes one top level iterator per page; the generalization is straightforward. (3) Other nodes, called field nodes, are associated with non-iterator fields (e.g., data collection, report, hyperlink). (4) Edges between page nodes are associated with the "entity", "backward reference", and "annotation" types of relationship (see above, beneath heading "Definitions: Page Relationships") between page nodes. (5) Edges targeting non-page iterators denote the nesting (and reverse nesting) relationships. (6) Edges between iterator nodes and field nodes indicate that the iterator associated with the iterator node contains the field associated with the leaf node. (7) Edges from field nodes corresponding to references to page nodes stand for the forward reference relationship (via the particular reference field) between the iterator that contains the particular field and an iterator target page.

This embodiment takes the approach that it is more user friendly to illustrate page relationships, in certain occasions, instead of directly illustrating the underlying iterator relationship between iterators of the page.

Automatic Modification of Page in Response to Report Field Introduction

Introduction

As described in the operation of FIG. 27, the designer who builds a report page P, simply selects (in step 2706) an originating field 3305 that is semantically related to fields of the currently designed page 3301. In response the data combination engine automatically modifies in step 2707 the currently designed page to include a new field 3306 that reports the data of the selected field.

A key benefit of the disclosure is captured by step 2707, where the currently designed page is automatically modified to include the new field, without requiring from the designer to specify where exactly in the currently designed page the new field should reside or how the page should be modified (for example, by including nested iterators 3309) in order to have the new field fit in. Those operations are automatically accomplished by the data combination engine. The disclosure presents next the aspects of an example embodiment that allow such operation.

When the designer chooses an originating field F that is contained in an iterator (node) I of the field tree then the data combination engine finds in the field tree the path $I_0, E_1, I_1, \ldots, E_n, I$ that starts at the top level iterator of the starting page and ends at the iterator I. The iterators $I_1, \ldots, I_n$ are the iterators between $I_0$ and $I_n$ on the path on the field tree from the top level iterator of the starting page to I; the edge $E_1$ is the field tree edge that connects $I_0$ to $I_1$; the meaning of $E_2, \ldots, E_n$ is similar. The edges are annotated with the corresponding iterator relationships, described above beneath heading "Definitions: Semantic Iterator Relationships". Consequently, the data combination module creates a composition function from the path above. In particular the composition function is base($I_0$)=>path($E_1, I_1$)=> . . . =>path($E_n, I_n$), where the use of the edge relationships in path views signifies that the relationship condition in the path view should be corresponding to the iterator relationship. For example, if $E_1$ is the "Nested" iterator relationship, the path relationship condition should also be :Nested" (N).

Then the data combination engine checks whether there is an iterator I' in the currently designed page whose full context is equivalent with the composition view described above. The embodiment takes the freedom to compare the context of a view with the context of an iterator since, as the computation of full context showed, the full context is just a composite view involving data collection iterators only. If there is an iterator I' of the currently designed page whose full context is equivalent to the composition view then a new field is created, originating from F, and is placed in I'.

If there is no iterator in the currently designed page that has identical context with the composition view then the data combination module performs the following steps: It drops the last step of the path (i.e., the "$E_n$, I" part in the path above) and creates a new composite function for the remaining prefix of the path, i.e., it creates the composite function base($I_0$)=> path($E_1, E_1$)=> . . . =>path($E_{n-1}, I_{n-1}$) and tries to find an iterator with same context. If such an iterator I'' is found the data combination module adds to the iterator I'' a nested report iterator $I_{N1}$, whose view is 'path($E_{n-1}, I_{n-1}$)'. If such an iterator is not found then the next last step of the path is removed and the procedure is repeated recursively. Note that eventually it is guaranteed that this procedure will find an iterator, since at least $I_0$ satisfies the equivalent context property.

Singleton Iterator Removal

An embodiment may elect to minimize the number of iterators it shows by removing all iterators whose instances are guaranteed to have at most a single record instance. An inference that an iterator can have at most one instance can be done by inspection of its path view: For example, if the single condition of a path view is (1) a forward reference or (2) a reverse-nesting or (3) an annotation iterator where all references of the annotation have been conditioned by the context, then such iterator is guaranteed to have no more than one records.

Iterators with Equivalent Full Context

As described in the previous paragraph, the operation 2707 of FIG. 27 (described in the above paragraph) relies on finding in the currently designed page an iterator that has equivalent context with the field to be introduced from the field tree (where by context of the field the disclosure means context of the iterator of the field).

In one embodiment finding whether two iterators have equivalent context may be implemented by checking syntactic identity of the full context of the two iterators.

The above implementation is simple but it may miss opportunities to detect that the context of two iterators may be semantically identical, albeit not syntactically identical. For example, a full context base(A)=>base(B) is semantically equivalent to a full context base(A)=>base(B) since they both describe all pairs of A and B records.

To capture opportunities such as the one of the above paragraph an embodiment may employ algorithms a modification of algorithms that decide the equivalence of query expressions, since the full context expressions effectively stand for corresponding queries.

Example

Illustration of Operation of FIG. 27 in the Context of the Hiring Application

The following is an example showing how the operations of FIG. 27 may be carried out in practice. This is illustrated, particularly, in the context of the hiring application introduced above, beneath heading "Example of Database-Driven Web Application".

The example starts at the point where, at least, the pages "Publish Company Positions", "Submit Resume" and "Review, Comment and Rate Resumes" have already been built and already have some data, i.e., company positions records, submitted resumes, ratings and comments on the resumes, etc. At this point in the example the designer wants to design an "Executive Summary" page that will provide to its users the name and age of the applicants, the positions they applied for and the private ratings they received. Notice that there is not a single page from which those data can be obtained: The "Data from Submit Resume" page can provide for each candidate the name, age and the list of positions that the candidate applied for, but does not have the private ratings for each position that the candidate applied for. The "Data from Review, Comment and Rate Resumes" can provide the name, list of positions and private ratings that the candidates received but does not provide the age. The data of the two pages can be combined in the new page "Executive Summary" by the following example process.

Figure 28:
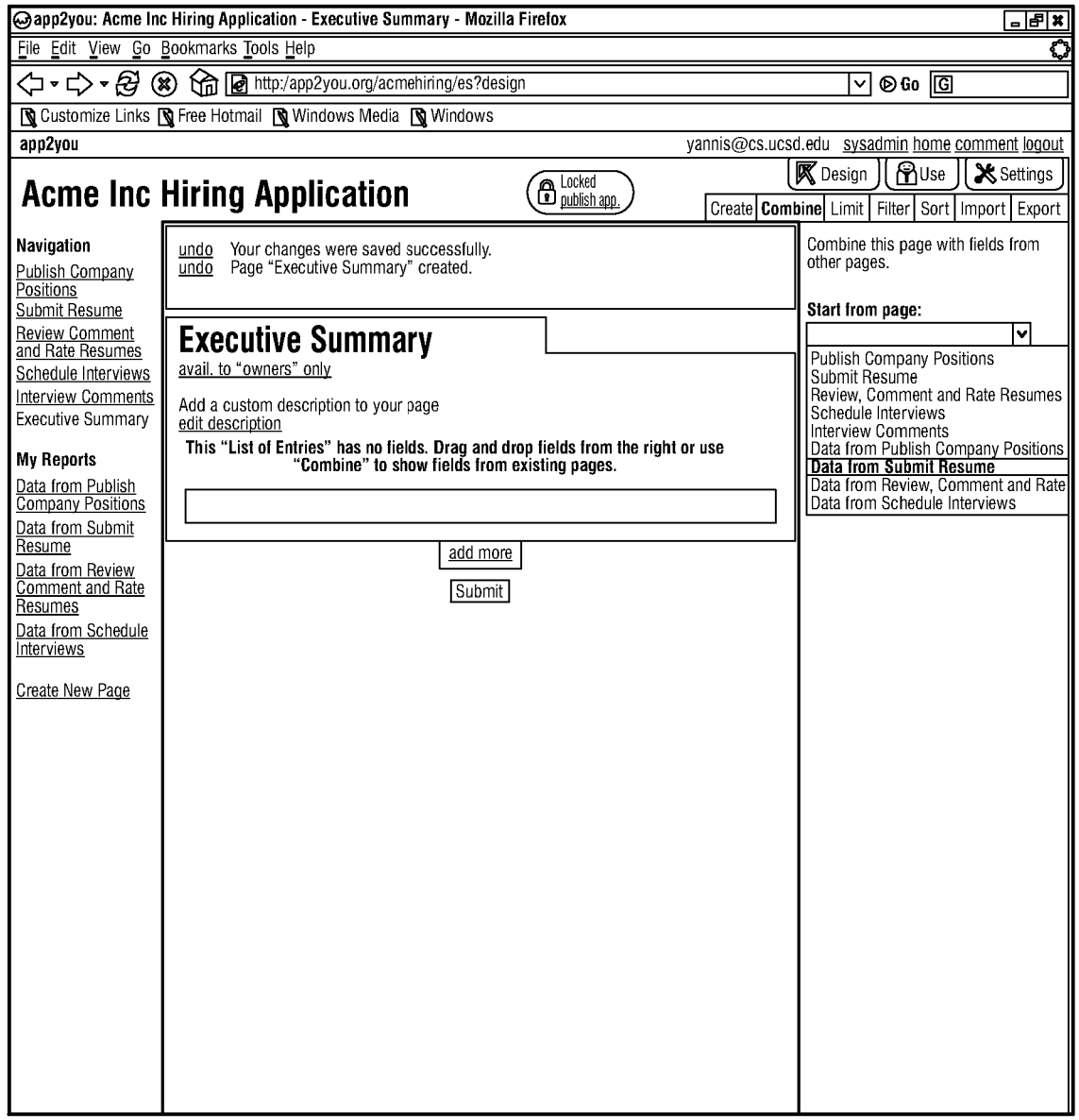
FIG. 28 is a screen shot showing an example of designer choosing a starting page in the semantic combination interface, in the context of the example Hiring Application.
Figure 29:
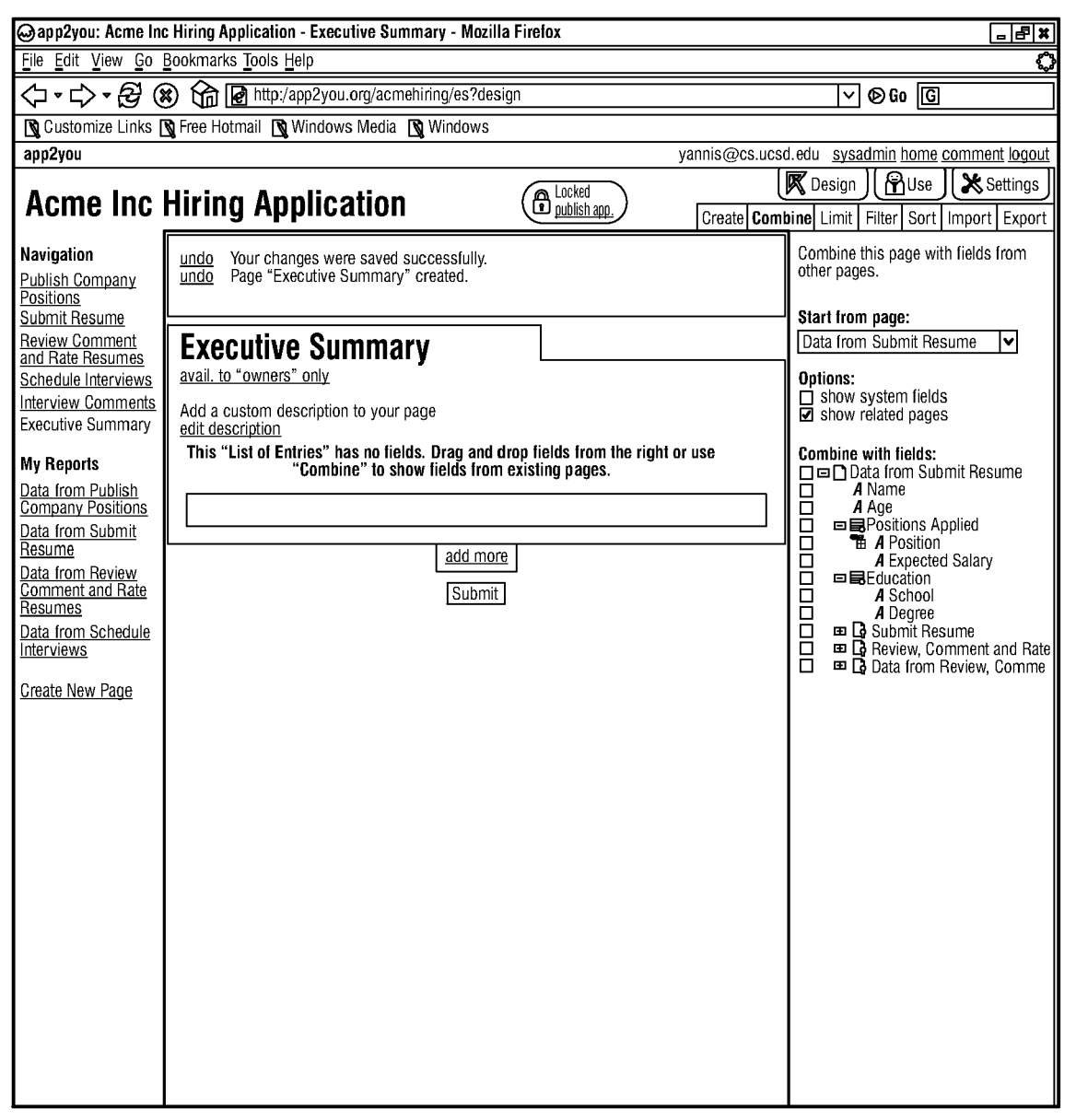

The designer initiates a page "Executive Summary" and invokes the semantic combination interface by clicking the "Combine" tab. Since the new page does yet have report fields, the semantic combination interface (according to step 2703) presents the list of starting pages that is shown on the right side of FIG. 28. The designer picks (in step 2704) the page "Data from Submit Resume". This leads to the display of the field tree (due to step 2705) that is shown on the right side of FIG. 29.

In this example field tree, the following iterator relationships are indicated (among others): (1) The "Positions Applied" and "Education" iterators are nested in the "Data from Submit Resume" iterator (i.e., the top level iterator of the "Data from Submit Resume" page) as indicated by the table box next to them. (2) The page "Data from Review, Comment and Rate Resumes" is annotation-related (as indicated by the light bulb symbol) to "Data from Submit Resume". This is due to the fact that the "Review, Comment and Rate Resumes" carries annotation iterators that annotate the top level iterator of the "Review, Comment and Rate Resumes" (and therefore all iterators that are entity related to "Submit Resume") and its "Positions Applied" child (and all iterators that are entity-related to it). The annotation iterators are the "Private Rating" annotation iterator and a second annotation iterator that carries the "Public Comments" and "Private Comments". The light-bulb symbol is also used to denote entity relationships since the two concepts are fairly close.

The designer introduces a report field "Name" in the currently designed page by checking the checkbox that is next to "Name" on the field tree and therefore selecting this field/node of the field tree (step 2706). According to the terminology of the disclosure the field "Name" of "Data from Submit Resume" is the originating field of the field "Name" of the currently designed page "Executive Summary". The designer can modify the field name of the newly introduced report field if he wishes.

At this point in the example, the data combination module has set the top level iterator of "Executive Summary" to be a report iterator associated with a view 'base(DSR)' where DSR stands for the top level iterator of the "Data from Submit Resume", which, in turn, originates from "Submit Resume". Basically, the association with this base view captures the fact that the "Executive Summary" iterator reports the same records (resumes) with the "Data from Submit Resume". The full context of the "Executive Summary" iterator is the singleton list [SR] where SR stands for the top level iterator of the data collection iterator "Submit Resume" from which both DSR and the "Executive Summary" iterator originate, directly or indirectly.

The designer may proceed by adding the report field "Age" that has as originating field the "Age" field under "Data from Submit Resume" and the report field "Position" that has as originating field the "Position" field under "Data from Submit Resume".

The addition of "Position" is handled as follows by the data combination module: The originating "Position" field appears within the nested iterator "Positions Applied" of the "Data from Submit Resume", whose associated view is path (<N>, SRPA) where SRPA is the data collection iterator "Positions Applied" of the "Submit Resume". Since its parent iterator DSR is associated with the view base(SR) the full context of the "Positions Applied" iterator is [SR=>path(<N>,SRPA)] where SRPA is the data collection iterator "Positions Applied" of the "Submit Resume" page. Since there is no iterator with such full context in the currently designed page "Executive Summary" the data combination module starts dropping views from the end of the context until it finds a prefix of the context that has an iterator with equivalent context in "Executive Summary". This prefix is [SR]. Therefore the data combination engine introduces the "Position" field in the currently designed page by (1) introducing the "Positions Applied" iterator and (2) associating it with a view that establishes that iterators "Executive Summary" and its child "Positions Applied" have the same relationship that their respective originating iterators have—namely <N>.

The view associated with the "Positions Applied" iterator of the currently designed page is 'path(<N>, DSRPA)', where DSRPA is the "Positions Applied" iterator of the "Data from Submit Resume".

Figure 30:
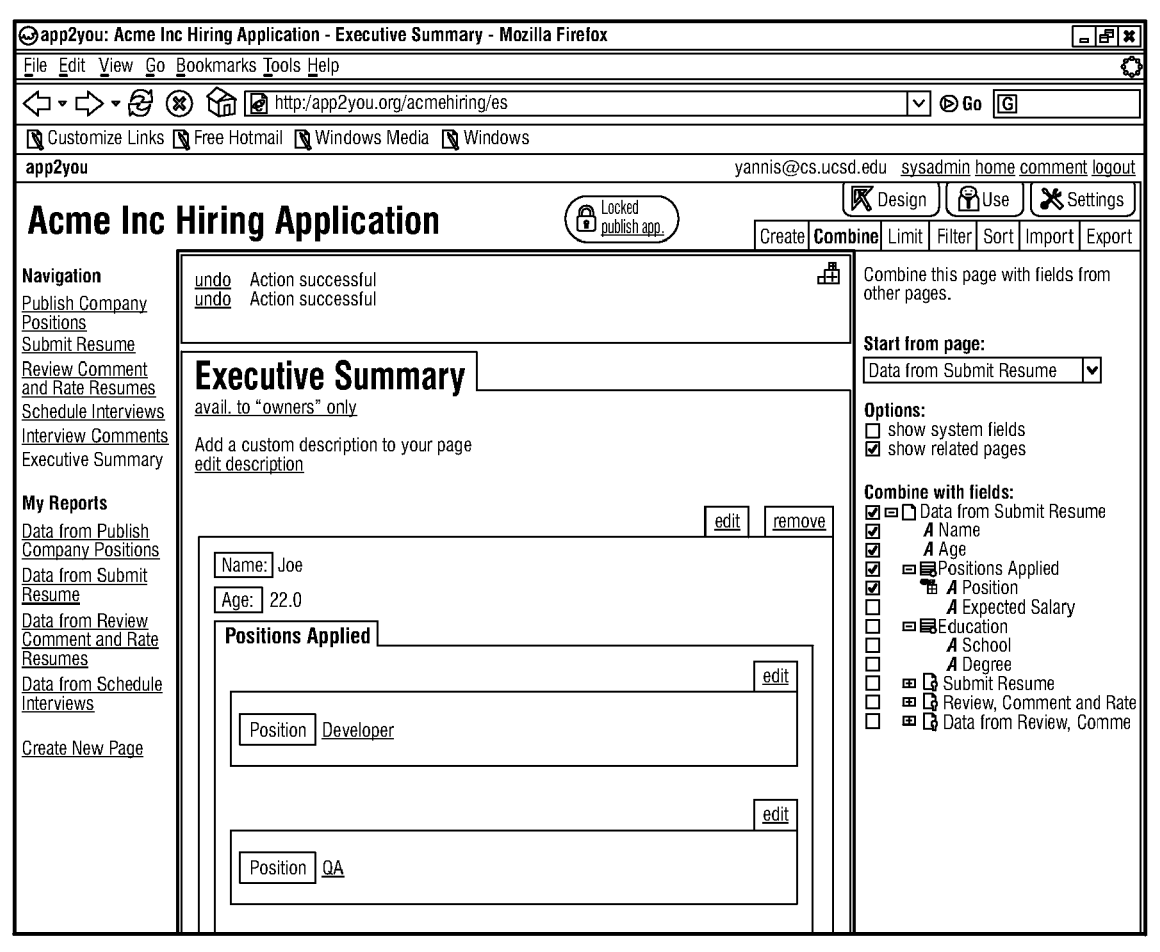

After these three report fields have been added the currently designed page appears as the snapshot of FIG. 30.

The following description presents the state of the iterators during the time that the snapshot of FIG. 30 is taken. In this state the top level iterator of the currently designed page has the associated view 'base(DSR)', where DSR is the top level iterator of the page "Data from Submit Resume". This view indicates that for each top level record of "Data from Submit resume" there will be a corresponding top level record of "Executive Summary". The latter will be reporting the "Name" and "Age" fields. The "Positions Applied" iterator of the currently designed page is associated with the view 'path (<N>,DSRPA)' where DSRPA is the "Positions Applied" iterator of the "Data from Submit Resume" page.

Detail: Elimination of Duplicate Fields

Figure 31:
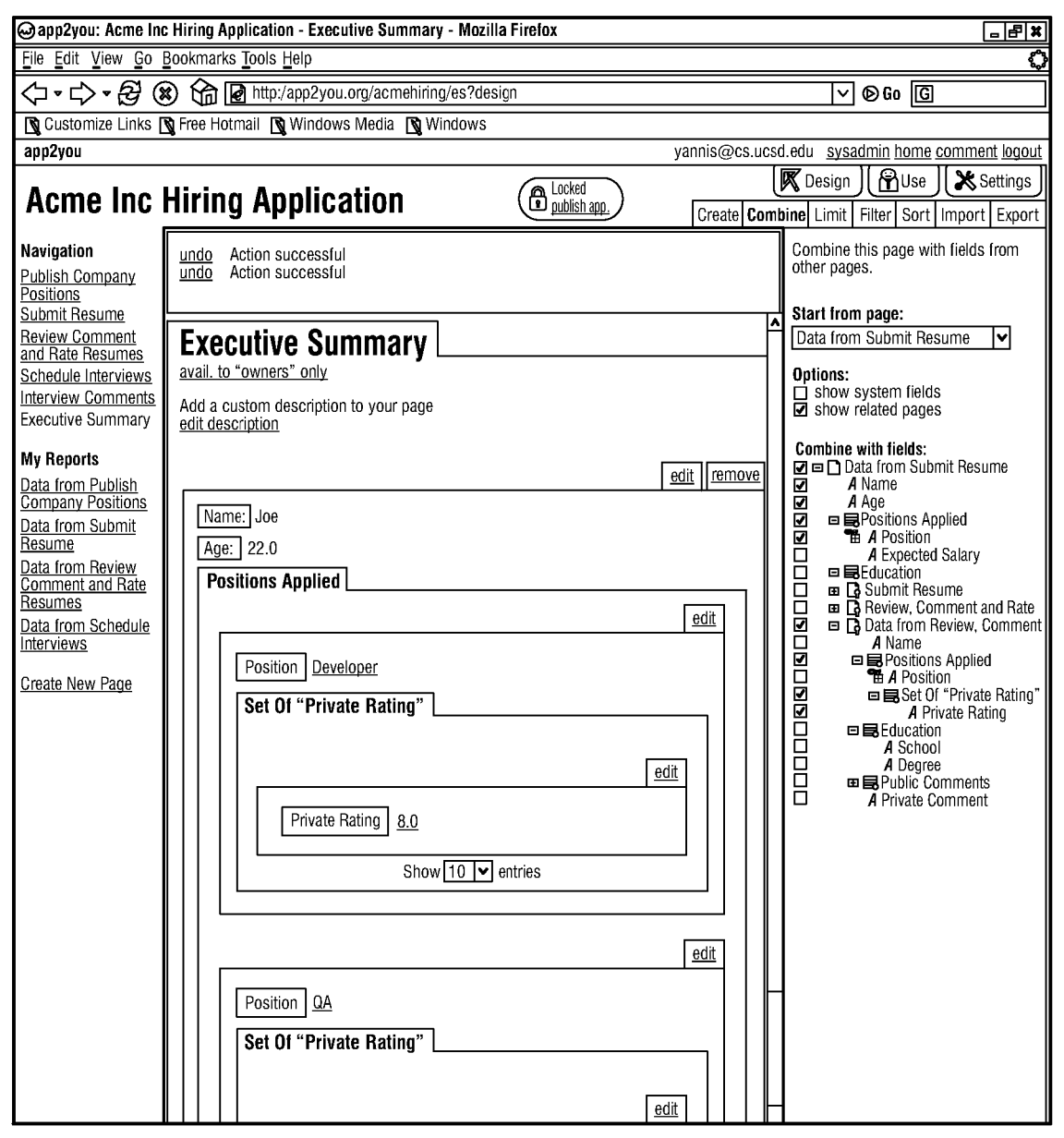

The page field tree of the described embodiment shows all the fields of each page for clarity's sake. There could, however, exist fields of multiple pages yet the effect of any of them is identical (with respect to data that will appear in the pages) with including any other field. Such fields are referred to herein as "duplicate." In the example of FIG. 31, the "Name" fields on "Data from Submit Resume" and "Data from Review . . . " are duplicates of each other. It is possible that the "Show Fields" design guide shows multiple instances of the same field of the same iterator, whereas each instance produces a different effect. As the number of pages increase within an application, duplicate fields will take up much real estate on the visualization of the field tree.

The example embodiment of the disclosure provides to the designer an option to hide all except one from each set of duplicate fields. If the designer elects this option then the designer is offered further options to choose which one of the duplicate fields will be the one that will be displayed on the field tree.

Computation of whether two fields are duplicate of each other has to take into consideration the complete context of the two fields.

Hyperlinks

Hyperlink fields are yet another kind of field (in addition to data collection fields, report fields, and iterator fields) provided by the current embodiment. Basically, hyperlink field instances carry the context of the record instances they appear in and use this context to condition which records will be displayed at their target pages.

Operation of Configuring Hyperlink in Design Mode

A hyperlink field is introduced in an iterator of a page by step 616A of FIG. 6.

First, the designer associates a hyperlink field with text that is displayed on the hyperlink. Embodiments of this disclosure may also associate a hyperlink field with a report field that produces the text of the hyperlink.

Second, the data combination engine associates the hyperlink field with a static context, which by default is the full context of the iterator in which it was included, where the present embodiment computes the full context of the iterator using the method described above, beneath heading "Full Context". Basically, the full context captures what types of records are retrieved and what computation primitives have been used by the iterator in order to produce the record instances in which the hyperlink appears. It is possible, as explained next, to allow the designer to modify the default context of the hyperlink. For presentation simplicity, this disclosure discusses the case where the default context does not contain multiple instances of the same data collection iterator. Extensions to default context that has the same data collection iterator in multiple roles can be incrementally included.

Third the designer associates the hyperlink field to a target page of the web application, with the guidance of the data combination engine that discovers, as described next, which pages are eligible targets. Once the application is in use, each instance of the hyperlink field will, in general, navigate to a different instance of the target page, where the difference among the various instances of the target pages are based on how the context of the hyperlink conditions the target page, where conditioning means that the context of the hyperlink effects a selection of which one of the records of the target page instance will be produced and displayed.

Embodiments can offer a list of options about how a hyperlink conditions a target page, as described next. However, in order for conditioning to be effected it is necessary (at a minimum requirement) that the hyperlink shares context with at least one iterator of the target page.

The present embodiment captures this minimum requirement by discovering the pages that satisfy this requirement and presenting to the designer the list of these pages so that the designer chooses one of them to be the target of the hyperlink.

Operation of Hyperlink During Use of the Application

The present embodiment provides a conditioning option where the following sequence of steps happen when the application is made available for use, a hyperlink field instance is clicked and a target page instance is produced:

First, the dynamic full context of the given hyperlink instance is computed. The dynamic context assigns a record ID value to each data collection iterator of the static context. In particular, it assigns to each data collection iterator of the full context the record R collected by this data collection iterator, where R has been used in the computation of the current record instance.

Second, every iterator of the target page that shares full context with the context of the hyperlink is conditioned to produce only record instances whose dynamic full context has the same records for with the dynamic full context of the hyperlink for the data collection iterators that are shared between the hyperlink full context and the iterator full context.

Example

Illustration of Hyperlink Operation

Figure 34:
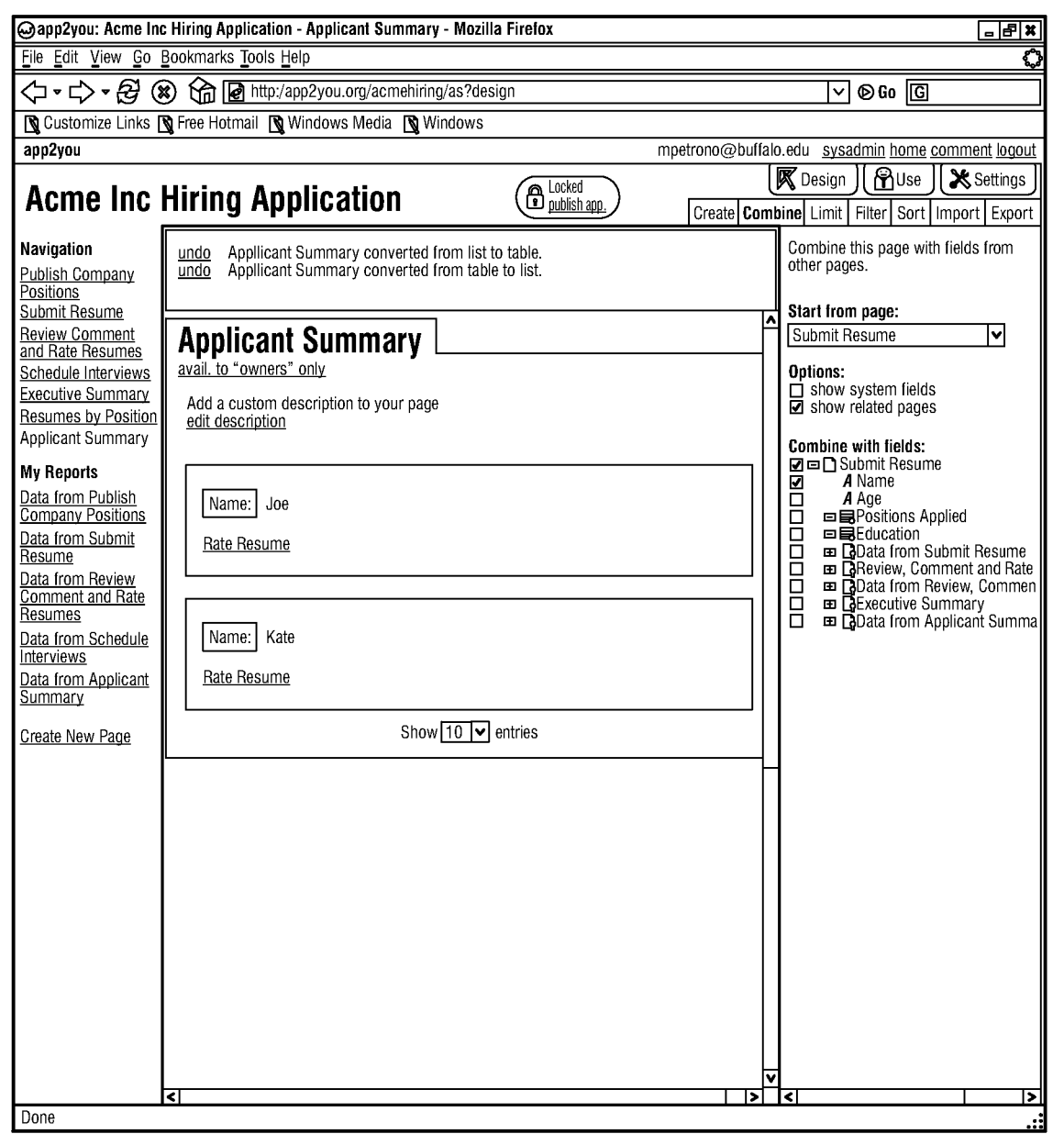

An example is shown by the page "Applicant Summary" of FIG. 34. The top-level iterator of this page has originated from the "Submit Resume" data collection iterator. Therefore, its full context contains only the "Submit Resume" iterator. The designer has introduced the hyperlink with text "Rate Resume" in the "Applicant Summary" iterator. Therefore the static context of the hyperlink also contains only the "Submit Resume" iterator.

Assuming the "Joe" record collected by "Submit Resumes" is record $R_J$ and the "Kate" record collected by "Submit Resumes" is record $R_K$ the dynamic full context of the first hyperlink instance is $R_J$ and the dynamic full context of the second hyperlink instance is $R_K$.

Figure 35:
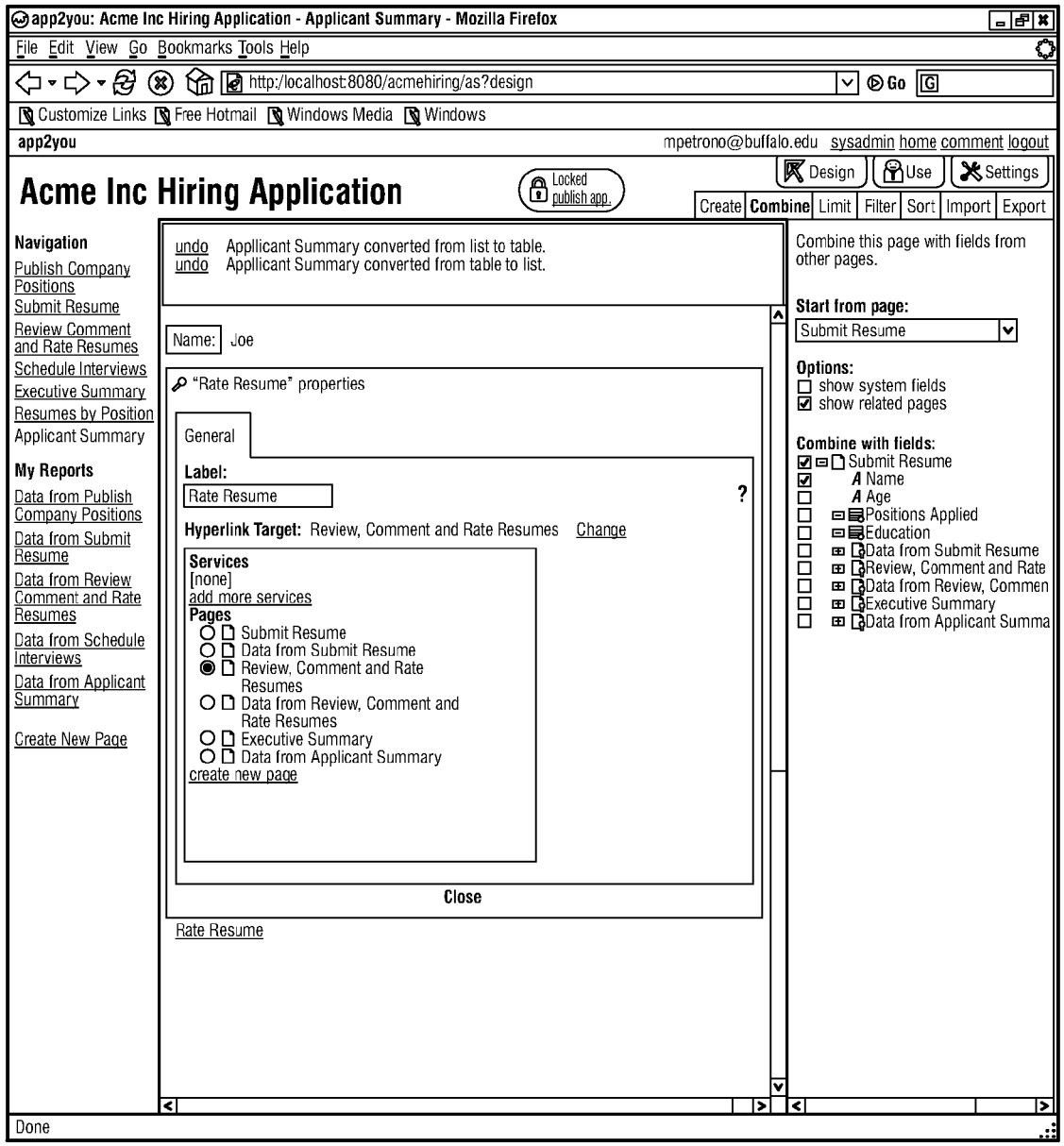
FIG. 35 is a screen shot showing an example of the data combination engine providing guidance to the designer regarding pages that are possible targets of hyperlink.

Next the designer sets the target page of the hyperlink to be the "Review, Comment and Rate Resumes" using guidance of the data combination engine regarding identifying appropriate targets (see FIG. 35). This page has an iterator (namely the top one) that shares context "Submit Resumes" with the static context of the hyperlink. Therefore it satisfies the minimum requirement for being the target of the hyperlink. The pages of FIGS. 8, 10, 31, 32 also satisfy the minimum requirement and are suggested to the designer as possible options.

When the application is made available for use, a user may click on the hyperlink next to "Joe". Since the dynamic full context of this hyperlink is $R_J$ the application will navigate to the "Review, Comment and Rate Resumes" page and condition its top level iterator to only display the "Joe" record since it is the one that shares dynamic context (namely $R_J$) with the hyperlink.

Figure 32:
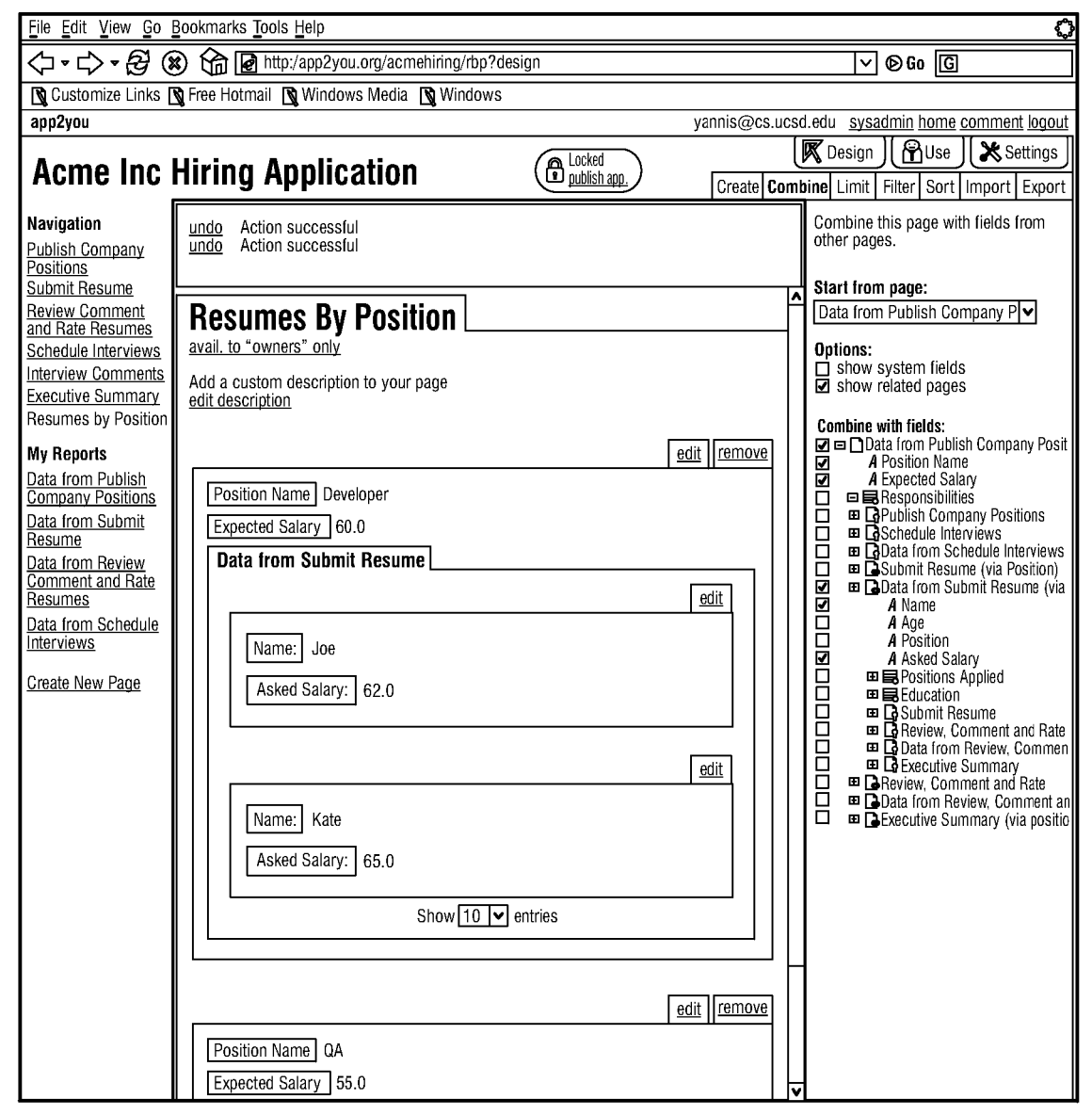

Next, the designer changes (for the sake of the example) the target of the hyperlink to be the "resumes by Position" page of FIG. 32. Therefore the hyperlink shares context with the inner iterator "Data from Submit Resume". The context of the inner iterator contains the data collection iterators "Submit Resume" and "Publish Company Positions" (since inner iterators carry their parents context also). The hyperlink does not share context with the top iterator, whose full context contains only "Publish Company Positions".

Therefore, when the application is made available for use and a user clicks the "Joe" record, both the "Developer" and "QA" records will be displayed but the nested iterator instances will only show the "Joe" records and not the "Kate" records.

Automatic Creation of Perfect Target Page

The data combination module offers to the designer the option to automatically create a report page whose top level view is a report iterator annotated with a composite view that is the full context of the iterator that contains the hyperlink. In that sense, the hyperlink and its target page have perfect sharing of context and, in that sense, such a target page is a perfect target for the purposes of this hyperlink.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method, comprising operations of:
   (a) initiating a database-driven application including one or more pages to store data in records of a database, report data from the database, or both store data in the database and report data from the database;
       where a schema defines characteristics of records in the database;
   (b) making fields including all of the following specified types of fields available for introduction into the pages:
       (b1) data collection fields to perform functions including collecting user data into the database, where introduction of a data collection field modifies the schema to define a new record field;
       (b2) report fields to perform functions including displaying and editing data from records of the database;
       (b3) iterators, each including one or more of the following: at least one data collection field, at least one report field, at least one nested iterator;
           where each iterator that includes any report fields is configured to utilize records from the database to produce a repeating structure of record instances displaying data from said database in an instance of a dynamic page;
           where data collection iterators are defined as iterators containing any data collection fields;
           where report iterators are defined as iterator fields containing any report fields;
   (c) receiving human input introducing at least one field of the specified types to at least one of the pages;
   (d) introducing one or more iterators to at least one of the pages by one of the following: automatically, or via human input received in the operation (c);
   (e) where the operation (c) further includes introducing into at least one of the pages report fields that display data from records collected by data collection fields introduced in another page and the operation (c) includes:
       (1) receiving human input adding both report fields and data collection fields pertaining to a given user-selected iterator, where a repeating structure produced by the given user-selected iterator in an instance of a dynamic page displays record instances including both respective report field instances and data collection field instances, where said report instances display data from iterators other than the given user selected iterator; and
       (2) receiving human input specifying an existing data collection field causing an introduced report field to display data collected by the existing data collection field;
   (f) a computer-driven inference engine automatically creating data structures representative of operations (a) and (c) and (d) and (e) in the database and automatically relating fields of the pages to the data structures in accordance with a predetermined logical framework.

2. The method of claim 1, where the operation of receiving human input introducing at least one field further comprises:
   receiving human input specifying an existing report field causing an introduced report field to display data reported by the existing report field.

3. The method of claim 1, where:
   as to one or more iterators containing a report field, the operations further include displaying said one or more iterators in table form where record instances appear as table rows and fields contained in said one or more iterators appear as table columns.

4. The method of claim 1, the operations further comprising:
   responsive to initiation of introduction of a field X to a page Z in the operation (c), discovering fields of other pages that are semantically related to the page Z;
   where said discovering operation discovers fields having any of the following semantic relationships (1), (2), (3), or (4) to fields that have been introduced into page Z, including at least one of relationships (1) or (3) specified as follows:
       (1) fields are related if they appear in iterators that share common context, where context of a given iterator includes:

if the given iterator includes report fields: data collection iterators whose collected records are utilized in order to produce record instances of the given report iterator;

if the given iterator has data collection fields: the given iterator itself;

if the given iterator is nested in one or more ancestor iterators: data collection iterators whose collected record instances are utilized to produce record instances of the ancestor iterators;

(2) fields are related if they appear in respective iterators where one of the respective iterators contains a reference to records reported by or collected by another of the respective iterators;

(3) fields are related if they appear in iterators related due to nesting;

(4) indirect relationships built by combinations of any of the semantic relationships (1), (2), or (3);

presenting said discovered fields to a human user;

receiving user selection of one or more of the presented discovered fields.

5. The method of claim 4, the operations further including, responsive to user selection of one of the discovered fields in association with the page Z:

automatically modifying the page Z so that the modified page Z includes the field X and the field X reports data associated with the selected discovered field.

6. The method of claim 1, further comprising:

responsive to initiation of introduction of a field X to a page Z in the operation (c), discovering fields of other pages that are semantically related to the page Z;

presenting said discovered fields to a human user;

receiving user selection or one or more of the presented discovered fields;

automatically modifying the page Z so that the modified page Z includes the field X and the field X reports data associated with the selected discovered field.

7. The method of claim 5, where context of a given report iterator includes:

if the given iterator contains any report fields: data collection iterators whose collected records have been utilized and combination primitives by which records collected by said data collection iterators are produced;

if the given iterator contains any data collection fields: the given iterator itself;

if the given iterator is nested in one or more ancestor iterators: data collection iterators whose collected record instances have been utilized and combination primitives by which records collected by said data collection iterators are produced;

where the operations further comprise determining whether an iterator with context equivalent to context of the selected discovered field is present in any of the pages;

if so, introducing the field X into the present iterator;

otherwise, introducing one or more iterators in the page Z to create an iterator having equivalent context with the selected discovered field and receiving the field X.

8. The method of claim 1, further comprising:

substantially immediately modifying the schema responsive to each act of introducing a field and also making the database defined by the modified schema substantially immediately available to human users of the database-driven application.

9. The method of claim 1, further comprising using regions of the pages to represent said fields introduced to said pages;

responsive to human input including receiving drag and drop actions selecting a data collection field from a displayed pallet and placing the selected data collection field upon a region already designated to represent an iterator, adding the selected data collection field into the represented iterator.

10. The method of claim 1, where the operation of receiving human input introducing at least one field to at least one of the pages includes introducing the following into a field of a source iterator S that includes at least one report field: a hyperlink pointing to a user-selected target page;

where every record instance X of the source iterator S contains an instance of the hyperlink, said hyperlink instance configured to cause display of a target page instance retaining context of the record instance X;

wherein context of the record instance X comprises (1) record instances that were utilized in order to produce the record instance X and (2) record instances utilized to produce ancestor record instances of the record instance X;

where said target page instance retaining context of the record instance X is satisfied by a condition where: one or more iterators of the target page sharing context with the record instance X displaying only record instances sharing context with the record instance X.

11. The method of claim 10, further comprising:

the computer-driven inference engine discovering pages in which iterators were introduced that share context with the source iterator S, and providing a human-readable output suggesting the discovered pages as potential targets of the hyperlink.

12. The method of claim 10, further comprising:

creating one or more representative pages that share context with the source iterator S, said hyperlink pointing to a selected one of said representative pages.

13. A computer-implemented method, comprising operations of:

(a) initiating a database-driven application including one or more pages to store data in records of a database, report data from the database, or both store data in the database and report data from the database;

where a schema defines characteristics of records in the database;

(b) making fields including all of the following specified types of fields available for introduction into the pages:

(b1) data collection fields to perform functions including collecting user data into the database, where introduction of a data collection field modifies the schema to define a new record field;

(b2) report fields to perform functions including displaying and editing data from records of the database;

(b3) iterators, each including one or more of the following: at least one data collection field, at least one report field, at least one nested iterator;

where each iterator that includes any report fields is configured to utilize records from the database to produce a repeating structure of record instances displaying data from said database in an instance of a dynamic page;

where data collection iterators are defined as iterators containing any data collection fields;

where report iterators are defined as iterator fields containing any report fields;

(c) receiving human input introducing at least one field of the specified types to at least one of the pages, including at least one report field, and receiving human input associating an existing database attribute with the at least one report field, causing the at least one report field to display data associated with the existing database attribute;

(d) introducing one or more iterators to at least one of the pages by one of the following: automatically, or via human input received in the operation (c);

(e) where the operation (c) further includes introducing into at least one of the pages report fields that display data from records collected by data collection fields introduced in another page and the operation (c) additionally includes at least:

receiving human input configuring iterator fields such that at least some of said iterators are nested in a parent iterator, and each of said parent iterators and said nested iterators include data collection fields;

(f) a computer-driven inference engine automatically creating data structures representative of operations (a) and (c) and (d) and (e) in the database and automatically relating fields of the pages to the data structures in accordance with a predetermined logical framework.

14. The method of claim 13, where the operation (b) is performed such that the iterators may recursively include other iterators up to any depth.

15. The method of claim 13, further comprising, for each nested iterator, displaying said nested iterator as a nested table.

16. The method of claim 13, further comprising operations of:

receiving human specification of user access rights as to record instances of a given iterator;
providing edit and display modes for the record instances of the given iterator;
as to nested iterators that have been introduced into the given iterator, enforcing access rights to record instances of the nested iterators according to a combination of: the specified access rights and which of the modes is current.

17. The method of claim 13, further comprising operations of:

providing an edit mode for a user to edit a record instance of an iterator;
providing a display mode for a user to display a record instance of an iterator;
as to a given iterator, making access rights available for designation by a user, the access rights comprising:
access to edit record instances of the given iterator,
access to delete record instances of the given iterator,
access to insert record instances of the given iterator,
access to display record instances of the given iterator;
as to a nested iterator, and each particular one of the access rights, conditioning access rights to given record instances of the iterator upon further user input including:
directions to always allow the particular access right;
directions to always disallow the particular access right;
directions to allow the particular access right only when a parent record instance to the given record instance is in the edit mode.

18. A computer-implemented method, comprising operations of:

(a) initiating a database-driven application including one or more pages to store data in records of a database, report data from the database, or both store data in the database and report data from the database;
where a schema defines characteristics of records in the database;

(b) making fields including all of the following specified types of fields available for introduction into the pages:
(b1) data collection fields to perform functions including collecting user data into the database, where introduction of a data collection field modifies the schema to define a new record field;
(b2) report fields to perform functions including displaying and editing data from records of the database;
(b3) iterators, each including one or more of the following: at least one data collection field, at least one report field, at least one nested iterator;
where each iterator that includes any report fields is configured to utilize records from the database to produce a repeating structure of record instances displaying data from said database in an instance of a dynamic page;
where data collection iterators are defined as iterators containing any data collection fields;
where report iterators are defined as iterator fields containing any report fields;

(c) receiving human input introducing at least one field of the specified types to at least one of the pages, including at least one report field, and receiving human input associating an existing database attribute with the at least one report field, causing the at least one report field to display data associated with the existing database attribute;

(d) introducing one or more iterators to at least one of the pages by one of the following: automatically, or via human input received in the operation (c);

(e) where the operation (c) further includes introducing into at least one of the pages report fields that display data from records collected by data collection fields introduced in another page and the operation (c) additionally includes at least:

receiving human input adding both report fields and data collection fields pertaining to a given user-selected iterator, where a repeating structure produced by the user-selected iterator in an instance of a dynamic page displays record instances including both respective report field instances and data collection field instances, where said report instances display data from other iterators than the user selected iterator;

(f) a computer-driven inference engine automatically creating data structures representative of operations (a) and (c) and (d) and (e) in the database and automatically relating fields of the pages to the data structures in accordance with a predetermined logical framework.

19. The method of claim 18, the operations further comprising:

responsive to initiation of introduction of a field X to a page Z in the operation (c), discovering fields of other pages that are semantically related to the page Z;
said discovering operation discovers fields having any of the following semantic relationships (1), (2), (3), or (4) to fields that have been introduced into page Z, including least relationship (1) specified as follows:
(1) fields are related if they appear in iterators that share common context, where context of a given iterator includes:
if the given iterator includes report fields: data collection iterators whose collected records are utilized in order to produce record instances of the given report iterator;
if the given iterator has data collection fields: the given iterator itself;
if the given iterator is nested in one or more ancestor iterators: data collection iterators whose collected record instances are utilized to produce record instances of the ancestor iterators;

(2) fields are related if they appear in respective iterators where one of the respective iterators contains a reference to records reported by or collected by another of the respective iterators;

(3) fields are related if they appear in iterators related due to nesting;

(4) indirect relationships built by combinations of any of the semantic relationships (1), (2), or (3);

presenting said discovered fields to a human user;

receiving user selection of one or more of the presented discovered fields.

20. The method of claim 19, the operations further including, responsive to user selection of one of the discovered fields in association with the page Z:

automatically modifying the page Z so that the modified page Z includes the field X and the field X reports data associated with the selected discovered field.

21. The method of claim 20, where context of a given report iterator includes:

if the given iterator contains any report fields: data collection iterators whose collected records have been utilized and combination primitives by which records collected by said data collection iterators are produced;

if the given iterator contains any data collection fields: the given iterator itself;

if the given iterator is nested in one or more ancestor iterators: data collection iterators whose collected record instances have been utilized and combination primitives by which records collected by said data collection iterators are produced;

where the operations further comprise determining whether an iterator with context equivalent to context of the selected discovered field is present in any of the pages;

if so, introducing the field X into the present iterator;

otherwise, introducing one or more iterators in the page Z to create an iterator having equivalent context and receiving the field X.

22. The method of claim 18, where an annotation field comprises a data collection field appearing in an iterator that also has report fields, where during production of the dynamic web page instance, instances of the data collection field and the report field appearing in the iterator also appear in the same record instance;

where the operation (b) further includes receiving further input from a human user, the further input pertaining to a given annotation field;

where said further input specifies cardinality of values that the given annotation field collects for each record instance, where said specified cardinality includes at least one of the following constraints:

a constraint that the given annotation field may collect only a single value for each record instance where said given annotation field appears;

a constraint that the given annotation field may collect values from different users for each record instance where said given annotation field appears, whereas values from different users do not overwrite each other;

a constraint that the given annotation field may collect an unlimited number of values from each user for each record instance;

where the operation (f) comprises the computer-driven inference engine creating data structures representative of said cardinalities.

23. A method of enabling users to configure and access web accessible database driven applications, including providing web accessible digital data processing equipment programmed to create database driven applications according to computer-implemented operations comprising:

(a) initiating a database-driven application including one or more pages to store data in records of a database, report data from the database, or both store data in the database and report data from the database;

where a schema defines characteristics of records in the database;

(b) making fields including all of the following specified types of fields available for introduction into the pages:

(b1) data collection fields to perform functions including collecting user data into the database, where introduction of a data collection field modifies the schema to define a new record field;

(b2) report fields to perform functions including displaying and editing data from records of the database;

(b3) iterators, each including one or more of the following: at least one data collection field, at least one report field, at least one nested iterator;

where each iterator that includes any report fields is configured to utilize records from the database to produce a repeating structure of record instances displaying data from said database in an instance of a dynamic page;

where data collection iterators are defined as iterators containing any data collection fields;

where report iterators are defined as iterator fields containing any report fields;

(c) receiving human input introducing at least one field of the specified types to at least one of the pages, including at least one report field, and receiving human input associating an existing database attribute with the at least one report field, causing the at least one report field to display data associated with the existing database attribute;

(d) introducing one or more iterators to at least one of the pages by one of the following: automatically, or via human input received in the operation (c);

(e) where the operation (c) further includes introducing into at least one of the pages report fields that display data from records collected by data collection fields introduced in another page and the operation (c) additionally includes at least one of the following:

(1) receiving human input configuring iterator fields such that at least some of said iterators are nested in a parent iterator, and each of said parent iterators and said nested iterators include data collection fields;

(2) receiving human input adding both report fields and data collection fields pertaining to a given user-selected iterator, where a repeating structure produced by the user-selected iterator in an instance of a dynamic page displays record instances including both respective report field instances and data collection field instances, where said report instances display data from other iterators than the user selected iterator;

(f) a computer-driven inference engine automatically creating data structures representative of operations (a) and (c) and (d) and (e) in the database and automatically relating fields of the pages to the data structures in accordance with a predetermined logical framework.

24. A computer-implemented method, comprising steps of:
(a) a step for initiating a database-driven application including one or more pages to store data in records of a database, report data from the database, or both store data in the database and report data from the database; where a schema defines characteristics of records in the database;
(b) a step for making fields including all of the following specified types of fields available for introduction into the pages:
(b1) data collection fields to perform functions including collecting user data into the database, where introduction of a data collection field modifies the schema to define a new record field;
(b2) report fields to perform functions including displaying and editing data from records of the database;
(b3) iterators, each including one or more of the following: at least one data collection field, at least one report field, at least one nested iterator;
where each iterator that includes any report fields is configured to utilize records from the database to produce a repeating structure of record instances displaying data from said database in an instance of a dynamic page;
where data collection iterators are defined as iterators containing any data collection fields;
where report iterators are defined as iterator fields containing any report fields;
(c) a step for receiving human input introducing at least one field of the specified types to at least one of the pages, including at least one report field, and receiving human input associating an existing database attribute with the at least one report field, causing the at least one report field to display data associated with the existing database attribute;
(d) a step for introducing one or more iterators to at least one of the pages by one of the following: automatically, or via human input received in the step (c);
(e) a step for where the step (c) further includes introducing into at least one of the pages report fields that display data from records collected by data collection fields introduced in another page and the step (c) additionally includes at least one of the following:
(1) receiving human input configuring iterator fields such that at least some of said iterators are nested in a parent iterator, and each of said parent iterators and said nested iterators include data collection fields;
(2) receiving human input adding both report fields and data collection fields pertaining to a given user-selected iterator, where a repeating structure produced by the user-selected iterator in an instance of a dynamic page displays record instances including both respective report field instances and data collection field instances, where said report instances display data from other iterators than the user selected iterator;
(f) a step for a computer-driven inference engine automatically creating data structures representative of steps (a) and (c) and (d) and (e) in the database and automatically relating fields of the pages to the data structures in accordance with a predetermined logical framework.

25. A computer program product containing software to perform operations to facilitate user design of a database driven application or to install another program that upon installation performs operations to facilitate user design of a database driven application, the operations comprising:
(a) initiating a database-driven application including one or more pages to store data in records of a database, report data from the database, or both store data in the database and report data from the database;
where a schema defines characteristics of records in the database;
(b) making fields including all of the following specified types of fields available for introduction into the pages:
(b1) data collection fields to perform functions including collecting user data into the database, where introduction of a data collection field modifies the schema to define a new record field;
(b2) report fields to perform functions including displaying and editing data from records of the database;
(b3) iterators, each including one or more of the following: at least one data collection field, at least one report field, at least one nested iterator;
where each iterator that includes any report fields is configured to utilize records from the database to produce a repeating structure of record instances displaying data from said database in an instance of a dynamic page;
where data collection iterators are defined as iterators containing any data collection fields;
where report iterators are defined as iterator fields containing any report fields;
(c) receiving human input introducing at least one field of the specified types to at least one of the pages;
(d) introducing one or more iterators to at least one of the pages by one of the following: automatically, or via human input received in the operation (c);
(e) where the operation (c) further includes introducing into at least one of the pages report fields that display data from records collected by data collection fields introduced in another page and the operation (c) includes:
(1) receiving human input adding both report fields and data collection fields pertaining to a given user-selected iterator, where a repeating structure produced by the user-selected iterator in an instance of a dynamic page displays record instances including both respective report field instances and data collection field instances, where said report instances display data from other iterators than the user selected iterator; and
(2) receiving human input specifying an existing data collection field causing an introduced report field to display data collected by the existing data collection field; and
(f) a computer-driven inference engine automatically creating data structures representative of operations (a) and (c) and (d) and (e) in the database and automatically relating fields of the pages to the data structures in accordance with a predetermined logical framework.

26. A computer-implemented method, comprising operations of:
(a) initiating a database-driven application including one or more pages to store data in a database, report data from the database, or both store data in the database and report data from the database; where a schema defines characteristics of records in the database;
(b) making fields including all of the following specified types of fields available for introduction into the pages:
(b1) data collection fields to perform functions including collecting user data into the database, where introduction of a data collection field modifies the schema to define a new record field;

(b2) report fields to perform functions including displaying and editing data from records of the database;
(b3) iterator fields, each including one or more of the following: at least one data collection field, at least one report field, at least one nested iterator field;
where each iterator field that includes at least one report field is configured to utilize records from the database to produce a repeating structure of record instances that display data from said database in an instance of a dynamic page;
where data collection iterators are defined as iterators containing any data collection fields;
where report iterators are defined as iterator fields containing any report fields;
(c) receiving human user input introducing at least one field of the specified types to at least one of the pages, including at least one report field, and receiving human input associating an existing database attribute with the at least one report field, causing the at least one report field to display data associated with the existing database attribute;
(d) introducing one or more iterators to at least one of the pages by one of the following: automatically, or via human input received in operation (b);
(e) responsive to initiation of introduction of a field X to a page Z in the operation (c), discovering fields of other pages that are semantically related to the page Z,
where said discovering operation discovers fields having any of the following semantic relationships (1), (2), (3), or (4) to fields that have been introduced into page Z, including least one of relationships (1) or (3) specified as follows:
(1) fields are related if they appear in iterators that share common context, where context of a given iterator includes:
if the given iterator has report fields: data collection iterators whose collected records are utilized in order to produce record instances of the given report iterator;
if the given iterator has data collection fields: the given iterator itself;
if the given iterator is nested in one or more ancestor iterators: data collection iterators whose collected record instances are utilized in order to produce record instances of the ancestor iterators;
(2) fields are related if they appear in respective iterators where one of the respective iterators contains a reference to the records reported or collected by another of the respective iterators;
(3) fields are related if they appear in iterators related due to nesting;
(4) indirect relationships that are built by combinations of any of the semantic relationships (1), (2), or (3);
(f) providing a human-readable output including a listing of the discovered fields.

27. The method of claim 26, said discovering operation detecting that certain discovered fields are duplicates of each other, where fields being duplicate of each other signifies: selection of any one of the duplicate fields has the same effects to the page upon which the fields are being introduced.

28. The method of claim 26, the operations further including, responsive to user selection of one of the discovered fields in association with the page Z:

automatically modifying the page Z so that the modified page Z includes the field X and the field X reports data associated with the selected discovered field.

29. The method of claim 28,
where context of a given report iterator includes:
if the given iterator contains any report fields: data collection iterators whose collected records have been utilized and combination primitives by which records collected by said data collection iterators are produced;
if the given iterator contains any data collection fields: the given iterator itself;
if the given iterator is nested in one or more ancestor iterators: data collection iterators whose collected record instances have been utilized and combination primitives by which records collected by said data collection iterators are produced;
where the operations further comprise determining whether an iterator with context equivalent to context of the selected discovered field is present in any of the pages;
if so, introducing the field X into the present iterator;
otherwise, introducing one or more iterators in the page Z to create an iterator having equivalent context and receiving the field X.

30. A method of enabling users to configure and access web accessible database driven applications, including providing web accessible digital data processing equipment programmed to create database driven applications according to computer-implemented operations comprising:
(a) initiating a database-driven application including one or more pages to store data in a database, report data from the database, or both store data in the database and report data from the database; where a schema defines characteristics of records in the database;
(b) making fields including all of the following specified types of fields available for introduction into the pages:
(b1) data collection fields to perform functions including collecting user data into the database, where introduction of a data collection field modifies the schema to define a new record field;
(b2) report fields to perform functions including displaying and editing data from records of the database;
(b3) iterator fields, each including one or more of the following: at least one data collection field, at least one report field, at least one nested iterator field;
where each iterator field that includes at least one report field is configured to utilize records from the database to produce a repeating structure of record instances that display data from said database in an instance of a dynamic page;
where data collection iterators are defined as iterators containing any data collection fields;
where report iterators are defined as iterator fields containing any report fields;
(c) receiving human user input introducing at least one field of the specified types to at least one of the pages, including at least one report field, and receiving human input associating an existing database attribute with the at least one report field, causing the at least one report field to display data associated with the existing database attribute;
(d) introducing one or more iterators to at least one of the pages by one of the following: automatically, or via human input received in operation (b);

(e) responsive to initiation of introduction of a field X to a page Z in the operation (c), discovering fields of other pages that are semantically related to the page Z,
  where said discovering operation discovers fields having any of the following semantic relationships (1), (2), (3), or (4) to fields that have been introduced into page Z, including least one of relationships (1) or (3) specified as follows:
    (1) fields are related if they appear in iterators that share common context, where context of a given iterator includes:
      if the given iterator has report fields: data collection iterators whose collected records are utilized in order to produce record instances of the given report iterator;
      if the given iterator has data collection fields: the given iterator itself;
      if the given iterator is nested in one or more ancestor iterators: data collection iterators whose collected record instances are utilized in order to produce record instances of the ancestor iterators;
    (2) fields are related if they appear in respective iterators where one of the respective iterators contains a reference to the records reported or collected by another of the respective iterators;
    (3) fields are related if they appear in iterators related due to nesting;
    (4) indirect relationships that are built by combinations of any of the semantic relationships (1), (2), or (3);
(f) providing a human-readable output including a listing of the discovered fields.

31. A computer-implemented method, comprising steps of:
(a) a step for initiating a database-driven application including one or more pages to store data in a database, report data from the database, or both store data in the database and report data from the database; where a schema defines characteristics of records in the database;
(b) a step for making fields including all of the following specified types of fields available for introduction into the pages:
  (b1) data collection fields to perform functions including collecting user data into the database, where introduction of a data collection field modifies the schema to define a new record field;
  (b2) report fields to perform functions including displaying and editing data from records of the database;
  (b3) iterator fields, each including one or more of the following: at least one data collection field, at least one report field, at least one nested iterator field;
    where each iterator field that includes at least one report field is configured to utilize records from the database to produce a repeating structure of record instances that display data from said database in an instance of a dynamic page;
    where data collection iterators are defined as iterators containing any data collection fields;
    where report iterators are defined as iterator fields containing any report fields;
(c) a step for receiving human user input introducing at least one field of the specified types to at least one of the pages, including at least one report field, and receiving human input associating an existing database attribute with the at least one report field, causing the at least one report field to display data associated with the existing database attribute;
(d) a step for introducing one or more iterators to at least one of the pages by one of the following: automatically, or via human input received in step (b);
(e) a step for responsive to initiation of introduction of a field X to a page Z in the step (c), discovering fields of other pages that are semantically related to the page Z,
  where said discovering step discovers fields having any of the following semantic relationships (1), (2), (3), or (4) to fields that have been introduced into page Z, including least one of relationships (1) or (3) specified as follows:
    (1) fields are related if they appear in iterators that share common context, where context of a given iterator includes:
      if the given iterator has report fields: data collection iterators whose collected records are utilized in order to produce record instances of the given report iterator;
      if the given iterator has data collection fields: the given iterator itself;
      if the given iterator is nested in one or more ancestor iterators: data collection iterators whose collected record instances are utilized in order to produce record instances of the ancestor iterators;
    (2) fields are related if they appear in respective iterators where one of the respective iterators contains a reference to the records reported or collected by another of the respective iterators;
    (3) fields are related if they appear in iterators related due to nesting;
    (4) indirect relationships that are built by combinations of any of the semantic relationships (1), (2), or (3);
(f) a step for providing a human-readable output including a listing of the discovered fields.

32. A computer program product containing software to perform operations to facilitate user design of a database driven application or to install another program that upon installation performs operations to facilitate user design of a database driven application, the operations comprising:
(a) initiating a database-driven application including one or more pages to store data in a database, report data from the database, or both store data in the database and report data from the database; where a schema defines characteristics of records in the database;
(b) making fields including all of the following specified types of fields available for introduction into the pages:
  (b1) data collection fields to perform functions including collecting user data into the database, where introduction of a data collection field modifies the schema to define a new record field;
  (b2) report fields to perform functions including displaying and editing data from records of the database;
  (b3) iterator fields, each including one or more of the following: at least one data collection field, at least one report field, at least one nested iterator field;
    where each iterator field that includes at least one report field is configured to utilize records from the database to produce a repeating structure of record instances that display data from said database in an instance of a dynamic page;
    where data collection iterators are defined as iterators containing any data collection fields;

where report iterators are defined as iterator fields containing any report fields;
(c) receiving human user input introducing at least one field of the specified types to at least one of the pages, including at least one report field, and receiving human input associating an existing database attribute with the at least one report field, causing the at least one report field to display data associated with the existing database attribute;
(d) introducing one or more iterators to at least one of the pages by one of the following: automatically, or via human input received in operation (b);
(e) responsive to initiation of introduction of a field X to a page Z in the operation (c), discovering fields of other pages that are semantically related to the page Z,
where said discovering operation discovers fields having any of the following semantic relationships (1), (2), (3), or (4) to fields that have been introduced into page Z, including least one of relationships (1) or (3) specified as follows:
(1) fields are related if they appear in iterators that share common context, where context of a given iterator includes:
if the given iterator has report fields: data collection iterators whose collected records are utilized in order to produce record instances of the given report iterator;
if the given iterator has data collection fields: the given iterator itself;
if the given iterator is nested in one or more ancestor iterators: data collection iterators whose collected record instances are utilized in order to produce record instances of the ancestor iterators;
(2) fields are related if they appear in respective iterators where one of the respective iterators contains a reference to the records reported or collected by another of the respective iterators;
(3) fields are related if they appear in iterators related due to nesting;
(4) indirect relationships that are built by combinations of any of the semantic relationships (1), (2), or (3);
(f) providing a human-readable output including a listing of the discovered fields.

33. A computer-implemented method, comprising operations of:
(a) initiating a database-driven application including one or more pages to store data in records of a database, report data from the database, or both store data in the database and report data from the database;
where a schema defines characteristics of records in the database;
(b) making fields including all of the following specified types of fields available for introduction into the pages:
(b1) data collection fields to perform functions including collecting user data into the database, where introduction of a data collection field modifies the schema to define a new record field;
(b2) report fields to perform functions including displaying and editing data from records of the database;
(b3) iterators, each including one or more of the following: at least one data collection field, at least one report field, at least one nested iterator;
where each iterator that includes any report fields is configured to utilize records from the database to produce a repeating structure of record instances displaying data from said database in an instance of a dynamic page;
where data collection iterators are defined as iterators containing any data collection fields;
where report iterators are defined as iterator fields containing any report fields;
(c) receiving human input introducing at least one field of the specified types to at least one of the pages, including at least one report field, and receiving human input associating an existing database attribute with the at least one report field, causing the at least one report field to display data associated with the existing database attribute;
(d) introducing one or more iterators to at least one of the pages by one of the following: automatically, or via human input received in the operation (c);
(e) a computer-driven inference engine automatically creating data structures representative of operations (a) and (c) and (d) and (e) in the database and automatically relating fields of the pages to the data structures in accordance with a predetermined logical framework;
where operation (c) further includes receiving introduction into at least one page report fields that display data from records collected by data collection fields introduced in another page;
where operation (c) further includes receiving introduction of the following into a field of a source iterator S that includes at least one report field: a hyperlink pointing to a user-selected target page;
where every record instance X of the source iterator S contains an instance of the hyperlink, said hyperlink instance configured to cause display of a target page instance retaining context of the record instance X;
wherein context of the record instance X comprises (1) record instances that were utilized in order to produce the record instance X and (2) record instances utilized to produce ancestor record instances of the record instance X;
where said target page instance retaining context of the record instance X is satisfied by a condition where: one or more iterators of the target page sharing context with the record instance X displaying only record instances sharing context with the record instance X.

34. The method of claim 33, further comprising:
the computer-driven inference engine discovering pages in which iterators were introduced that share context with the source iterator S, and providing a human-readable output suggesting the discovered pages as potential targets of the hyperlink.

35. The method of claim 33, further comprising:
creating one or more representative pages that share context with the source iterator S, said hyperlink pointing to a selected one of said representative pages.

36. A method of enabling users to configure and access web accessible database driven applications, including providing web accessible digital data processing equipment programmed to create database driven applications according to computer-implemented operations comprising:
(a) initiating a database-driven application including one or more pages to store data in records of a database, report data from the database, or both store data in the database and report data from the database;
where a schema defines characteristics of records in the database;
(b) making fields including all of the following specified types of fields available for introduction into the pages:

(b1) data collection fields to perform functions including collecting user data into the database, where introduction of a data collection field modifies the schema to define a new record field;
(b2) report fields to perform functions including displaying and editing data from records of the database;
(b3) iterators, each including one or more of the following: at least one data collection field, at least one report field, at least one nested iterator;
where each iterator that includes any report fields is configured to utilize records from the database to produce a repeating structure of record instances displaying data from said database in an instance of a dynamic page;
where data collection iterators are defined as iterators containing any data collection fields;
where report iterators are defined as iterator fields containing any report fields;
(c) receiving human input introducing at least one field of the specified types to at least one of the pages;
(d) introducing one or more iterators to at least one of the pages by one of the following: automatically, or via human input received in the operation (c);
(e) a computer-driven inference engine automatically creating data structures representative of operations (a) and (c) and (d) and (e) in the database and automatically relating fields of the pages to the data structures in accordance with a predetermined logical framework;
where operation (c) further includes, for an introduced report field, receiving human input associating an existing database attribute with the introduced report field, causing the introduced report field to display data associated with the existing database attribute:
where operation (c) further includes receiving introduction into at least one page report fields that display data from records collected by data collection fields introduced in another page;
where operation (c) further includes receiving introduction of the following into a field of a source iterator S that includes at least one report field: a hyperlink pointing to a user-selected target page;
where every record instance X of the source iterator S contains an instance of the hyperlink, said hyperlink instance configured to cause display of a target page instance retaining context of the record instance X;
wherein context of the record instance X comprises (1) record instances that were utilized in order to produce the record instance X and (2) record instances utilized to produce ancestor record instances of the record instance X;
where said target page instance retaining context of the record instance X is satisfied by a condition where: one or more iterators of the target page sharing context with the record instance X displaying only record instances sharing context with the record instance X.

37. A computer-implemented method, comprising steps of:
(a) a step for initiating a database-driven application including one or more pages to store data in records of a database, report data from the database, or both store data in the database and report data from the database; where a schema defines characteristics of records in the database;
(b) a step for making fields including all of the following specified types of fields available for introduction into the pages:
(b1) data collection fields to perform functions including collecting user data into the database, where introduction of a data collection field modifies the schema to define a new record field;
(b2) report fields to perform functions including displaying and editing data from records of the database;
(b3) iterators, each including one or more of the following: at least one data collection field, at least one report field, at least one nested iterator;
where each iterator that includes any report fields is configured to utilize records from the database to produce a repeating structure of record instances displaying data from said database in an instance of a dynamic page;
where data collection iterators are defined as iterators containing any data collection fields;
where report iterators are defined as iterator fields containing any report fields;
(c) a step for receiving human input introducing at least one field of the specified types to at least one of the pages;
(d) a step for introducing one or more iterators to at least one of the pages by one of the following: automatically, or via human input received in the step (c);
(e) a step for a computer-driven inference engine automatically creating data structures representative of steps (a) and (c) and (d) and (e) in the database and automatically relating fields of the pages to the data structures in accordance with a predetermined logical framework;
where step (c) further includes, for an introduced report field, receiving human input associating an existing database attribute with the introduced report field, causing the introduced report field to display data associated with the existing database attribute;
where step (c) further includes receiving introduction into at least one page report fields that display data from records collected by data collection fields introduced in another page;
where step (c) further includes receiving introduction of the following into a field of a source iterator S that includes at least one report field: a hyperlink pointing to a user-selected target page;
where every record instance X of the source iterator S contains an instance of the hyperlink, said hyperlink instance configured to cause display of a target page instance retaining context of the record instance X;
wherein context of the record instance X comprises (1) record instances that were utilized in order to produce the record instance X and (2) record instances utilized to produce ancestor record instances of the record instance X;
where said target page instance retaining context of the record instance X is satisfied by a condition where: one or more iterators of the target page sharing context with the record instance X displaying only record instances sharing context with the record instance X.

38. A computer program product containing software to perform operations to facilitate user design of a database driven application or to install another program that upon installation performs operations to facilitate user design of a database driven application, the operations comprising:
(a) initiating a database-driven application including one or more pages to store data in records of a database, report data from the database, or both store data in the database and report data from the database;
where a schema defines characteristics of records in the database;

(b) making fields including all of the following specified types of fields available for introduction into the pages:
  (b1) data collection fields to perform functions including collecting user data into the database, where introduction of a data collection field modifies the schema to define a new record field;
  (b2) report fields to perform functions including displaying and editing data from records of the database;
  (b3) iterators, each including one or more of the following: at least one data collection field, at least one report field, at least one nested iterator;
    where each iterator that includes any report fields is configured to utilize records from the database to produce a repeating structure of record instances displaying data from said database in an instance of a dynamic page;
    where data collection iterators are defined as iterators containing any data collection fields;
    where report iterators are defined as iterator fields containing any report fields;
(c) receiving human input introducing at least one field of the specified types to at least one of the pages;
(d) introducing one or more iterators to at least one of the pages by one of the following: automatically, or via human input received in the operation (c);
(e) a computer-driven inference engine automatically creating data structures representative of operations (a) and (c) and (d) and (e) in the database and automatically relating fields of the pages to the data structures in accordance with a predetermined logical framework;
where operation (c) further includes, for an introduced report field, receiving human input associating an existing database attribute with the introduced report field, causing the introduced report field to display data associated with the existing database attribute;
where operation (c) further includes receiving introduction into at least one page report fields that display data from records collected by data collection fields introduced in another page;
where operation (c) further includes receiving introduction of the following into a field of a source iterator S that includes at least one report field: a hyperlink pointing to a user-selected target page;
  where every record instance X of the source iterator S contains an instance of the hyperlink, said hyperlink instance configured to cause display of a target page instance retaining context of the record instance X;
  wherein context of the record instance X comprises (1) record instances that were utilized in order to produce the record instance X and (2) record instances utilized to produce ancestor record instances of the record instance X;
  where said target page instance retaining context of the record instance X is satisfied by a condition where: one or more iterators of the target page sharing context with the record instance X displaying only record instances sharing context with the record instance X.

39. A computer-implemented method, comprising operations of:
(a) initiating a database-driven application including one or more pages to store data in records of a database, report data from the database, or both store data in the database and report data from the database;
  where a schema defines characteristics of records in the database;
(b) making fields including all of the following specified types of fields available for introduction into the pages:
  (b1) data collection fields to perform functions including collecting user data into the database, where introduction of a data collection field modifies the schema to define a new record field;
  (b2) report fields to perform functions including displaying and editing data from records of the database;
  (b3) iterators, each including one or more of the following: at least one data collection field, at least one report field, at least one nested iterator;
    where each iterator that includes any report fields is configured to utilize records from the database to produce a repeating structure of record instances displaying data from said database in an instance of a dynamic page;
    where data collection iterators are defined as iterators containing any data collection fields;
    where report iterators are defined as iterator fields containing any report fields;
(c) receiving human input introducing at least one field of the specified types to at least one of the pages, including at least one report field, and receiving human input associating an existing database attribute with the at least one report field, causing the at least one report field to display data associated with the existing database attribute;
(d) introducing one or more iterators to at least one of the pages by one of the following: automatically, or via human input received in the operation (c);
(e) where the operation (c) further includes introducing into at least one of the pages report fields that display data from records collected by data collection fields introduced in another page and the operation (c) includes:
  (1) receiving human input adding both report fields and data collection fields pertaining to a given user-selected iterator, where a repeating structure produced by the given user-selected iterator in an instance of a dynamic page displays record instances including both respective report field instances and data collection field instances, where said report instances display data from other iterators than the given user selected iterator;
(f) a computer-driven inference engine automatically creating data structures representative of operations (a) and (c) and (d) and (e) in the database and automatically relating fields of the pages to the data structures in accordance with a predetermined logical framework;
(g) responsive to initiation of introduction of a field X to a page Z in the operation (c), discovering fields of other pages that are semantically related to the page Z;
where said discovering operation discovers fields having any of the following semantic relationships (1), (2), (3), or (4) to fields that have been introduced into page Z, including at least one of relationships (1) or (3) specified as follows:
  (1) fields are related if they appear in iterators that share common context, where context of a given iterator includes:
    if the given iterator includes report fields: data collection iterators whose collected records are utilized in order to produce record instances of the given report iterator;
    if the given iterator has data collection fields: the given iterator itself;
    if the given iterator is nested in one or more ancestor iterators: data collection iterators whose collected record instances are utilized to produce record instances of the ancestor iterators;

(2) fields are related if they appear in respective iterators where one of the respective iterators contains a reference to records reported by or collected by another of the respective iterators;

(3) fields are related if they appear in iterators related due to nesting;

(4) indirect relationships built by combinations of any of the semantic relationships (1), (2), or (3);

(h) presenting said discovered fields to a human user; and (i) receiving user selection of one or more of the presented discovered fields;

where the operation of receiving human input introducing at least one field to at least one of the pages includes introducing the following into a field of a source iterator S that includes at least one report field: a hyperlink pointing to a user-selected target page;

where every record instance X of the source iterator S contains an instance of the hyperlink, said hyperlink instance configured to cause display of a target page instance retaining context of the record instance X;

wherein context of the record instance X comprises (1) record instances that were utilized in order to produce the record instance X and (2) record instances utilized to produce ancestor record instances of the record instance X;

where said target page instance retaining context of the record instance X is satisfied by a condition where: one or more iterators of the target page sharing context with the record instance X displaying only record instances sharing context with the record instance X.

40. The computer implemented method of claim 1, further comprising configuring the introduced iterators by introducing the iterator fields of other iterators into the introduced iterators.

41. The computer implemented method of claim 40, wherein configuring the introduced iterators comprises configuring the iterator fields such that at least some of said iterators are nested in a parent iterator, and each of said parent iterators and said nested iterators include the data collection fields.

* * * * *